United States Patent
Wenren

(10) Patent No.: US 10,976,520 B2
(45) Date of Patent: Apr. 13, 2021

(54) OPTICAL IMAGING LENS ASSEMBLY

(71) Applicant: Zhejiang Sunny Optical Co., Ltd, Zhejiang (CN)

(72) Inventor: Jianke Wenren, Zhejiang (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 321 days.

(21) Appl. No.: 16/211,696

(22) Filed: Dec. 6, 2018

(65) Prior Publication Data

US 2019/0107690 A1 Apr. 11, 2019

Related U.S. Application Data

(63) Continuation of application No. PCT/CN2018/072776, filed on Jan. 16, 2018.

(30) Foreign Application Priority Data

Jul. 5, 2017 (CN) .......................... 201710542434.8
Jul. 5, 2017 (CN) .......................... 201720806420.8

(51) Int. Cl.
  *G02B 26/08* (2006.01)
  *G02B 13/00* (2006.01)
  *G02B 26/12* (2006.01)
  *G02B 13/18* (2006.01)

(52) U.S. Cl.
  CPC ......... *G02B 13/0005* (2013.01); *G02B 13/00* (2013.01); *G02B 13/0045* (2013.01); *G02B 13/18* (2013.01); *G02B 26/123* (2013.01)

(58) Field of Classification Search
  CPC .. G02B 13/0005; G02B 13/00; G02B 26/123; G02B 13/18; G02B 13/0045; G02B 9/64; G02B 13/002
  USPC ...................................... 359/206.1
  See application file for complete search history.

(56) References Cited

U.S. PATENT DOCUMENTS

2010/0208358 A1 * 8/2010 Minefuji ................ G02B 13/16
                                                        359/682
2015/0036230 A1 * 2/2015 Bone .................. G02B 13/0045
                                                        359/754
2016/0004045 A1   1/2016 Kondo et al.

FOREIGN PATENT DOCUMENTS

| CN | 101762864 | 6/2010 |
|----|-----------|--------|
| CN | 204314534 | 5/2015 |
| CN | 106338815 | 1/2017 |
| JP | 6037221   | 12/2016 |

* cited by examiner

*Primary Examiner* — Euncha P Cherry
(74) *Attorney, Agent, or Firm* — Hauptman Ham, LLP

(57) ABSTRACT

The present disclosure discloses an optical imaging lens assembly. The optical imaging lens assembly includes a first lens, a second lens, a third lens, a fourth lens, a fifth lens, a sixth lens, a seventh lens, and an eighth lens, sequentially arranged from an object side to an image side along an optical axis. The first lens, the second lens, the fifth lens, the seventh lens, and the eighth lens may respectively have a positive focal power or a negative focal power. A combined focal power of the third lens and the fourth lens is a positive focal power. The sixth lens may have a positive focal power. An effective focal length f of the optical imaging lens assembly and a combined focal length f34 of the third lens and the fourth lens satisfy: $0.5 \leq f/f34 < 1.0$.

23 Claims, 20 Drawing Sheets

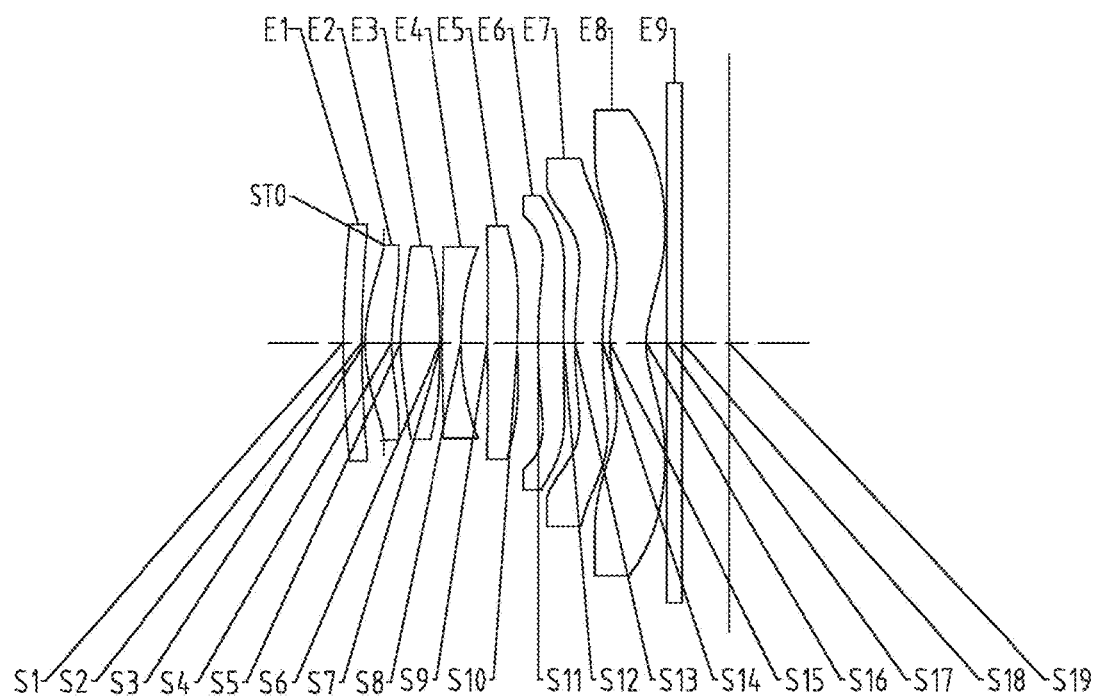
Fig. 1
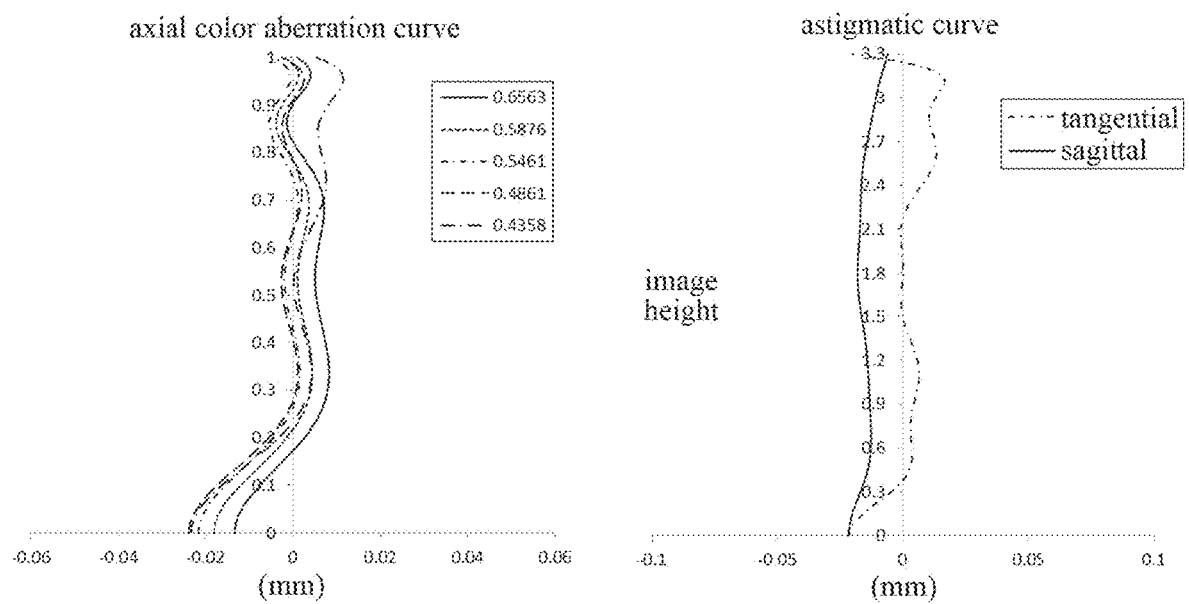
Fig. 2A
Fig. 2B

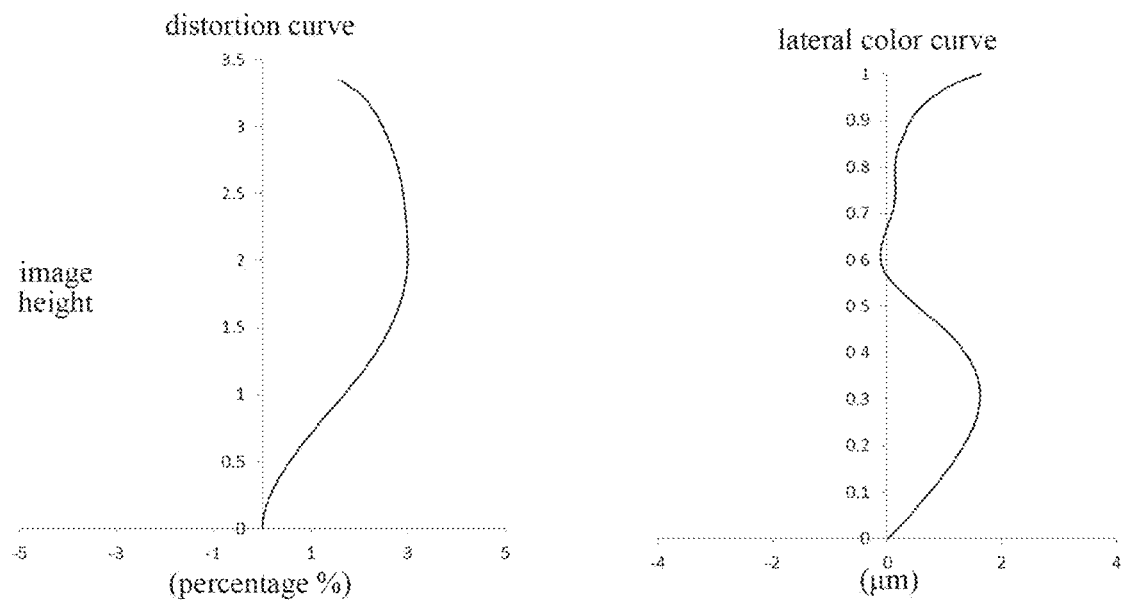
Fig. 10C
Fig. 10D
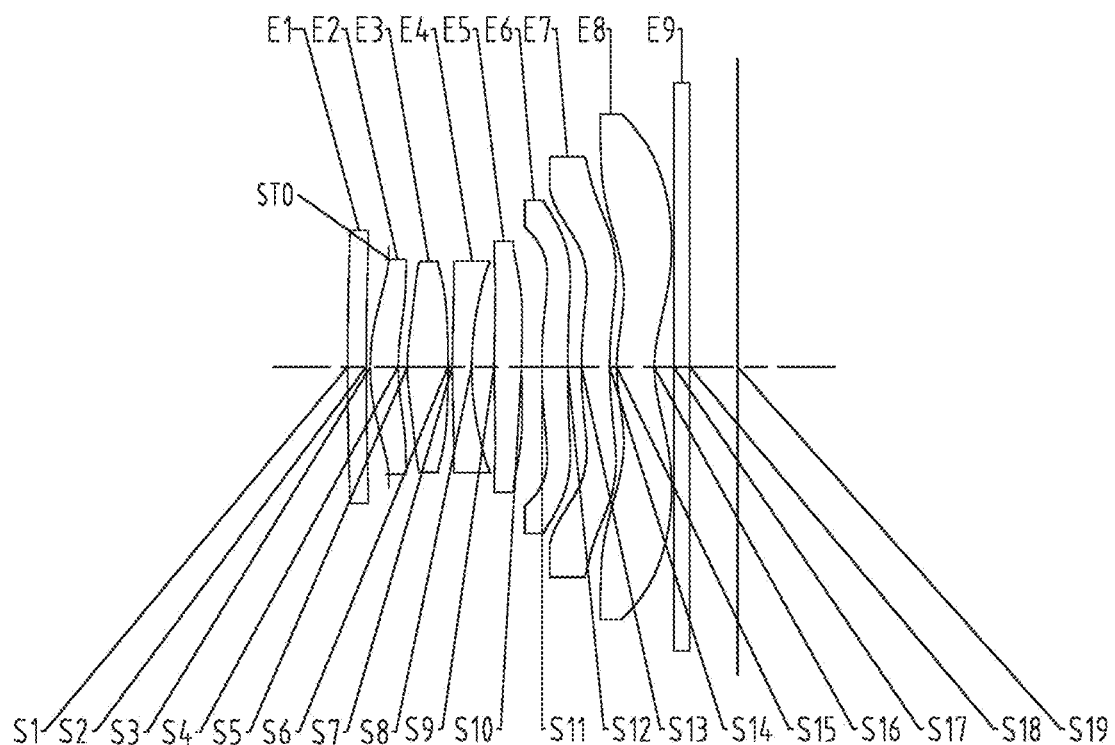
Fig. 11

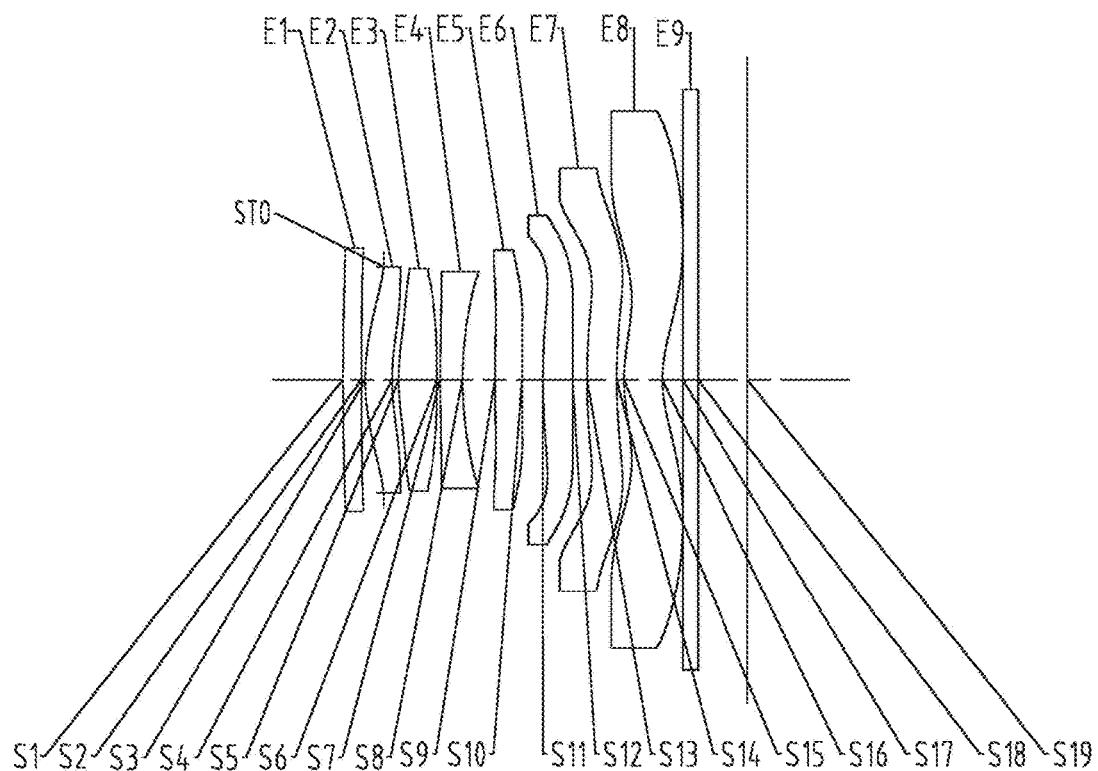
Fig. 17
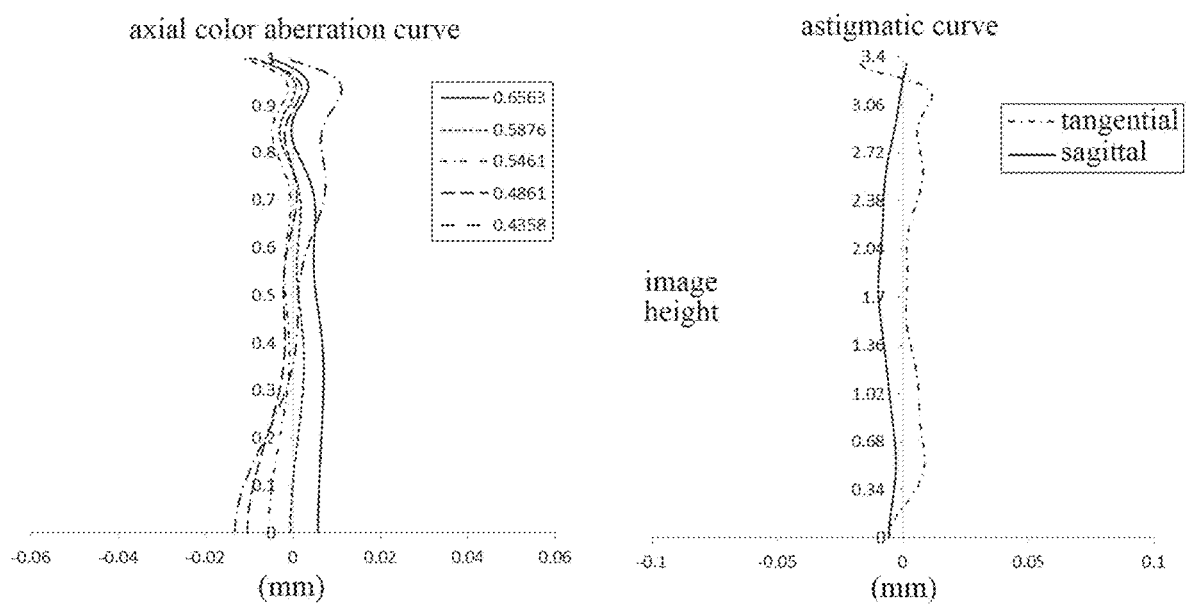
Fig. 18A                    Fig. 18B

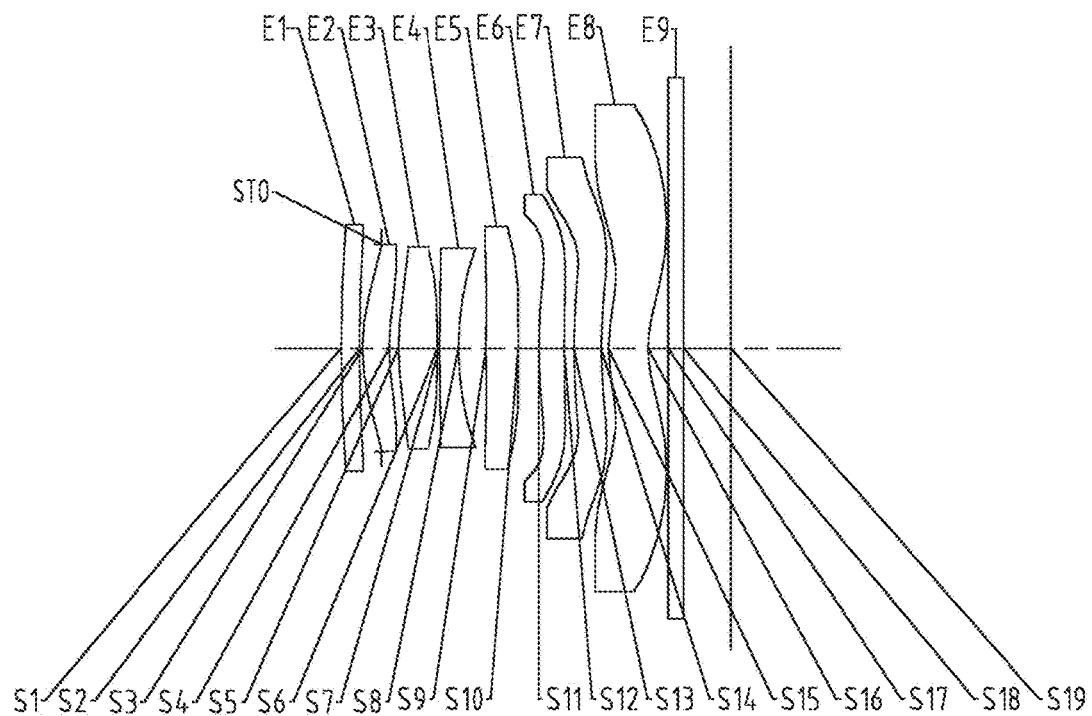
Fig. 25
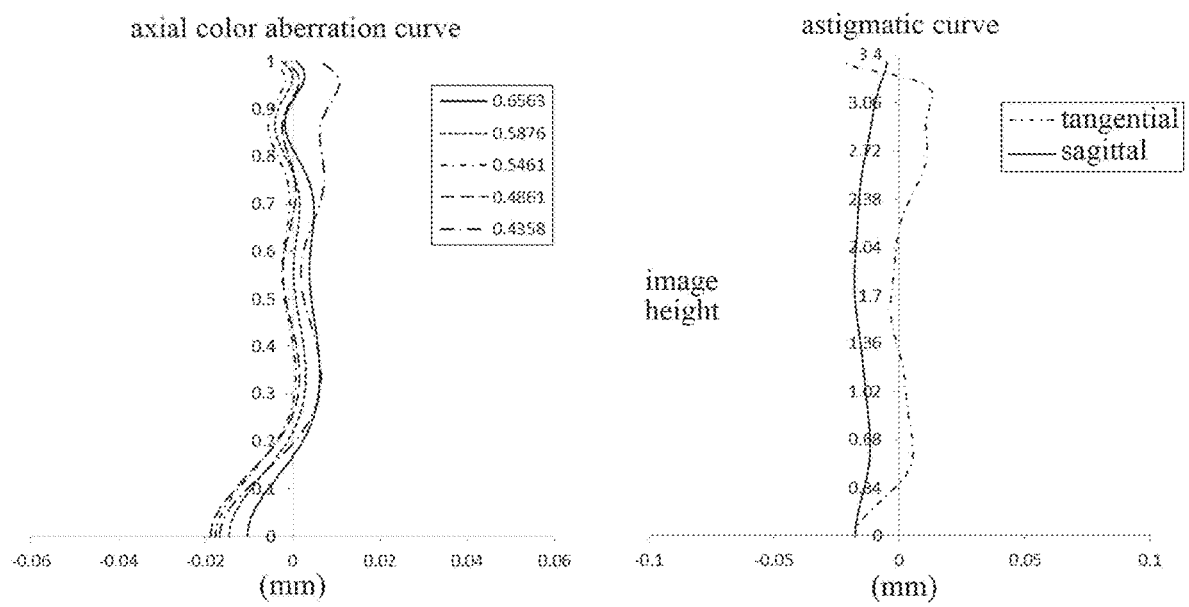
Fig. 26A
Fig. 26B

OPTICAL IMAGING LENS ASSEMBLY

CROSS-REFERENCE TO RELATED APPLICATIONS

This application is a continuation of International Application No. PCT/CN2018/072776, filed on Jan. 16, 2018, which claims the priorities and rights from Chinese Patent Application No. 201710542434.8 and Chinese Patent Application No. 201720806420.8 filed with the China National Intellectual Property Administration (CNIPA) on Jul. 5, 2017. All of the aforementioned applications are hereby incorporated by reference in their entireties.

TECHNICAL FIELD

The present disclosure relates to an optical imaging lens assembly, and more specifically to an optical imaging lens assembly including eight lenses.

BACKGROUND

As the science and technology develop, the semiconductor technology is continuously improved. Accordingly, high-quality imaging lens assemblies have gradually become the mainstream trend in the market. With their continuous developments, the portable electronic products such as mobile phones and tablet computers have become thinner and smaller. In particular, a 360-degree around view application currently having a growing market has brought forward higher requirements on performances of the optical imaging lens assembly such as miniaturization, lightweight, and image quality.

In order to satisfy the requirements of miniaturization and high quality, with the continuous development of the portable electronic products such as smart phones, higher requirements on the imaging lens assembly have been brought forward, especially in situations such as insufficient lights (e.g., cloudy and rainy days, at dusk, night view, and a starry sky). Accordingly, an F-number of 2.0 or above has been unable to meet higher-order imaging requirements. In order to acquire more entrance lights, the imaging lens assembly having a smaller F-number is required. In order to satisfy a higher image quality to provide a better imaging experience for a user, more lenses are needed, and thus the lens assembly having a plurality of lenses becomes a mainstream product in the high-end market.

Therefore, the present disclosure proposes an optical imaging lens assembly having optical characteristics such as multi-piece, ultra-thin, large aperture, miniaturization, and good image quality and applicable to the portable electronic products.

SUMMARY

The technical solution provided by the present disclosure at least partially solves the technical problem described above.

According to an aspect, the present disclosure provides an optical imaging lens assembly. The optical imaging lens assembly includes a first lens, a second lens, a third lens, a fourth lens, a fifth lens, a sixth lens, a seventh lens, and an eighth lens, sequentially arranged from an object side to an image side along an optical axis. Each of the first lens, the second lens, the fifth lens, the seventh lens, and the eighth lens may have a positive focal power or a negative focal power. A combined focal power of the third lens and the fourth lens is a positive focal power. The sixth lens may have a positive focal power. An effective focal length f of the optical imaging lens assembly and a combined focal length f34 of the third lens and the fourth lens may satisfy: $0.5 \leq f/f34 < 1.0$, for example, $0.53 \leq f/f34 < 0.74$.

According to another aspect, the present disclosure further provides an optical imaging lens assembly. The optical imaging lens assembly includes a first lens, a second lens, a third lens, a fourth lens, a fifth lens, a sixth lens, a seventh lens, and an eighth lens, sequentially arranged from an object side to an image side along an optical axis. Each of the first lens, the second lens, and the fifth lens may have a positive focal power or a negative focal power. Each of the third lens and the sixth lens may have a positive focal power. The fourth lens may have a negative focal power. A combined focal power of the seventh lens and the eighth lens is a negative focal power. An effective focal length f of the optical imaging lens assembly and a combined focal length f78 of the seventh lens and the eighth lens satisfy: $-0.5 < f/f78 < 0$.

In an implementation, a combined focal power of the third lens and the fourth lens is a positive focal power.

In an implementation, the third lens may have a positive focal power, and the fourth lens may have a negative focal power.

In an implementation, the combined focal power of the seventh lens and the eighth lens is a negative focal power.

In an implementation, at least one of the seventh lens and the eighth lens has a negative focal power.

In an implementation, the effective focal length f of the optical imaging lens assembly and a combined focal length f34 of the third lens and the fourth lens may satisfy: $0.5 \leq f/f34 < 1.0$.

In an implementation, an optical-axis distance TTL from an object-side surface of the first lens to an image plane of the optical imaging lens assembly and a half of a diagonal length ImgH of an effective pixel area on the image plane of the optical imaging lens assembly may satisfy: $TTL/ImgH \leq 1.7$.

In an implementation, the effective focal length f of the optical imaging lens assembly and an effective focal length f6 of the sixth lens may satisfy: $0 < f/f6 < 0.5$, for example, $0.31 \leq f/f6 \leq 0.41$.

In an implementation, the effective focal length f of the optical imaging lens assembly and a combined focal length f12 of the first lens and the second lens may satisfy: $021 f/f12 < 0.5$, for example, $0.05 \leq f/f12 \leq 0.23$.

In an implementation, the effective focal length f of the optical imaging lens assembly and an effective focal length f1 of the first lens may satisfy: $|f/f1| \leq 0.1$, for example, $|f/f1| \leq 0.05$.

In an implementation, a radius R3 of curvature of an object-side surface of the second lens and a radius R4 of curvature of an image-side surface of the second lens may satisfy: $0.6 < R3/R4 < 1.2$, for example, $0.88 \leq R3/R4 \leq 1.07$.

In an implementation, a center thickness CT2 of the second lens on the optical axis and a center thickness CT3 of the third lens on the optical axis may satisfy: $0.5 < CT2/CT3 < 0.8$, for example, $0.66 \leq CT2/CT3 \leq 0.69$.

In an implementation, a radius R7 of curvature of an object-side surface of the fourth lens and a radius R8 of curvature of an image-side surface of the fourth lens may satisfy: $0 < (R7-R8)/(R7+R8) < 1.0$, for example, $0.46 \leq (R7-R8)/(R7+R8) \leq 0.54$.

In an implementation, the effective focal length f of the optical imaging lens assembly and an effective focal length f5 of the fifth lens may satisfy: |f/f5|≤0.1, for example |f/f5|≤0.06.

In an implementation, the effective focal length f of the optical imaging lens assembly and a radius R11 of curvature of an object-side surface of the sixth lens may satisfy: 0.5<f/R11<1.0, for example, 0.65≤f/R11≤0.85.

In an implementation, a center thickness CT6 of the sixth lens on the optical axis and a center thickness CT7 of the seventh lens on the optical axis may satisfy: 0.7<CT6/CT7<1.2, for example, 0.82≤CT6//CT7≤1.03.

In an implementation, the effective focal length f of the optical imaging lens assembly and the combined focal length f78 of the seventh lens and the eighth lens may satisfy: −0.5<f/f78<0, for example, −0.38≤f/f78≤−0.25.

In an implementation, a radius R13 of curvature of an object-side surface of the seventh lens and a radius R14 of curvature of an image-side surface of the seventh lens may satisfy: |(R13−R14)/(R13+R14)|≤0.5, for example, |(R13−R14)/(R13+R14)|≤0.43.

In an implementation, a radius R15 of curvature of an object-side surface of the eighth lens and a radius R16 of curvature of an image-side surface of the eighth lens may satisfy: 1≤R15/R16<1.5, for example, 1.08≤R15/R16≤1.4.

In an implementation, the effective focal length f of the optical imaging lens assembly and an entrance pupil diameter EPD of the optical imaging lens assembly may satisfy: f/EPD≤1.8, for example, f/EPD≤1.73.

The optical imaging lens assembly with the above configuration may further have at least one of the beneficial effects such as multi-piece, ultra-thin, miniaturization, high image quality, low sensitivity, balanced aberration and the like.

BRIEF DESCRIPTION OF THE DRAWINGS

The above and other advantages of implementations of the present disclosure will become apparent from the following detailed description given with reference to the accompanying drawings, which are intended to illustrate the exemplary implementations of the present disclosure rather than limit them. In the accompanying drawings:

FIG. 1 is a schematic structural diagram of an optical imaging lens assembly according to a first embodiment of the present disclosure;

FIGS. 2A-2D respectively illustrate an axial aberration curve, an astigmatic curve, a distortion curve, and a lateral color aberration curve of the optical imaging lens assembly according to the first embodiment;

FIGS. 10A-10D respectively illustrate an axial color aberration. curve, an astigmatic curve, a distortion curve, and a lateral color aberration curve of the optical imaging lens assembly according to the fifth embodiment;

FIG. 11 is a schematic structural diagram of an optical imaging lens assembly according to a sixth embodiment of the present disclosure;

FIG. 17 is a schematic structural diagram of an optical imaging lens assembly according to a ninth embodiment of the present disclosure;

FIGS. 18A-18D respectively illustrate an axial color aberration curve, an astigmatic curve, a distortion curve, and a lateral color aberration curve of the optical imaging lens assembly according to the ninth embodiment;

FIG. 25 is a schematic structural diagram of an optical imaging lens assembly according to a thirteenth embodiment of the present disclosure; and FIGS. 26A-26D respectively illustrate an axial color aberration curve, an astigmatic curve, a distortion curve, and a lateral color aberration curve of the optical imaging lens assembly according to the thirteenth embodiment.

DETAILED DESCRIPTION

Figure 2C:
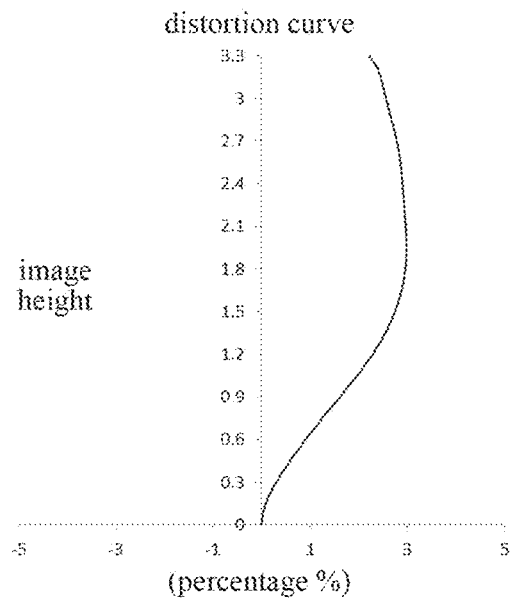

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first," and "second" are only used to distinguish one feature from another, rather than represent any limitations to the features. Thus, the first lens discussed below may also be referred to as the second lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

It should be further understood that the terms "comprising," "including," "having" and variants thereof, when used in the specification, specify the presence of stated features, entireties, steps, operations, elements and/or components, but do not exclude the presence or addition of one or more other features, entireties, steps, operations, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

As used herein, the terms "substantially," "about" and similar terms are used to indicate an approximation rather than a degree, and are intended to be illustrative of the inherent deviations of measured or calculated values as recognized by those of ordinary skill in the art.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, the paraxial area refers to an area in proximity to the optical axis. The first lens is the lens closest to the object and the eighth lens is the lens closest to the photosensitive element. In this text, the surface closest to the object in each lens is referred to as the object-side surface, and the surface closest to the image plane in each lens is referred to as the image-side surface.

It should also be noted that the embodiments in the present disclosure and the features in the embodiments may be combined with each other on a non-conflict basis. The present disclosure will be described below in detail with reference to the accompanying drawings and in combination with the embodiments.

The present disclosure is further described below with reference to the specific embodiments.

The optical imaging lens assembly according to exemplary implementations of the present disclosure has, a for example, eight lenses, i.e., a first lens, a second lens, a third lens, a fourth lens, a fifth lens, a sixth lens, a seventh lens, and an eighth lens. The eight lenses are arranged in sequence from an object side to an image side along an optical axis.

In the exemplary implementations, the first lens, the second lens, the fifth lens, the seventh lens, and the eighth lens each may have a positive focal power or a negative focal power. Each of the third lens and the sixth lens may have a positive focal power. The fourth lens may have a negative focal power. By reasonably controlling the distribution of positive and negative focal powers of the lenses, not only low-order aberrations of the control system may be effectively balanced, which makes the optical imaging lens assembly obtain a good image quality, but also an ultra-thin large aperture characteristic may be achieved.

In the exemplary implementations, an effective focal length f of the optical imaging lens assembly and a combined focal length f34 of the third lens and the fourth lens may satisfy: $0.5 \leq f/f34 < 1.0$, and more specifically, may further satisfy: $0.53 f/f34 < 0.74$. By reasonably configuring the combined focal length of the third lens and the fourth lens, it may be conductive to shortening the total length of the optical imaging lens assembly system, and may effectively correct the astigmatism at the same time.

In the exemplary implementations, an optical-axis distance TTL from an object-side surface of the first lens to an image plane of the optical imaging lens assembly and a half of a diagonal length ImgH of an effective pixel area on the image plane of the optical imaging lens assembly may satisfy: $TTL/ImgH \leq 1.7$. Through this configuration, an aberration of the edge field may be reduced, and the size of the optical imaging lens assembly system is effectively compressed, which ensures the ultra-thin characteristic and the miniaturization requirement of the lens assembly.

In the exemplary implementations, the effective focal length f of the optical imaging lens assembly and an effective focal length f6 of the sixth lens may satisfy: $0 < f/f6 < 0.5$, and more specifically, may further satisfy: $0.31 \leq f/f6 \leq 0.41$. Through this configuration, the sixth lens undertakes a small positive focal power, which may be conductive to controlling the volume of the lens, improving a space utilization rate of the lens, and ensureing the satisfaction of the miniaturization requirement for the system.

In the exemplary implementations, the effective focal length f of the optical imaging lens assembly and a combined focal length f12 of the first lens and the second lens may satisfy: $0 < f/f12 < 0.5$, and more specifically, may further satisfy: $0.05 \leq f(/f12 \leq 0.23$. By reasonably configuring the combined focal length of the first lens and the second lens, it may be conductive to shortening a field curvature of the optical imaging lens assembly system, and reducing an axial spherical aberration.

In the exemplary implementations, the effective focal length f of the optical imaging lens assembly and an effective focal length f1 of the first lens may satisfy: $|f/f1| \leq 0.1$, and more specifically, may further satisfy: $|f/f1| \leq 0.05$. Through this configuration, the first lens undertakes a small focal power, so that the aspheric feature of the first lens is mainly used, which may be conductive to increasing an aperture and correcting an edge field aberration.

In the exemplary implementations, a radius R3 of curvature of an object-side surface of the second lens and a radius R4 of curvature of an image-side surface of the second lens may satisfy: 0.6<R3/R4<1.2, and more specifically, may further satisfy: 0.88≤R3/R4≤1.07. By reasonably controlling the radis of curvature of the second lens, object-side lights may be better converged and an axial color aberration of the optical imaging lens assembly system is reduced.

In the exemplary implementations, a center thickness CT2 of the second lens on the optical axis and a center thickness CT3 of the third lens on the optical axis may satisfy: 0.5<CT2/CT3<0.8, and more specifically, may further satisfy: 0.66≤CT2/CT3≤0.69. Through this configuration, the lens group has a more reasonable space utilization rate, and meets an assembly process requirement, which reduces an assembly sensitivity of the second lens.

In the exemplary implementations, a radius R7 of curvature of an object-side surface of the fourth lens and a radius R8 of curvature of an image-side surface of the fourth lines may satisfy: 0<(R7−R8)/(R7+R8)<1.0, and more specifically, may further satisfy: 0.46≤(R7−R8)/(R7+R8)≤0.54. Under the premise that the image plane satisfies the specification, by reasonably selecting the effective radii of the object-side surface and the image-side surface of the fourth lens, an incidence angle of lights may be reasonably reduced, thereby reducing the system sensitivity and ensuring the stability of the assembly.

In the exemplary implementations, the effective focal length f of the optical imaging lens assembly and an effective focal length f5 of the fifth lens may satisfy: |f/f5|≤0.1, and more specifically, may further satisfy: |f/f5|≤0.06. Through this configuration, the fifth lens undertakes a small focal power, so that the aspheric feature of the fifth lens is mainly used, which may effectively reduce a deflection angle of the lights, and the sensitivity of the optical imaging lens assembly.

In the exemplary implementations, the effective focal length f of the optical imaging lens assembly and a radius R11 of curvature of an object-side surface of the sixth lens may satisfy: 0.5<f/R11<1.0, and more specifically, may further satisfy: 0.65≤f//R11≤0.85. By restricting the radius of curvature of the sixth lens within a reasonable range, it may be conductive to adjusting the field curvature and the astigmatism of the imaging edge to meet the peripheral image quality.

In the exemplary implementations, a center thickness CT6 of the sixth lens on the optical axis and a center thickness CT7 of the seventh lens on the optical axis may satisfy: 0.7<CT6/CT7<1.2, and more specifically, may further satisfy: 0.82≤CT6/CT7≤1.03. Through this configuration, the lens group has a more reasonable space utilization rate, and meets the assembly process requirement, which reduces the assembly sensitivity of the sixth lens and the seventh lens.

In the exemplary implementations, the effective focal length f of the optical imaging lens assembly and a combined focal length f78 of the seventh lens and the eighth lens may satisfy: −0.5<f/f78<0, and more specifically, may further satisfy: −0.38≤f/f78≤−0.25. By reasonably configuring the combined focal lengths of the seventh lens and the eighth lens, the seventh lens and the eighth lens undertake a small negative focal power, which may balance the change of the refractive power of the lens group, thereby improving the image quality.

In the exemplary implementations, a radius R13 of curvature of an object-side surface of the seventh lens and a radius R14 of curvature of an image-side surface of the seventh lens satisfy: |(R13−R14)/(R13+R14)|≤0.5, and more specifically, may further satisfy: |(R13−R14)/(R13+R14)|≤0.43. Under the premise that the image plane satisfies the specification, by reasonably selecting the effective radii of the object-side surface and the image-side surface of the seventh lens, the exit angle of the lights can be reasonably adjusted to better match the sensor.

In the exemplary implementations, a radius R15 of curvature of an object-side surface of the eighth lens and a radius R16 of curvature of an image-side surface of the eighth lens satisfy: 1≤R15/R16<1.5, and more specifically, may further satisfy: 1.08≤R15/R16≤1.4. By reasonably allocating the radii of curvature of the eighth lens, the system may obtain a smaller axial aberration.

In the exemplary implementations, the effective focal length f of the optical imaging lens assembly and an entrance pupil diameter EPD of the optical imaging lens assembly may satisfy: f/EPD≤1.8, and more specifically, may further satisfy: f/EPD≤1.73. Through this configuration, more sufficient lights can enter into the optical imaging lens assembly system, thereby improving the image quality.

In the exemplary implementations, the optical imaging lens assembly may also include an aperture STO for limiting light beams to adjust the amount of lights entering the lens assembly and improve the image quality. The optical imaging lens assembly according to the above implementations of the present disclosure may use multiple lenses, for example, eight lenses as described above. By reasonably distributing the focal power, and the surface type of each lens, the center thickness of each lens, the axial distances between the lenses, etc., the aperture of the optical imaging lens assembly may be effectively enlarged, the system sensitivity may be reduced, the miniaturization of the lens assembly may be ensured and the image quality may be improved, such that the optical imaging lens assembly is more conductive to the production and processing and applicable to portable electronic products. In the implementations of the present disclosure, at least one of the mirror surfaces of the lenses is an aspheric mirror surface. The aspheric lens is characterized in that the curvature continuously changes from the center of the lens to the periphery. Different from a spherical lens having a constant curvature from the center of the lens to the periphery, the aspheric lens has a better radius-of-curvature characteristic, and has advantages of improving a distortion aberration and an astigmatic aberration, which can make the visual field larger and more realistic. The use of the aspheric lens can eliminate as much as possible the aberrations that occur during the imaging, thereby improving the image quality. In addition, the use of the aspheric lens may also effectively reduce the number of lenses in the optical system.

However, it should be understood by those skilled in the art that the various results and advantages described in the present specification may be obtained by changing the number of the lenses constituting the lens assembly without departing from the technical solution claimed by the present disclosure. For example, although eight lenses are described as an example in the implementations, the optical imaging lens assembly is not limited to include eight lenses. If desired, the optical imaging lens assembly may also include other numbers of lenses.

Specific embodiments of the optical imaging lens assembly that may be applied to the above implementations are further described below with reference to the accompanying drawings.

First Embodiments

An optical imaging lens assembly according to a first embodiment of the present disclosure is described below with reference to FIGS. 1-2D.

FIG. 1 is a schematic structural diagram of the optical imaging lens assembly according to the first embodiment of the present disclosure. As shown in FIG. 1, the optical imaging lens assembly includes, along an optical axis, eight lenses E1-E8 arranged in sequence from an object side to an image side. The first lens E1 has an object-side surface S1 and an image-side surface S2. The second lens E2 has an object-side surface S3 and an image-side surface S4. The third lens E3 has an object-side surface S5 and an image-side surface S6. The fourth lens E4 has an object-side surface S7 and an image-side surface S8. The fifth lens E5 has an object-side surface S9 and an image-side surface S10. The sixth lens E6 has an object-side surface S11 and an image-side surface S12. The seventh lens E7 has an object-side surface S13 and an image-side surface S14. The eighth lens E8 has an object-side surface S15 and an image-side surface S16.

In this embodiment, each of the first lens, the second lens, the third lens, the fifth lens, and the sixth lens has a positive focal power. Each of the fourth lens, the seventh lens, and the eighth lens has a negative focal power.

The optical imaging lens assembly in this embodiment further includes an aperture STO for limiting light beams. The optical imaging lens assembly according to the first embodiment may include an optical filter E9 having an object-side surface S17 and an image-side surface S18. The optical filter E9 may be used to correct color deviations. Lights from an object sequentially passes through the surfaces S1-S18 and finally forms an image on an image plane S19.

Table 1 shows the surface type, the radius of curvature, the thickness, the material and the conic coefficient of each lens of the optical imaging lens assembly in the first embodiment.

TABLE 1

| surface number | surface type | radius of curvature | thick- ness | material refrac- tive index | abbe num- ber | conic coef- ficient |
|---|---|---|---|---|---|---|
| OBJ | spherical | infinite | infinite | | | |
| S1 | aspheric | 10.6144 | 0.2500 | 1.64 | 23.8 | −24.2641 |
| S2 | aspheric | 10.9492 | 0.3000 | | | −27.9364 |
| STO | spherical | infinite | −0.2519 | | | |
| S3 | aspheric | 1.8448 | 0.3575 | 1.55 | 56.1 | −14.9645 |
| S4 | aspheric | 2.0720 | 0.1224 | | | −18.0645 |
| S5 | aspheric | 2.2830 | 0.5419 | 1.55 | 56.1 | −16.3614 |
| S6 | aspheric | −13.7026 | 0.0250 | | | 82.4227 |
| S7 | aspheric | 9.2836 | 0.2600 | 1.67 | 20.4 | 42.3398 |
| S8 | aspheric | 2.8417 | 0.3579 | | | −14.9169 |
| S9 | aspheric | 9.9531 | 0.4107 | 1.65 | 23.5 | −89.2006 |
| S10 | aspheric | 11.3299 | 0.2788 | | | 4.1190 |
| S11 | aspheric | 5.9566 | 0.3488 | 1.55 | 56.1 | −30.0462 |
| S12 | aspheric | −300.0000 | 0.1535 | | | 99.0000 |
| S13 | aspheric | 7.6853 | 0.3711 | 1.65 | 23.5 | −43.2969 |
| S14 | aspheric | 4.8957 | 0.1000 | | | −99.0000 |
| S15 | aspheric | 1.2842 | 0.4935 | 1.55 | 56.1 | −7.2778 |

TABLE 1-continued

| surface number | surface type | radius of curvature | thick- ness | material refrac- tive index | abbe num- ber | conic coef- ficient |
|---|---|---|---|---|---|---|
| S16 | aspheric | 1.0220 | 0.2767 | | | −3.9170 |
| S17 | spherical | infinite | 0.2100 | 1.52 | 64.2 | |
| S18 | spherical | infinite | 0.6522 | | | |
| S19 | spherical | infinite | | | | |

As may be obtained from Table 1, the radius R3 of curvature of the object-side surface S3 of the second lens E2 and the radius R4 of curvature of the image-side surface S4 of the second lens E2 satisfy: R3/R4=0.89. The center thickness CT2 of the second lens E2 on the optical axis and the center thickness CT3 of the third lens E3 on the optical axis satisfy: CT2/CT3=0.66. The radius R7 of curvature of the object-side surface S7 of the fourth lens E4 and the radius R8 of curvature of the image-side surface S8 of the fourth lens E4 satisfy: (R7−R8)/(R7+R8)=0.53. The center thickness CT6 of the sixth lens E6 on the optical axis and the center thickness CT7 of the seventh lens E7 on the optical axis satisfy: CT6/CT7=0.94. The radius R13 of curvature of the object-side surface S13 of the seventh lens E7 and the radius R14 of curvature of the image-side surface S14 of the seventh lens E7 satisfy: |(R13−R14)/(R13+R14)|=0.22. The radius R15 of curvature of the object-side surface S15 of the eighth lens E8 and the radius R16 of curvature of the image-side surface S16 of the eighth lens E8 satisfy: R15/R16=1.26.

In this embodiment, the optical imaging lens assembly having eight lenses is used as an example. By reasonably distributing the focal lengths and the surface types of the lenses, the aperture of the lens assembly is effectively enlarged, and the total length of the lens assembly is shortened, thereby ensuring the large aperture and the miniaturization of the lens assembly. Meanwhile, various types of aberrations are corrected, which improves the resolution and the image quality of the lens assembly. The surface type x of each aspheric surface is defined by the following formula:

$$x = \frac{ch^2}{1 + \sqrt{1 - (k+1)c^2h^2}} + \sum A_i h^i. \quad (1)$$

Here, x is the sag of the displacement of the aspheric surface from the vertex of the aspheric surface, at distance h from the optical axis; c is the paraxial curvature of the aspheric surface, and c=1/R (i.e., the paraxial curvature c is the reciprocal of the radius R of curvature in Table 1 above); k is the conic coefficient (given in Table 1 above); and $A_i$ is the $i^{th}$ order correction coefficient of the aspheric surface. Table 2 below shows the high-order coefficients $A_4$, $A_6$, $A_8$, $A_{10}$, $A_{12}$, $A_{14}$, $A_{16}$, $A_{18}$, and $A_{20}$ applicable to the mirror surfaces S1-S16 in the first embodiment.

TABLE 2

| surface number | A4 | A6 | A8 | A10 | A12 |
|---|---|---|---|---|---|
| S1 | 1.6544E−02 | −1.8273E−02 | −1.0185E−01 | 3.2971E−01 | −4.6198E−01 |
| S2 | 4.7143E−02 | −1.8248E−01 | 2.2519E−01 | 4.8389E−02 | −4.7633E−01 |
| S3 | 2.6035E−01 | −6.0092E−01 | 9.9496E−01 | −1.1345E+00 | 8.0539E−01 |
| S4 | 5.2480E−02 | −3.1857E−01 | 5.1288E−01 | −6.6276E−01 | 6.2381E−01 |
| S5 | 1.8194E−02 | −1.8904E−01 | 3.0565E−01 | −4.9328E−01 | 6.5985E−01 |
| S6 | −9.5318E−02 | 2.7730E−01 | −8.3348E−01 | 1.3347E+00 | −1.2095E+00 |

TABLE 2-continued

| | | | | | |
|---|---|---|---|---|---|
| S7 | −7.7286E−02 | 2.2631E−01 | −4.8940E−01 | 2.0659E−01 | 7.3584E−01 |
| S8 | 6.7695E−02 | −5.9921E−02 | 2.5621E−01 | −8.5846E−01 | 1.4562E+00 |
| S9 | −6.6859E−02 | 7.4114E−02 | −1.4553E−01 | 2.8475E−01 | −3.7173E−01 |
| S10 | −9.6113E−02 | 2.0071E−02 | −3.3310E−01 | 2.8657E−02 | 1.9385E−02 |
| S11 | 1.0949E−02 | 9.1659E−02 | −2.8265E−01 | 3.4490E−01 | −2.8517E−01 |
| S12 | 3.6830E−02 | −3.2221E−03 | −4.1848E−02 | 8.0258E−03 | 1.0963E−02 |
| S13 | 1.9386E−01 | −4.0640E−01 | 4.4838E−01 | −3.9587E−01 | 2.3226E−01 |
| S14 | 9.5593E−02 | −1.0860E−01 | 1.7447E−02 | 1.4693E−02 | −9.1221E−03 |
| S15 | −2.2838E−01 | 7.1654E−02 | 5.8030E−04 | −5.4569E−03 | 1.5220E−03 |
| S16 | −1.6490E−01 | 8.5549E−02 | −3.1552E−02 | 8.3826E−03 | −1.5611E−03 |

| surface number | A14 | A16 | A18 | A20 |
|---|---|---|---|---|
| S1 | 3.6847E−01 | −1.7207E−01 | 4.3737E−02 | −4.6680E−03 |
| S2 | 6.1917E−01 | −3.9380E−01 | 1.2789E−01 | −1.6922E−02 |
| S3 | −3.4969E−01 | 9.0578E−02 | −1.2872E−02 | 7.7300E−04 |
| S4 | −3.5919E−01 | 1.1872E−01 | −2.0768E−02 | 1.4931E−03 |
| S5 | −4.8956E−01 | 1.8504E−01 | −3.2236E−02 | 1.8178E−03 |
| S6 | 6.4252E−01 | −1.9785E−01 | 3.2679E−02 | −2.2402E−03 |
| S7 | −1.3269E+00 | 9.7920E−01 | −3.4779E−01 | 4.8603E−02 |
| S8 | −1.3647E+00 | 7.2452E−01 | −2.0169E−01 | 2.2671E−02 |
| S9 | 2.9133E−01 | −1.3033E−01 | 3.0519E−02 | −2.8974E−03 |
| S10 | −5.0447E−02 | 3.6123E−02 | −1.1211E−02 | 1.2885E−03 |
| S11 | 1.5988E−01 | −5.7875E−02 | 1.2090E−02 | −1.0883E−03 |
| S12 | −6.3453E−03 | 1.4316E−03 | −1.5162E−04 | 6.2634E−06 |
| S13 | −8.4347E−02 | 1.8427E−02 | −2.2330E−03 | 1.1564E−04 |
| S14 | 2.4379E−03 | −3.5726E−04 | 2.7758E−05 | −8.9215E−07 |
| S15 | −2.0784E−04 | 1.5452E−05 | −5.8039E−07 | 8.1372E−09 |
| S16 | 1.9384E−04 | −1.5028E−05 | 6.5001E−07 | −1.1868E−08 |

Table 3 below shows the effective focal lengths f1-f8 of the lenses in the first embodiment, the effective focal length f of the optical imaging lens assembly, the half of the maximal field-of-view HFOV of the optical imaging lens assembly, and the optical-axis distance TTL from the object-side surface S1 of the first lens E1 to the image plane S19 of the optical imaging lens assembly.

TABLE 3

| f1 (mm) | 419.80 | f7 (mm) | −22.06 |
|---|---|---|---|
| f2 (mm) | 19.79 | f8 (mm) | −27.35 |
| f3 (mm) | 3.62 | f (mm) | 3.86 |
| f4 (mm) | −6.24 | TTL (mm) | 5.26 |
| f5 (mm) | 113.69 | HFOV (°) | 40.4 |
| f6 (mm) | 10.69 | | |

According to Table 3, the effective focal length f of the optical imaging lens assembly and the effective focal length f1 of the first lens E1 satisfy: |f/f1|=0.01. The effective focal length f of the optical imaging lens assembly and the effective focal length f5 of the fifth lens E5 satisfy: |f/f5|=0.03. The effective focal length f of the optical imaging lens assembly and the effective focal length f6 of the sixth lens E6 satisfy: f/f6=0.36.

In this embodiment, the effective focal length f of the optical imaging lens assembly and the combined focal length f12 of the first lens E1 and the second lens E2 satisfy: f/f12=0.2. The effective focal length f of the optical imaging lens assembly and the combined focal length f34 of the third lens E3 and the fourth lens E4 satisfy: f/f34=0.54. The effective focal length f of the optical imaging lens assembly and the radius R11 of curvature of the object-side surface S11 of the sixth lens E6 satisfy: f/R11=0.65. The effective focal length f of the optical imaging lens assembly and the combined focal length f78 of the seventh lens E7 and the eighth lens E8 satisfy: f/f78=−0.34. The effective focal length f of the optical imaging lens assembly and the entrance pupil diameter EPD of the optical imaging lens assembly satisfy: f/EPD=1.67. The optical-axis distance TTL from the object-side surface of the first lens to the image plane of the optical imaging lens assembly and the half of the diagonal length ImgH of the effective pixel area on the image plane of the optical imaging lens assembly satisfy: TTL/ImgH=1.59.

Figure 2D:
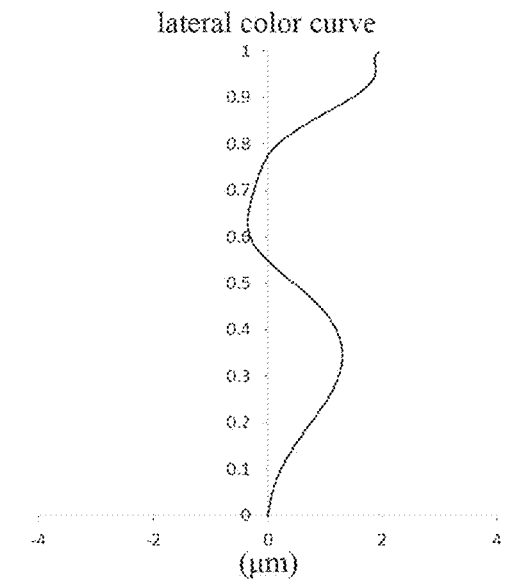

FIG. 2A illustrates an axial color aberration curve of the optical imaging lens assembly according to the first embodiment, representing deviations of focal points where lights of different wavelengths converge after passing through the optical imaging lens assembly. FIG. 2B illustrates an astigmatic curve of the optical imaging lens assembly according to the first embodiment, representing a curvature of a tangential image plane and a curvature of a sagittal image plane. FIG. 2C illustrates a distortion curve of the optical imaging lens assembly according to the first embodiment, representing degrees of distortion at different viewing angles. FIG. 2D illustrates a lateral color curve of the optical imaging lens assembly according to the first embodiment, representing deviations of different image heights on an image plane after lights pass through the optical imaging lens assembly. It can be seen from FIGS. 2A-2D that the optical imaging lens assembly according to the first embodiment can achieve a good image quality.

Second Embodiment

An optical imaging lens assembly according to a second embodiment of the present disclosure is described below with reference to FIGS. 3-4D. Except the parameters of the lenses in the optical imaging lens assembly, for example, except the radius of curvature, the thickness, the conic coefficient, the effective focal length of each lens, the axial spacing distances between the lenses, and the high-order coefficient of each mirror surface, etc., the optical imaging lens assemblies described in the second embodiment and the following embodiments have the same arrangement and same structure as the optical imaging lens assembly described in the first embodiment. For the purpose of brevity, the description of parts similar to those in the first embodiment will be omitted.

Figure 3:
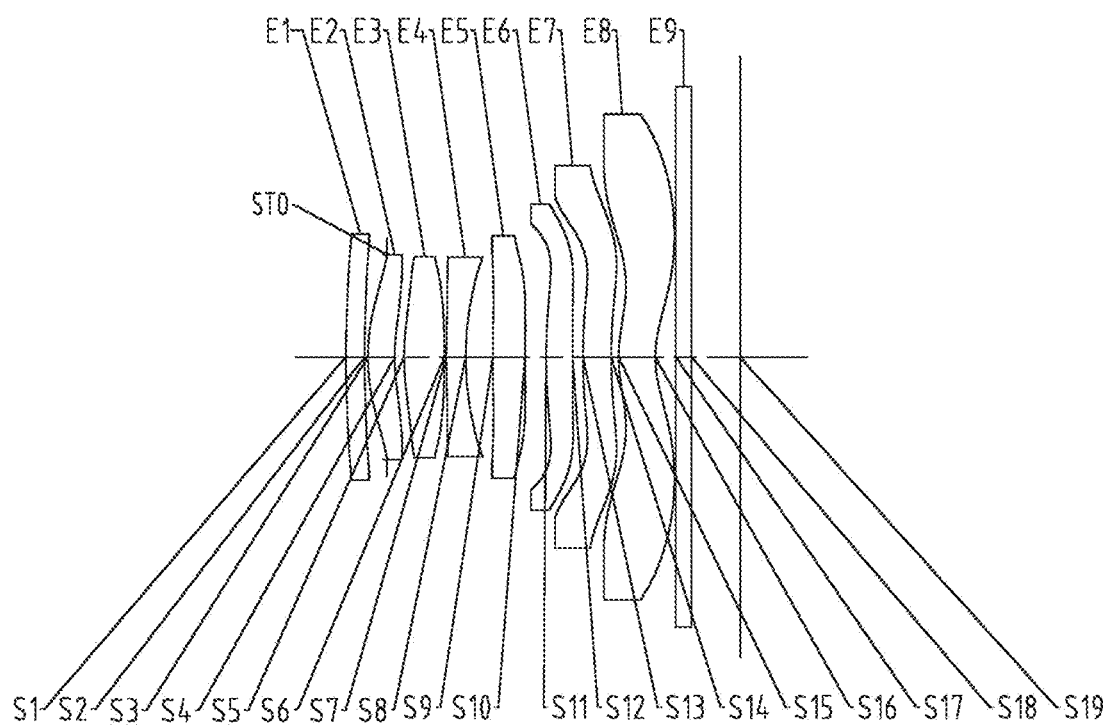
FIG. 3 is a schematic structural diagram of an optical imaging lens assembly according to a second embodiment of the present disclosure.

FIG. 3 is a schematic structural diagram of the optical imaging lens assembly according to the second embodiment of the present disclosure. As shown in FIG. 3, the optical imaging lens assembly according to the second embodiment includes first to eighth lenses E1-E8 having respective object-side surfaces and respective image-side surfaces.

In this embodiment, each of the first lens, the second lens, the third lens, the fifth lens, and the sixth lens has a positive focal power. Each of the fourth lens, the seventh lens, and the eighth lens has a negative focal power. Table 4 below shows the surface type, the radius of curvature, the thickness, the material and the conic coefficient of each lens of the optical imaging lens assembly in the second embodiment. Table 5 shows the high-order coefficients of the aspheric mirror surfaces in the second embodiment. Table 6 shows the effective focal lengths f1-f8 of the lenses in the second embodiment, the effective focal length f of the optical imaging lens assembly, the half of the maximal field-of-view HFOV of the optical imaging lens assembly, and the optical-axis distance TTL from the object-side surface S1 of the first lens E1 to the image plane S19 of the optical imaging lens assembly. The surface type of each aspheric surface may be defined by the formula (1) given in the first embodiment.

TABLE 4

| surface number | surface type | radius of curvature | Thickness | material refractive index | abbe number | conic coefficient |
|---|---|---|---|---|---|---|
| OBJ | spherical | infinite | Infinite | | | |
| S1 | aspheric | 12.4451 | 0.2500 | 1.64 | 23.8 | −24.4053 |
| S2 | aspheric | 13.2216 | 0.3000 | | | −30.5456 |
| STO | spherical | infinite | −0.2559 | | | |
| S3 | aspheric | 1.8497 | 0.3615 | 1.55 | 56.1 | −14.8503 |
| S4 | aspheric | 2.0847 | 0.1245 | | | −18.0693 |
| S5 | aspheric | 2.2985 | 0.5418 | 1.55 | 56.1 | −16.4828 |
| S6 | aspheric | −13.7727 | 0.0250 | | | 81.6935 |
| S7 | aspheric | 9.2582 | 0.2600 | 1.67 | 20.4 | 42.1167 |
| S8 | aspheric | 2.8275 | 0.3668 | | | −14.9611 |
| S9 | aspheric | 10.6612 | 0.4325 | 1.65 | 23.5 | −94.0599 |
| S10 | aspheric | 12.0386 | 0.2830 | | | 1.7137 |
| S11 | aspheric | 5.9767 | 0.3555 | 1.55 | 56.1 | −29.0911 |
| S12 | aspheric | −121.4285 | 0.1410 | | | 99.0000 |
| S13 | aspheric | 8.2907 | 0.3780 | 1.65 | 23.5 | −37.1581 |
| S14 | aspheric | 5.1116 | 0.1000 | | | −99.0000 |
| S15 | aspheric | 1.2920 | 0.4925 | 1.55 | 56.1 | −7.0020 |
| S16 | aspheric | 1.0231 | 0.2775 | | | −3.8172 |
| S17 | spherical | infinite | 0.2100 | 1.52 | 64.2 | |
| S18 | spherical | infinite | 0.6530 | | | |
| S19 | spherical | infinite | | | | |

TABLE 5

| surface number | A4 | A6 | A8 | A10 | A12 |
|---|---|---|---|---|---|
| S1 | 1.8300E−02 | −2.5888E−02 | −7.9868E−02 | 2.8215E−01 | −3.9487E−01 |
| S2 | 5.1242E−02 | −2.0409E−01 | 2.8079E−01 | −5.8822E−02 | −3.2140E−01 |
| S3 | 2.6033E−01 | −6.0465E−01 | 9.9339E−01 | −1.1148E+00 | 7.8101E−01 |
| S4 | 4.9951E−02 | −3.0317E−01 | 4.6128E−01 | −5.6186E−01 | 5.1424E−01 |
| S5 | 1.5209E−02 | −1.7425E−01 | 2.4925E−01 | −3.6240E−01 | 4.8655E−01 |
| S6 | −1.0520E−01 | 3.1080E−01 | −8.7298E−01 | 1.3465E+00 | −1.1900E+00 |
| S7 | −8.5516E−02 | 2.5363E−01 | −5.2549E−01 | 2.5802E−01 | 6.2919E−01 |
| S8 | 6.4465E−02 | −3.2827E−02 | 1.2733E−01 | −5.0498E−01 | 8.7832E−01 |
| S9 | −6.5972E−02 | 7.4116E−02 | −1.5307E−01 | 3.0262E−01 | −3.9479E−01 |
| S10 | −8.9412E−02 | −3.3205E−03 | 3.3797E−02 | −8.4890E−02 | 1.3622E−01 |
| S11 | 1.2588E−02 | 7.2812E−02 | −2.3776E−01 | 2.9179E−01 | −2.4574E−01 |
| S12 | 4.1499E−02 | −1.2942E−02 | −3.4339E−02 | 7.4838E−03 | 8.8427E−03 |
| S13 | 1.9201E−01 | −4.0124E−01 | 4.4107E−01 | −3.8966E−01 | 2.2942E−01 |
| S14 | 9.0589E−02 | −1.0264E−01 | 1.4450E−02 | 1.5557E−02 | −9.2215E−03 |
| S15 | −2.2964E−01 | 7.1032E−02 | 2.2913E−04 | −4.7544E−03 | 1.2136E−03 |
| S16 | −1.6785E−01 | 8.7785E−02 | −3.2789E−02 | 8.8755E−03 | −1.6897E−03 |

| surface number | A14 | A16 | A18 | A20 |
|---|---|---|---|---|
| S1 | 3.1033E−01 | −1.4234E−01 | 3.5516E−02 | −3.7207E−03 |
| S2 | 4.6865E−01 | −3.0403E−01 | 9.8483E−02 | −1.2886E−02 |
| S5 | −3.3597E−01 | 8.6468E−02 | −1.2230E−02 | 7.3171E−04 |
| S4 | −2.9235E−01 | 9.5839E−02 | −1.6658E−02 | 1.1911E−03 |
| S3 | −3.5944E−01 | 1.3068E−01 | −2.0548E−02 | 8.1950E−04 |
| S6 | 6.1977E−01 | −1.8763E−01 | 3.0523E−02 | −2.0633E−03 |
| S7 | −1.1726E+00 | 8.5757E−01 | −2.9990E−01 | 4.1209E−02 |
| S8 | −7.9343E−01 | 3.9165E−01 | −9.7230E−02 | 9.1233E−03 |
| S9 | 3.0807E−01 | −1.3684E−01 | 3.1758E−02 | −2.9854E−03 |
| S10 | −1.2479E−01 | 6.4333E−02 | −1.7013E−02 | 1.7842E−03 |
| S11 | 1.4155E−01 | −5.2895E−02 | 1.1384E−02 | −1.0490E−03 |
| S12 | −5.1674E−03 | 1.1542E−03 | −1.2037E−04 | 4.8832E−06 |
| S13 | −8.3675E−02 | 1.8353E−02 | −2.2311E−03 | 1.1580E−04 |
| S14 | 2.4166E−03 | −3.4831E−04 | 2.6631E−05 | −8.4260E−07 |
| S15 | −1.4220E−04 | 7.8402E−06 | −1.1729E−07 | −3.4554E−09 |
| S16 | 2.1503E−04 | −1.7106E−05 | 7.5890E−07 | −1.4197E−08 |

TABLE 6

| f1 (mm) | 293.99 | f7 (mm) | −21.68 |
|---|---|---|---|
| f2 (mm) | 19.45 | f8 (mm) | −25.50 |
| f3 (mm) | 3.65 | f (mm) | 3.89 |
| f4 (mm) | −6.20 | TTL (mm) | 5.30 |
| f5 (mm) | 128.63 | HFOV (°) | 40.1 |
| f6 (mm) | 10.43 | | |

Figure 4A:
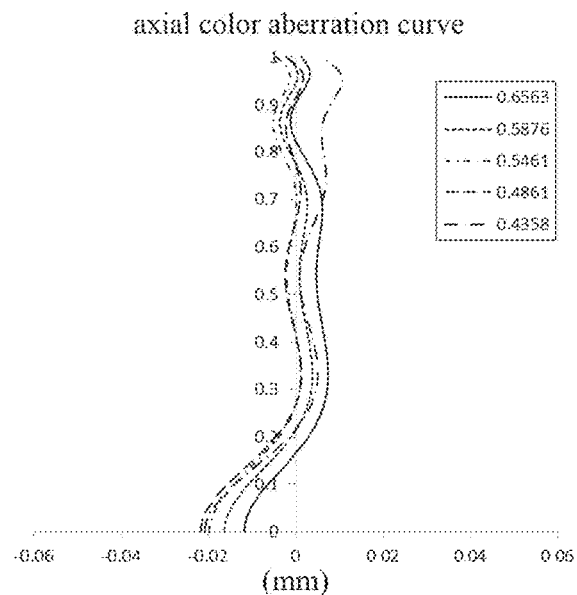
FIGS. 4A-4D respectively illustrate an axial color aberration curve, an astigmatic curve, a distortion curve, and a lateral color aberration curve of the optical imaging lens assembly according to the second embodiment.
Figure 4B:
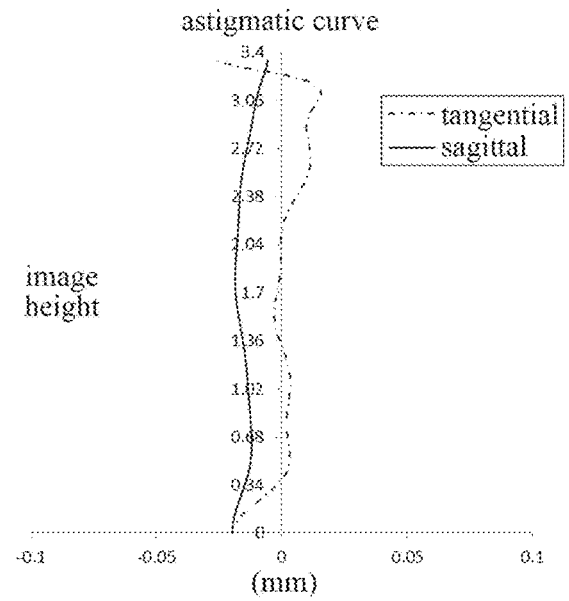
Figure 4C:
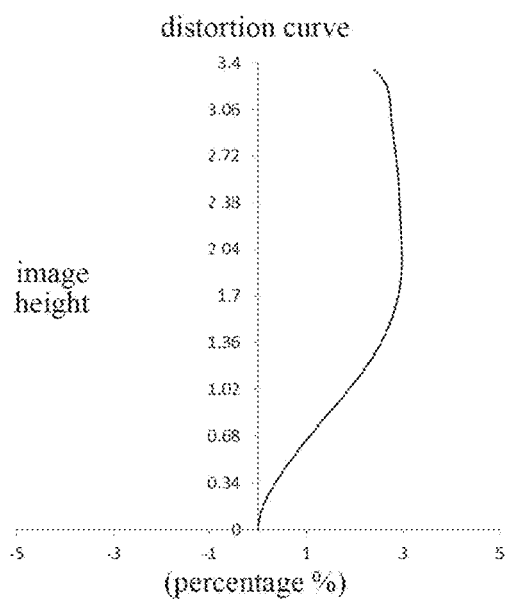
Figure 4D:
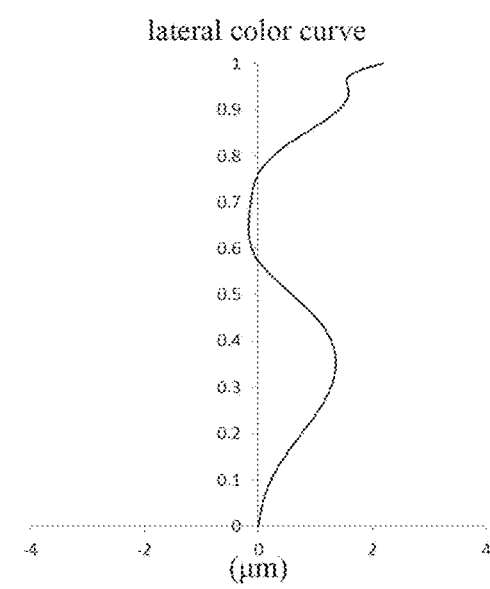

FIG. 4A illustrates an axial color aberration curve of the optical imaging lens assembly according to the second embodiment, representing deviations of focal points where lights of different wavelengths converge after passing through the optical imaging lens assembly. FIG. 4B illustrates an astigmatic curve of the optical imaging lens assembly according to the second embodiment, representing a curvature of a tangential image plane and a curvature of a sagittal image plane. FIG. 4C illustrates a distortion curve of the optical imaging lens assembly according to the second embodiment, representing degrees of distortion at different viewing angles. FIG. 4D illustrates a lateral color curve of the optical imaging lens assembly according to the second embodiment, representing deviations of different image heights on an image plane after lights passes through the optical imaging lens assembly. It can be seen from FIGS. 4A-4D that the optical imaging lens assembly according to the second embodiment can achieve a good image quality.

The Third Embodiment

An optical imaging lens assembly according to the third embodiment of the present disclosure is described below with reference to FIGS. 5-6D.

Figure 5:
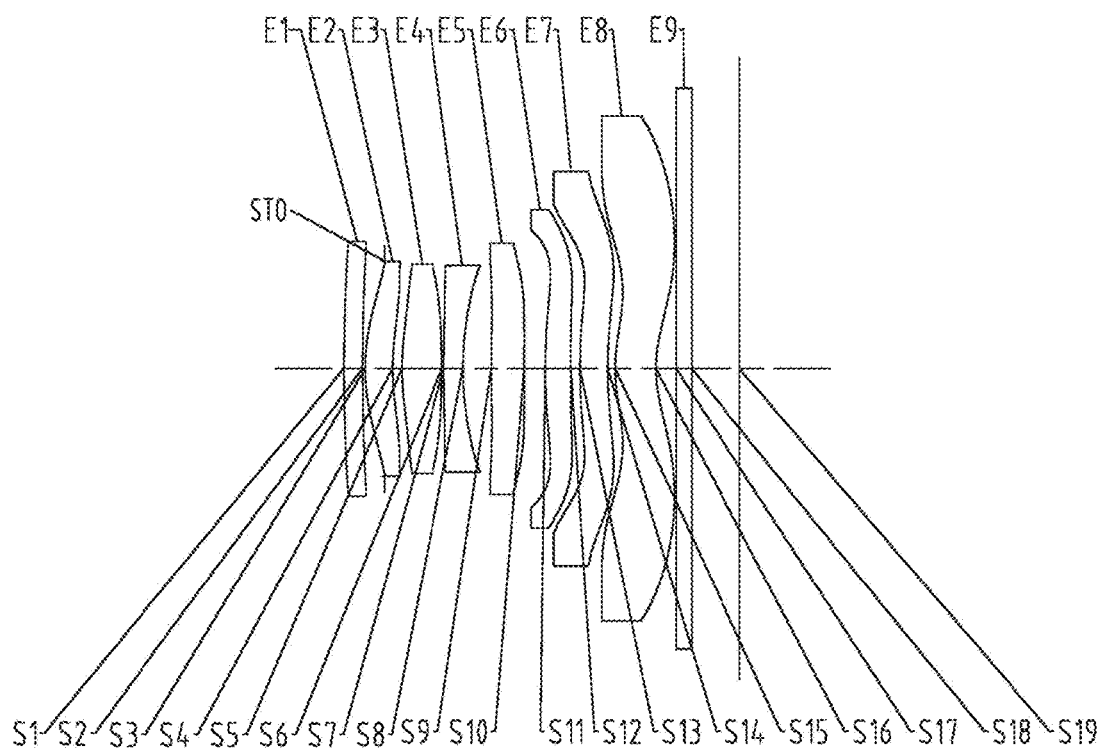
FIG. 5 is a schematic structural diagram of an optical imaging lens assembly according to a third embodiment of the present disclosure.

FIG. 5 is a schematic structural diagram of the optical imaging lens assembly according to the third embodiment of the present disclosure. As shown in FIG. 5, the optical imaging lens assembly according to the third embodiment includes first to eighth lenses E1-E8 having repective object-side surfaces and respective image-side surfaces.

In this embodiment, each of the first lens, the second lens, the third lens, the fifth lens, the sixth lens, and the eighth lens has a positive focal power. Each of the fourth lens, and the seventh lens has a negative focal power.

Table 7 below shows the surface type, the radius of curvature, the thickness, the material and the conic coefficient of each lens of the optical imaging lens assembly in the third embodiment. Table 8 shows the high-order coefficients of the aspheric mirror surfaces in the third embodiment. Table 9 shows the effective focal lengths f1-f8 of the lenses in the third embodiment, the effective focal length f of the optical imaging lens assembly, the half of the maximal field-of-view HFOV of the optical imaging lens assembly, and the optical-axis distance TTL from the object-side surface S1 of the first lens E1 to the image plane S19 of the optical imaging lens assembly. The surface type of each aspheric surface may be defined by the formula (1) given in the first embodiment.

TABLE 7

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 15.8474 | 0.2500 | 1.64 | 23.8 | −24.8345 |
| S2 | aspheric | 17.8793 | 0.3000 | | | −37.2277 |
| STO | spherical | infinite | −0.2628 | | | |
| S3 | aspheric | 1.8560 | 0.3686 | 1.55 | 56.1 | −14.6476 |
| S4 | aspheric | 2.1077 | 0.1272 | | | −18.0807 |
| S5 | aspheric | 2.3250 | 0.5423 | 1.55 | 56.1 | −16.5339 |
| S6 | aspheric | −13.9349 | 0.0250 | | | 81.7327 |
| S7 | aspheric | 9.1928 | 0.2600 | 1.67 | 20.4 | 41.8299 |
| S8 | aspheric | 2.8100 | 0.3843 | | | −14.9439 |
| S9 | aspheric | 11.6407 | 0.4428 | 1.65 | 23.5 | −99.0000 |
| S10 | aspheric | 13.0170 | 0.2850 | | | 4.6782 |
| S11 | aspheric | 5.5780 | 0.3447 | 1.55 | 56.1 | −26.5711 |
| S12 | aspheric | 69.7384 | 0.1251 | | | −99.0000 |
| S13 | aspheric | 8.1669 | 0.3727 | 1.65 | 23.5 | −27.9773 |
| S14 | aspheric | 4.0593 | 0.1000 | | | −68.3969 |
| S15 | aspheric | 1.3073 | 0.5482 | 1.55 | 56.1 | −6.9808 |
| S16 | aspheric | 1.1231 | 0.2750 | | | −3.4225 |
| S17 | spherical | infinite | 0.2100 | 1.52 | 64.2 | |
| S18 | spherical | infinite | 0.6506 | | | |
| S19 | spherical | infinite | | | | |

TABLE 8

| surface number | A4 | A6 | A8 | A10 | A12 |
|---|---|---|---|---|---|
| S1 | 1.9336E−02 | −3.1201E−02 | −5.7429E−02 | 2.2347E−01 | −3.0713E−01 |
| S2 | 5.1110E−02 | −2.0614E−01 | 2.9430E−01 | −1.1557E−01 | −1.9910E−01 |
| S3 | 2.5482E−01 | −5.8544E−01 | 9.4425E−01 | −1.0354E+00 | 7.1106E−01 |
| S4 | 4.6132E−02 | −2.7631E−01 | 3.8108E−01 | −4.2231E−01 | 3.7294E−01 |
| S5 | 1.3104E−02 | −1.5971E−01 | 2.0283E−01 | −2.6928E−01 | 3.7272E−01 |
| S6 | −1.0760E−01 | 3.1023E−01 | −8.2753E−01 | 1.2370E+00 | −1.0665E+00 |
| S7 | −8.8603E−02 | 2.5218E−01 | −5.0298E−01 | 2.6932E−01 | 4.9109E−01 |
| S8 | 6.2704E−02 | −1.4998E−02 | 2.3099E−02 | −1.9239E−01 | 3.5441E−01 |
| S9 | −6.3786E−02 | 7.1626E−02 | −1.5292E−01 | 3.0005E−01 | −3.8564E−01 |
| S10 | −8.4667E−02 | −1.5971E−02 | 6.8408E−02 | −1.3859E−01 | 1.8547E−01 |
| S11 | 1.3497E−02 | 6.7121E−02 | −2.3444E−01 | 3.0644E−01 | −2.6963E−01 |
| S12 | 6.2265E−02 | −6.1782E−02 | 1.6058E−02 | −1.9614E−02 | 1.6635E−02 |
| S13 | 1.9647E−01 | −4.0935E−01 | 4.4367E−01 | −3.8332E−01 | 2.2279E−01 |
| S14 | 7.5709E−02 | −8.9808E−02 | 9.8010E−03 | 1.6184E−02 | −9.0853E−03 |

TABLE 8-continued

| | | | | |
|---|---|---|---|---|
| S15 | −2.0415E−01 | 4.4857E−02 | 1.3165E−02 | −8.5048E−03 | 1.8974E−03 |
| S16 | −1.6916E−01 | 8.7763E−02 | −3.3253E−02 | 9.2151E−03 | −1.7940E−03 |

| surface number | A14 | A16 | A18 | A20 |
|---|---|---|---|---|
| S1 | 2.3366E−01 | −1.0348E−01 | 2.4928E−02 | −2.5220E−03 |
| S2 | 3.2604E−01 | −2.1160E−01 | 6.7069E−02 | −8.5181E−03 |
| S3 | −3.0112E−01 | 7.6522E−02 | −1.0707E−02 | 6.3430E−04 |
| S4 | −2.0970E−01 | 6.8344E−02 | −1.1824E−02 | 8.4223E−04 |
| S5 | −2.8112E−01 | 1.0231E−01 | −1.5845E−02 | 5.9333E−04 |
| S6 | 5.4288E−01 | −1.6079E−01 | 2.5606E−02 | −1.6956E−03 |
| S7 | −9.4198E−01 | 6.7995E−01 | −2.3311E−01 | 3.1346E−02 |
| S8 | −2.7665E−01 | 9.4312E−02 | −5.4135E−03 | −2.5824E−03 |
| S9 | 2.9633E−01 | −1.2951E−01 | 2.9555E−02 | −2.7309E−03 |
| S10 | −1.5179E−01 | 7.2673E−02 | −1.8284E−02 | 1.8506E−03 |
| S11 | 1.5868E−01 | −5.9520E−02 | 1.2700E−02 | −1.1524E−03 |
| S12 | −6.2776E−03 | 1.1978E−03 | −1.1428E−04 | 4.3507E−06 |
| S13 | −8.0874E−02 | 1.7735E−02 | −2.1599E−03 | 1.1239E−04 |
| S14 | 2.3341E−03 | −3.3129E−04 | 2.4963E−05 | −7.7861E−07 |
| S15 | −2.2196E−04 | 1.3641E−05 | −3.5795E−07 | 9.1772E−10 |
| S16 | 2.3248E−04 | −1.8754E−05 | 8.4109E−07 | −1.5873E−08 |

TABLE 9

| | | | |
|---|---|---|---|
| f1 (mm) | 207.81 | f7 (mm) | −12.97 |
| f2 (mm) | 18.74 | f8 (mm) | 281.29 |
| f3 (mm) | 3.69 | f (mm) | 3.94 |
| f4 (mm) | −6.16 | TTL (mm) | 5.35 |
| f5 (mm) | 151.57 | HFOV (°) | 39.7 |
| f6 (mm) | 11.07 | | |

Figures 6A, 6B:
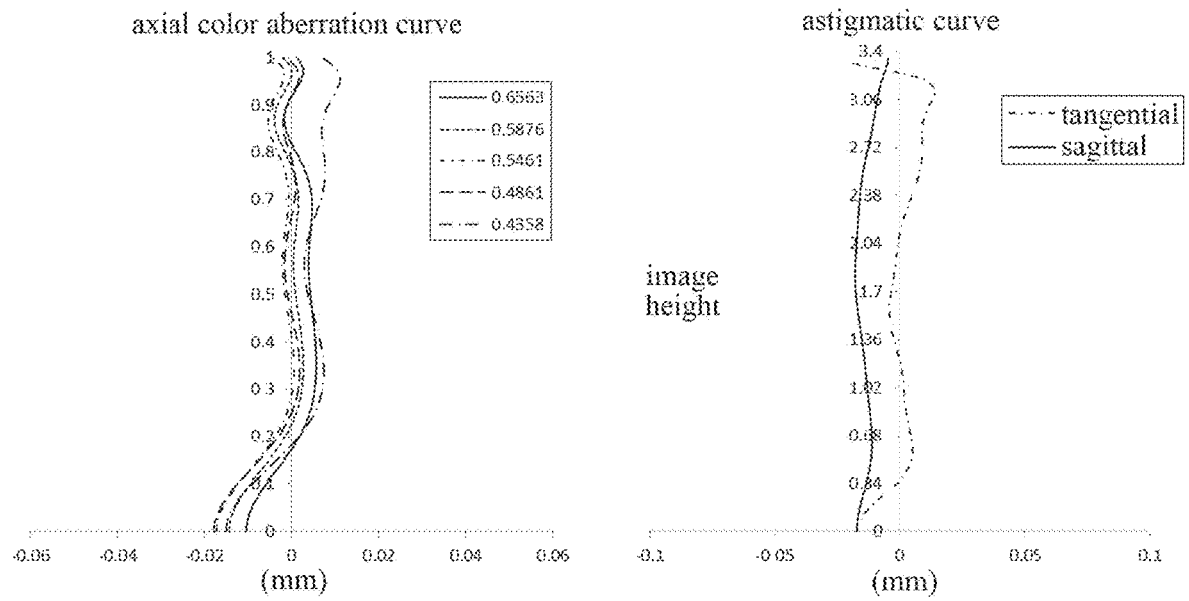
FIGS. 6A-6D respectively illustrate an axial color aberration curve, an astigmatic curve, a distortion curve, and a lateral color aberration curve of the optical imaging lens assembly according to the third embodiment.
Figures 6C, 6D:
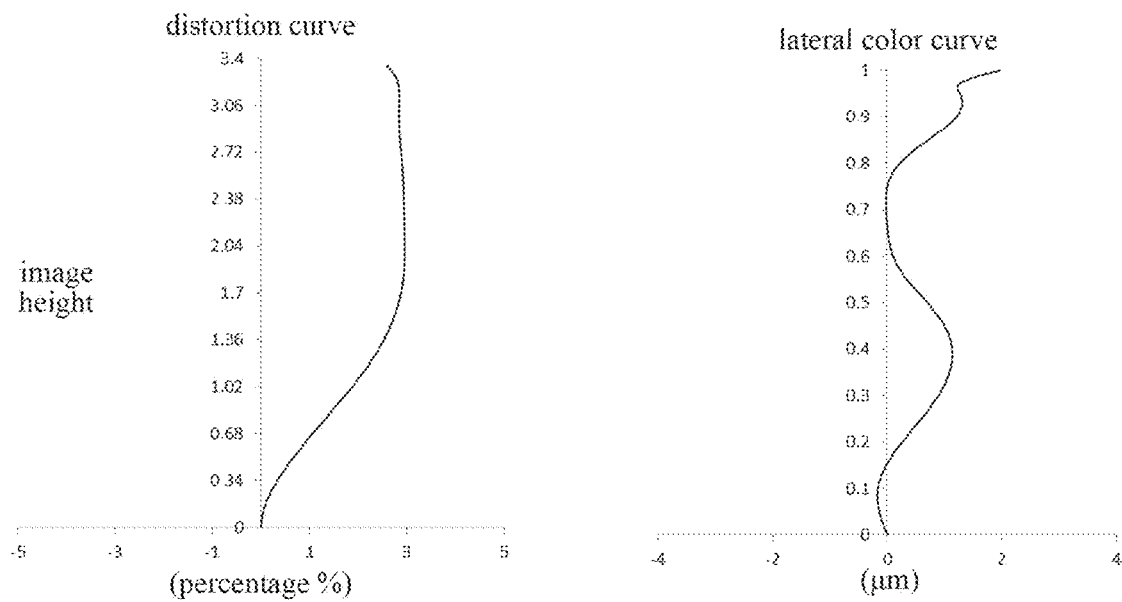

FIG. 6A illustrates an axial color aberration curve of the optical imaging lens assembly according to the third embodiment, representing deviations of focal points where lights of different wavelengths converge after passing through the optical imaging lens assembly. FIG. 6B illustrates an astigmatic curve of the optical imaging lens assembly according to the third embodiment, representing a curvature of a tangential image plane and a curvature of a sagittal image plane. FIG. 6C illustrates a distortion curve of the optical imaging lens assembly according to the third embodiment, representing degrees of distortion at different viewing angles. FIG. 6D illustrates a lateral color curve of the optical imaging lens assembly according to the third embodiment, representing deviations of different image heights on an image plane after lights pass through the optical imaging lens assembly. It can be seen from FIGS. 6A-6D that the optical imaging lens assembly according to the third embodiment can achieve a good image quality.

Fourth Embodiment

An optical imaging lens assembly according to a fourth embodiment of the present disclosure is described below with reference to FIGS. 7-8D.

Figure 7:
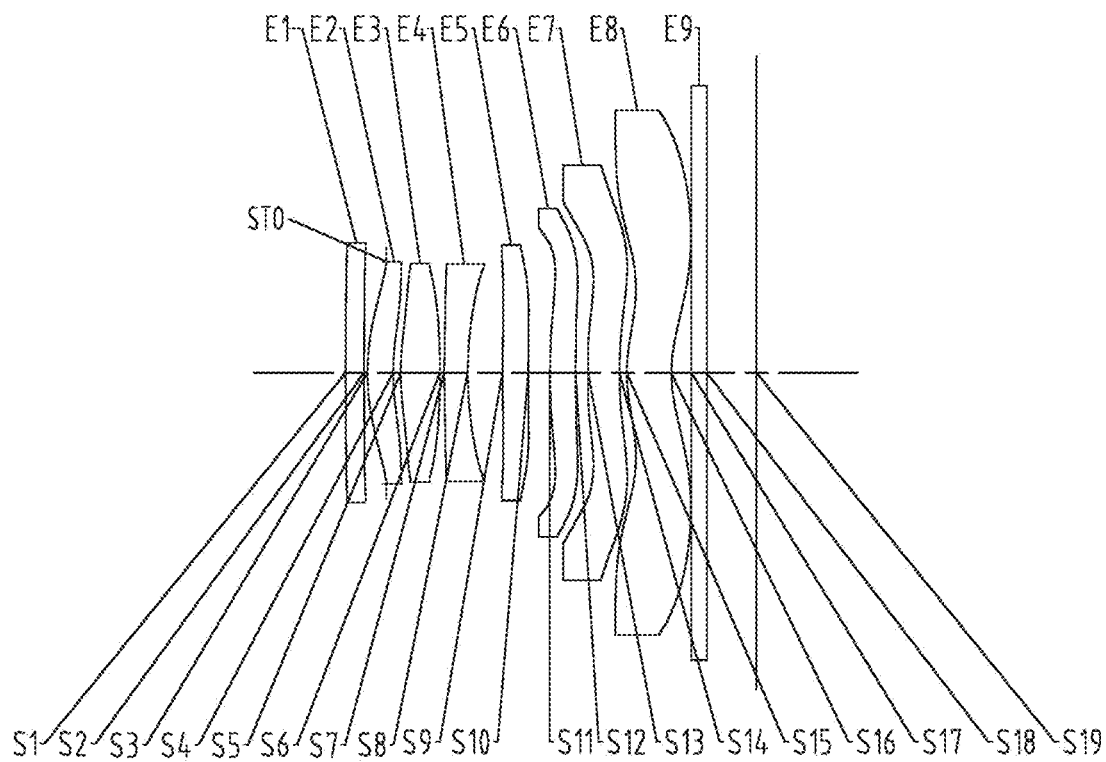
FIG. 7 is a schematic structural diagram of an optical imaging lens assembly according to a fourth embodiment of the present disclosure.

FIG. 7 is a schematic structural diagram of the optical imaging lens assembly according to the fourth embodiment of the present disclosure. As shown in FIG. 7, the optical imaging lens assembly according to the fourth embodiment includes first to eighth lenses E1-E8 having respective object-side surfaces and respective image-side surfaces.

In this embodiment, each of the first lens, the second lens, the third lens, the sixth lens, and the eighth lens has a positive focal power. Each of the fourth lens, the fifth lens, and the seventh lens has a negative focal power.

Table 10 below shows the surface type, the radius of curvature, the thickness, the material and the conic coefficient of each lens of the optical imaging lens assembly in the fourth embodiment. Table 11 shows the high-order coefficients of the aspheric mirror surfaces in the fourth embodiment. Table 12 shows the effective focal lengths f1-f8 of the lenses in the fourth embodiment, the effective focal length f of the optical imaging lens assembly, the half of the maximal field-of-view HFOV of the optical imaging lens assembly, and the optical-axix distance TTL from the object-side surface S1 of the first lens E1 to the image plane S19 of the optical imaging lens assembly. The surface type of each aspheric surface may be defined by the formula (1) given in the first embodiment.

TABLE 10

| | | | | Material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 40.0000 | 0.2500 | 1.64 | 23.8 | −225.8938 |
| S2 | aspheric | 122.6582 | 0.3000 | | | −99.0000 |
| STO | spherical | infinite | −0.2545 | | | |
| S3 | aspheric | 1.9851 | 0.3454 | 1.55 | 56.1 | −15.0576 |
| S4 | aspheric | 2.0506 | 0.1031 | | | −16.1597 |
| S5 | aspheric | 2.4196 | 0.5247 | 1.55 | 56.1 | −17.1049 |
| S6 | aspheric | −12.8473 | 0.0590 | | | 78.2577 |
| S7 | aspheric | 8.5808 | 0.3146 | 1.67 | 20.4 | 40.3223 |
| S8 | aspheric | 3.0910 | 0.4686 | | | −17.5113 |
| S9 | aspheric | 9.3997 | 0.3480 | 1.65 | 23.5 | −93.5229 |
| S10 | aspheric | 9.0608 | 0.2908 | | | 0.4254 |
| S11 | aspheric | 4.8227 | 0.3466 | 1.55 | 56.1 | −32.5684 |
| S12 | aspheric | 18.1550 | 0.1682 | | | 58.0172 |
| S13 | aspheric | 8.9414 | 0.4203 | 1.65 | 23.5 | −15.9950 |
| S14 | aspheric | 3.5922 | 0.1000 | | | −46.5965 |
| S15 | aspheric | 1.3129 | 0.5992 | 1.55 | 56.1 | −6.3593 |
| S1 | aspheric | 1.2158 | 0.2706 | | | −3.1941 |
| S17 | spherical | infinite | 0.2100 | 1.52 | 64.2 | |
| S18 | spherical | infinite | 0.6653 | | | |
| S19 | spherical | infinite | | | | |

TABLE 11

| surface number | A4 | A6 | A8 | A10 | A12 |
|---|---|---|---|---|---|
| S1 | 1.1831E−02 | −2.4531E−02 | −4.2902E−02 | 1.6664E−01 | −2.2075E−01 |
| S2 | 6.6925E−02 | −2.5085E−01 | 4.1083E−01 | −3.5810E−01 | 1.4917E−01 |
| S3 | 2.4449E−01 | −5.5151E−01 | 8.4199E−01 | −8.7585E−01 | 5.7469E−01 |
| S4 | 5.1225E−02 | −2.3457E−01 | 2.0072E−01 | −1.4196E−01 | 1.5474E−01 |
| S5 | 1.0290E−02 | −1.1658E−01 | 6.3851E−02 | −8.3207E−02 | 2.5259E−01 |
| S6 | −1.0737E−01 | 1.6516E−01 | −2.9449E−01 | 3.7231E−01 | −2.9087E−01 |
| S7 | −1.0323E−01 | 1.5921E−01 | −2.3953E−01 | 2.1279E−01 | −6.1339E−02 |
| S8 | 4.5794E−02 | 5.1733E−03 | −9.1739E−02 | 2.4047E−01 | −4.0301E−01 |
| S9 | −5.8318E−02 | 9.2929E−02 | −2.1623E−01 | 3.5547E−01 | −3.7517E−01 |
| S10 | −1.0926E−01 | 1.1848E−01 | −2.2035E−01 | 2.5554E−01 | −1.7132E−01 |
| S11 | −3.1611E−02 | 1.7486E−01 | −3.5440E−01 | 3.6707E−01 | −2.5064E−01 |
| S12 | 2.5543E−02 | 1.8013E−02 | −1.0077E−01 | 8.8172E−02 | −4.1290E−02 |
| S13 | 1.9604E−01 | −3.5758E−01 | 3.4727E−01 | −2.7071E−01 | 1.4393E−01 |
| S14 | 8.4834E−02 | −1.0223E−01 | 3.4104E−02 | −4.2292E−03 | −2.5566E−04 |
| S15 | −1.6140E−01 | 2.0188E−02 | 1.6084E−02 | −6.9677E−03 | 1.2238E−03 |
| S16 | −1.4815E−01 | 6.7781E−02 | −2.3101E−02 | 6.0271E−03 | −1.1403E−03 |

| surface number | A14 | A16 | A18 | A20 |
|---|---|---|---|---|
| S1 | 1.6133E−01 | −6.8883E−02 | 1.6092E−02 | −1.5889E−03 |
| S2 | 9.4079E−03 | −3.9129E−02 | 1.5889E−02 | −2.1672E−03 |
| S3 | −2.3295E−01 | 5.6632E−02 | −7.5735E−03 | 4.2869E−04 |
| S4 | −1.1666E−01 | 4.6614E−02 | −9.2927E−03 | 7.3468E−04 |
| S5 | −2.5696E−01 | 1.1532E−01 | −2.3639E−02 | 1.7551E−03 |
| S6 | 1.3638E−01 | −3.7253E−02 | 5.4626E−03 | −3.3280E−04 |
| S7 | −7.1783E−02 | 8.6799E−02 | −3.7005E−02 | 5.7623E−03 |
| S8 | 4.3977E−01 | −2.8534E−01 | 9.9860E−02 | −1.4373E−02 |
| S9 | 2.4292E−01 | −9.1708E−02 | 1.8405E−02 | −1.5139E−03 |
| S10 | 5.9550E−02 | −5.8662E−03 | −1.8045E−03 | 3.7446E−04 |
| S11 | 1.1574E−01 | −3.5419E−02 | 6.4820E−03 | −5.2632E−04 |
| S12 | 1.1775E−02 | −2.0218E−03 | 1.9079E−04 | −7.5647E−06 |
| S13 | −4.8080E−02 | 9.6945E−03 | −1.0818E−03 | 5.1402E−05 |
| S14 | 1.5345E−04 | −2.1283E−05 | 1.3993E−06 | −3.7699E−08 |
| S15 | −1.0239E−04 | 2.4540E−06 | 1.7964E−07 | −9.4393E−09 |
| S16 | 1.4517E−04 | −1.1509E−05 | 5.0565E−07 | −9.3109E−09 |

TABLE 12

| f1 (mm) | 92.59 | f7 (mm) | −9.61 |
|---|---|---|---|
| f2 (mm) | 39.72 | f8 (mm) | 25.46 |
| f3 (mm) | 3.77 | f (mm) | 4.11 |
| f4 (mm) | −7.41 | TTL (mm) | 5.53 |
| f5 (mm) | −652.32 | HFOV (°) | 38.9 |
| f6 (mm) | 11.91 | | |

Figure 8A:
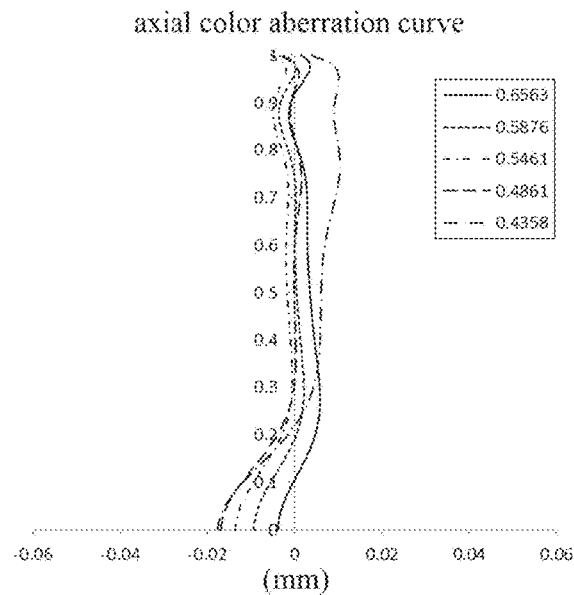
FIGS. 8A-8D respectively illustrate an axial color aberration curve, an astigmatic curve, a distortion curve, and a lateral color aberration curve of the optical imaging lens assembly according to the fourth embodiment.
Figure 8B:
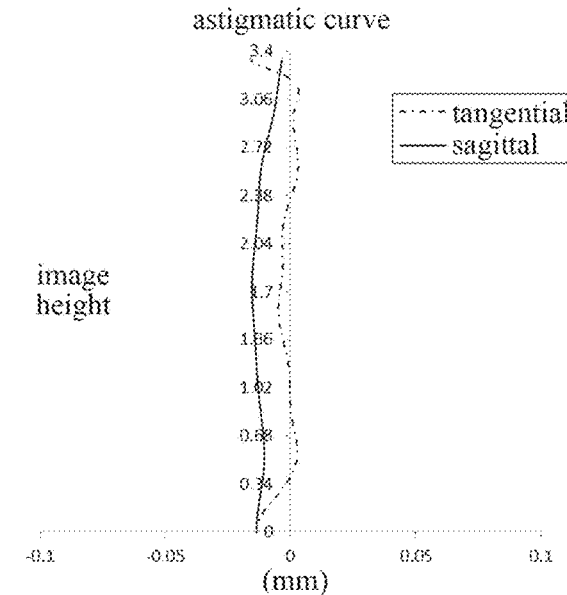
Figure 8C:
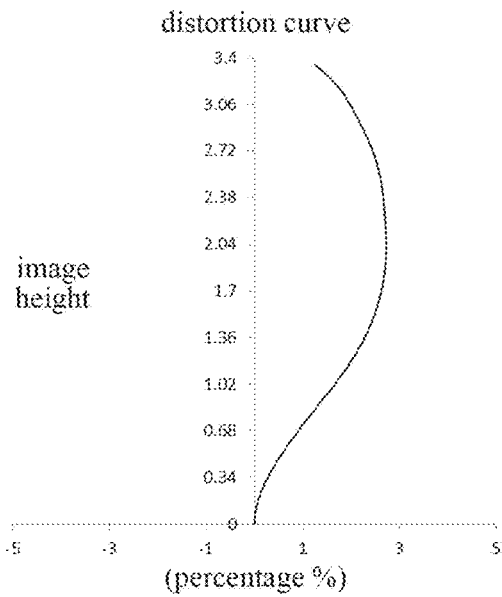
Figure 8D:
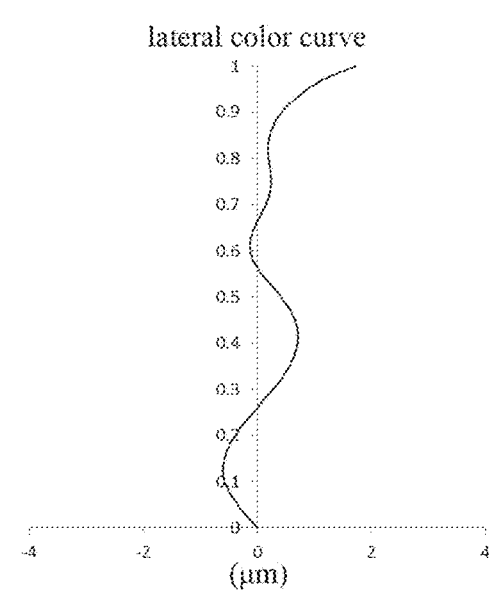

FIG. 8A illustrates an axial color aberration curve of the optical imaging lens assembly according to the fourth embodiment, representing deviations of focal points where lights of different wavelengths converge after passing through the optical imaging lens assembly. FIG. 8B illustrates an astigmatic curve of the optical imaging lens assembly according to the fourth embodiment, representing a curvature of a tangential image plane and a curvature of a sagittal image plane. FIG. 8C illustrates a distortion curve of the optical imaging lens assembly according to the fourth embodiment, representing degrees of distortion at different viewing angles. FIG. 8D illustrates a lateral color curve of the optical imaging lens assembly according to the fourth embodiment, representing deviations of different image heights on an image plane after lights pass through the optical imaging lens assembly. It can be seen from FIGS. 8A-8D that the optical imaging lens assembly according to the fourth embodiment can achieve a good image quality.

Fifth Embodiment

An optical imaging lens assembly according to a fifth embodiment of the present disclosure is described below with reference to FIGS. 9-10D.

Figure 9:
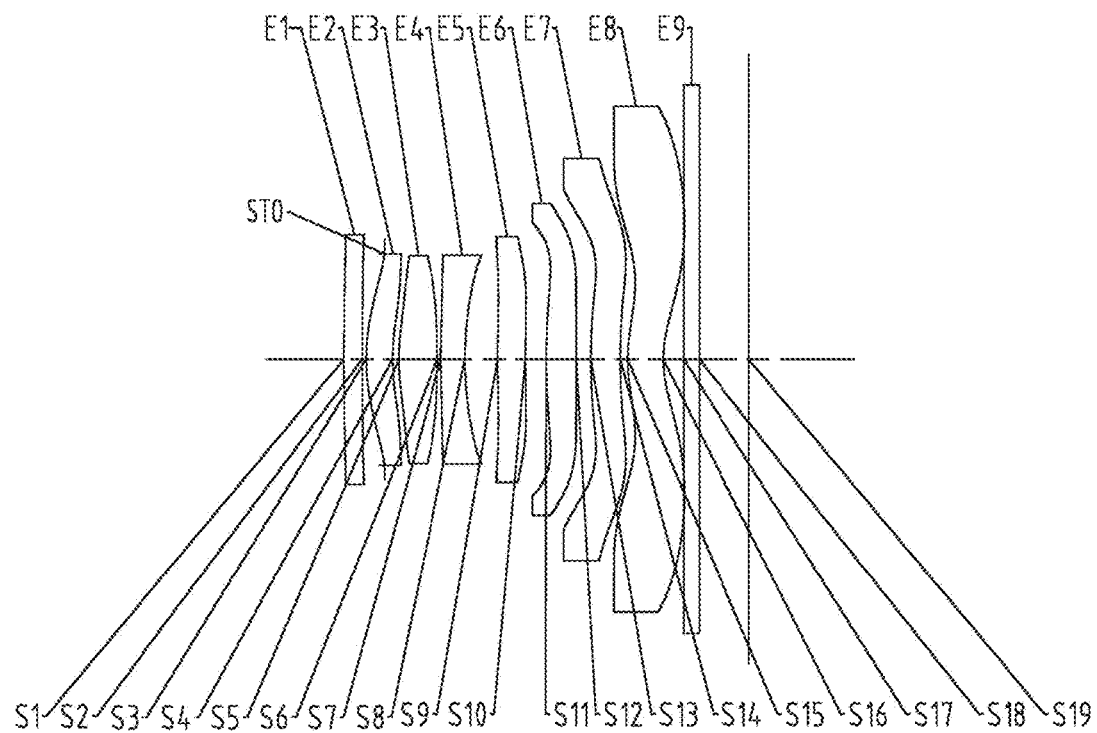
FIG. 9 is a schematic structural diagram of an optical imaging lens assembly according to a fifth embodiment of the present disclosure.

FIG. 9 is a schematic structural diagram of the optical imaging lens assembly according to the fifth embodiment of the present disclosure. As shown in FIG. 9, the optical imaging lens assembly according to the fifth embodiment includes first to eighth lenses E1-E8 having respective object-side surfaces and respective image-side surfaces.

In this embodiment, each of the first lens, the second lens, the third lens, the sixth lens, and the seventh lens has a positive focal power. Each of the fourth lens, the fifth lens, and the eighth lens has a negative focal power.

Table 13 below shows the surface type, the radius of curvature, the thickness, the material and the conic coefficient of each lens of the optical imaging lens assembly in the fifth embodiment. Table 14 shows the high-order coefficients of the aspheric mirror surfaces in the fifth embodiment. Table 15 shows the effective focal lengths f1-f8 of the lenses in the fifth embodiment, the effective focal length f of the optical imaging lens assembly, the half of the maximal field-of-view HFOV of the optical imaging lens assembly, and the optical-axis distance TTL from the object-side surface S1 of the first lens E1 to the image plane S19 of the optical imaging lens assembly. The surface type of each aspheric surface may be defined by the formula (1) given in the first embodiment.

TABLE 13

| surface number | surface type | radius of curvature | thickness | material refractive index | abbe number | conic coefficient |
|---|---|---|---|---|---|---|
| OBT | spherical | infinite | infinite | | | |
| S1 | aspheric | 31.9514 | 0.2500 | 1.64 | 23.8 | −133.8765 |
| S2 | aspheric | 80.7125 | 0.3000 | | | 99.0000 |
| STO | spherical | infinite | −0.2450 | | | |
| S3 | aspheric | 1.9934 | 0.3559 | 1.55 | 56.1 | −15.4778 |
| S4 | aspheric | 1.9073 | 0.0880 | | | −16.5029 |
| S5 | aspheric | 2.2267 | 0.5265 | 1.55 | 56.1 | −16.6828 |
| S6 | aspheric | −14.3531 | 0.0484 | | | 88.7543 |
| S7 | aspheric | 8.9155 | 0.3271 | 1.67 | 20.4 | 42.4148 |
| S8 | aspheric | 3.1984 | 0.4466 | | | −17.3344 |
| S9 | aspheric | 10.0147 | 0.3770 | 1.65 | 23.5 | −99.0000 |
| S10 | aspheric | 8.5949 | 0.2813 | | | −0.4524 |
| S11 | aspheric | 5.6281 | 0.4112 | 1.55 | 56.1 | −38.5387 |
| S12 | aspheric | 300.0000 | 0.1977 | | | 99.0000 |
| S13 | aspheric | 8.0768 | 0.3995 | 1.65 | 23.5 | −25.9402 |
| S14 | aspheric | 8.3277 | 0.1000 | | | −40.7698 |
| S15 | aspheric | 1.4541 | 0.4838 | 1.55 | 56.1 | −6.2464 |
| S16 | aspheric | 1.0389 | 0.2825 | | | −3.7504 |
| S17 | spherical | infinite | 0.2100 | 1.52 | 64.2 | |
| S18 | spherical | infinite | 0.6772 | | | |
| S19 | spherical | infinite | | | | |

TABLE 14

| surface number | A4 | A6 | A8 | A10 | A12 |
|---|---|---|---|---|---|
| S1 | 1.5905E−02 | −3.8154E−02 | −3.2506E−02 | 1.9625E−01 | −2.9503E−01 |
| S2 | 7.2785E−02 | −3.0145E−01 | 5.5459E−01 | −5.5965E−01 | 3.0162E−01 |
| S3 | 2.4722E−01 | −6.0521E−01 | 1.0015E+00 | −1.1019E+00 | 7.5323E−01 |
| S4 | 8.4937E−02 | −3.7337E−01 | 4.3955E−01 | −3.7703E−01 | 3.0285E−01 |
| S5 | 2.6568E−02 | −1.6171E−01 | 8.1893E−02 | −1.8719E−02 | 1.6417E−01 |
| S6 | −1.1895E−01 | 2.2023E−01 | −4.3880E−01 | 5.9609E−01 | −5.0186E−01 |
| S7 | −1.0653E−01 | 1.9760E−01 | −3.2580E−01 | 2.6992E−01 | 1.8474E−02 |
| S8 | 4.4553E−02 | 1.1975E−02 | −9.3798E−02 | 2.0072E−01 | −3.0349E−01 |
| S9 | −6.2612E−02 | 9.7560E−02 | −2.3491E−01 | 4.0744E−01 | −4.5176E−01 |
| S10 | −1.0104E−01 | 8.3646E−02 | −1.5243E−01 | 1.6955E−01 | −9.9552E−02 |
| S11 | −1.1823E−02 | 9.1324E−02 | −2.0684E−01 | 2.0499E−01 | −1.3897E−01 |
| S12 | −8.2278E−03 | 4.4702E−02 | −9.2580E−02 | 6.1770E−02 | −2.3092E−02 |
| S13 | 1.5853E−01 | −2.7508E−01 | 2.4197E−01 | −1.8442E−01 | 9.8714E−02 |
| S14 | 1.1264E−01 | −1.3410E−01 | 4.8345E−02 | −6.5159E−03 | −7.1234E−04 |
| S15 | −1.9049E−01 | 4.5272E−02 | 3.1217E−03 | −2.3355E−03 | 1.0529E−04 |
| S16 | −1.4297E−01 | 6.5908E−02 | −2.0948E−02 | 4.8272E−03 | −8.0119E−04 |

| surface number | A14 | A16 | A18 | A20 |
|---|---|---|---|---|
| S1 | 2.3460E−01 | −1.0698E−01 | 2.6428E−02 | −2.7452E−03 |
| S2 | −4.7517E−02 | −3.5843E−02 | 2.0332E−02 | −3.2042E−03 |
| S3 | −3.1571E−01 | 7.9033E−02 | −1.0854E−02 | 6.2968E−04 |
| S4 | −1.7795E−01 | 6.2715E−02 | −1.1715E−02 | 8.9268E−04 |
| S5 | −2.1179E−01 | 1.0559E−01 | −2.3164E−02 | 1.8231E−03 |
| S6 | 2.5476E−01 | −7.5513E−02 | 1.2021E−02 | −7.9453E−04 |
| S7 | −2.5959E−01 | 2.3987E−01 | −9.4912E−02 | 1.4219E−02 |
| S8 | 3.2530E−01 | −2.1397E−01 | 7.6702E−02 | −1.1320E−02 |
| S9 | 3.0674E−01 | −1.2146E−01 | 2.5574E−02 | −2.2073E−03 |
| S10 | 2.0465E−02 | 7.5529E−03 | −4.4315E−03 | 5.9633E−04 |
| S11 | 6.9955E−02 | −2.2458E−02 | 4.6324E−03 | −4.2320E−04 |
| S12 | 5.5585E−03 | −8.6524E−04 | 7.8700E−05 | −3.1275E−06 |
| S13 | −3.3101E−02 | 6.6768E−03 | −7.4593E−04 | 3.5615E−05 |
| S14 | 4.3841E−04 | −7.6366E−05 | 6.3279E−06 | −2.0919E−07 |
| S15 | 7.3348E−05 | −1.4600E−05 | 1.1025E−06 | −3.0651E−08 |
| S16 | 9.1557E−05 | −6.6993E−06 | 2.7737E−07 | −4.8739E−09 |

TABLE 15

| | | | |
|---|---|---|---|
| f1 (mm) | 82.43 | f7 (mm) | 255.86 |
| f2 (mm) | 175.42 | f8 (mm) | −11.32 |
| f3 (mm) | 3.57 | f (mm) | 4.07 |
| f4 (mm) | −7.65 | TTL (mm) | 5.52 |
| f5 (mm) | −104.91 | HFOV (°) | 39.1 |
| f6 (mm) | 10.49 | | |

Figures 10A, 10B:
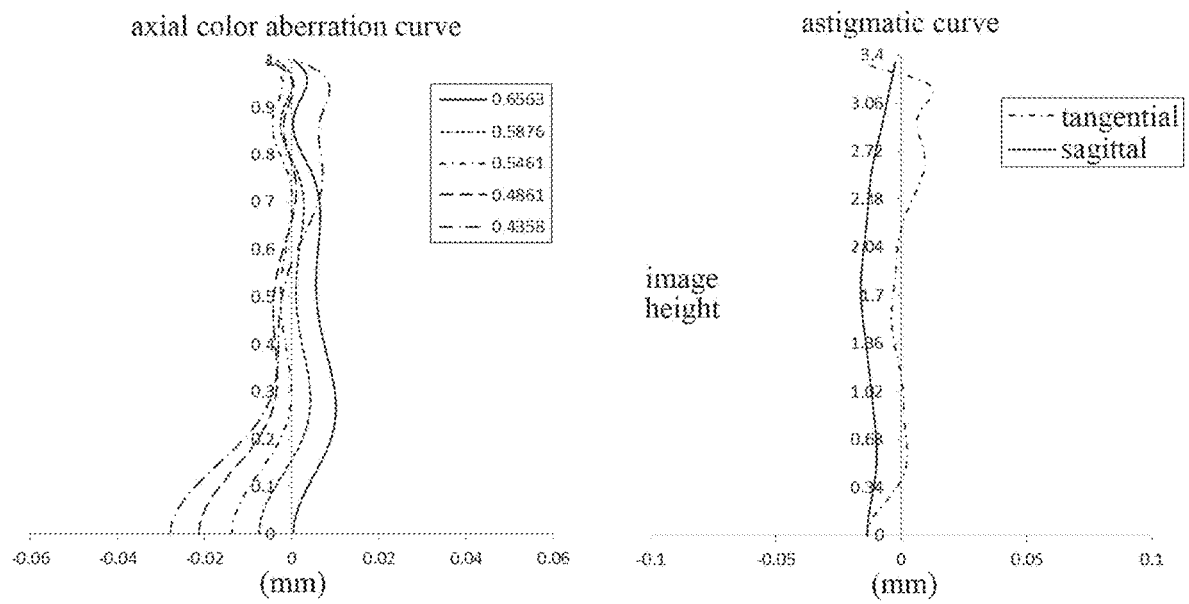

FIG. 10A illustrates an axial color aberration curve of the optical imaging lens assembly according to the fifth embodiment, representing deviations of focal points where lights of different wavelengths converge after passing through the optical imaging lens assembly. FIG. 10B illustrates an astigmatic curve of the optical imaging lens assembly according to the fifth embodiment, representing a curvature of a tangential image plane and a curvature of a sagittal image plane. FIG. 10C illustrates a distortion curve of the optical imaging lens assembly according to the fifth embodiment, representing degress of distortion at different viewing angles. FIG. 10D illustrates a lateral color curve of the optical imaging lens assembly according to the fifth embodiment, representing deviations of different image heights on an image plane after lights pass through the optical imaging lens assembly. It can be seen from FIGS. 10A-10D that the optical imaging lens assembly according to the fifth embodiment can achieve a good image quality.

Sixth Embodiment

An optical imaging lens assembly according to the sixth embodiment of the present disclosure is described below with reference to FIGS. 11-12D.

FIG. 11 is a schematic structural diagram of the optical imaging lens assembly according to the sixth embodiment of the present disclosure. As shown in FIG. 11, the optical imaging lens assembly according to the sixth embodiment includes first to eighth lenses E1-E8 having respective object-side surfaces and respective image-side surfaces.

In this embodiment, each of the first lens, the second lens, the third lens, the fifth lens, and the sixth lens has a positive focal power. Each of the fourth lens, the seventh lens, and the eighth lens has a negative focal power.

Table 16 below shows the surface type, the radius of curvature, the thickness, the material and the conic coefficient of each lens of the optical imaging lens assembly in the sixth embodiment. Table 17 shows the high-order coefficients of the aspheric mirror surfaces in the sixth embodiment. Table 18 shows the effective focal lengths f1-f8 of the lenses in the sixth embodiment, the effective focal length f of the optical imaging lens assembly, the half of the maximal field-of-view HFOV of the optical imaging lens assembly, and the optical-axis distance TTL from the object-side surface S1 of the first lens E1 to the image plane S19 of the optical imaging lens assembly. The surface type of each aspheric surface may be defined by the formula (1) given in the first embodiment.

TABLE 16

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 40.0000 | 0.2500 | 1.55 | 56.1 | −21.3820 |
| S2 | aspheric | 40.1123 | 0.3000 | | | −5.4865 |
| STO | spherical | infinite | −0.2480 | | | |
| S3 | aspheric | 1.8289 | 0.3730 | 1.55 | 56.1 | −15.4209 |
| S4 | aspheric | 1.9359 | 0.1253 | | | −17.7254 |
| S5 | aspheric | 2.1096 | 0.5441 | 1.55 | 56.1 | −15.7186 |
| S6 | aspheric | −13.9375 | 0.0557 | | | 89.8019 |
| S7 | aspheric | 9.1286 | 0.2600 | 1.67 | 20.4 | 44.0757 |
| S8 | aspheric | 2.7824 | 0.2993 | | | −15.4738 |
| S9 | aspheric | 7.3273 | 0.3686 | 1.65 | 23.5 | −93.2779 |
| S10 | aspheric | 8.5872 | 0.2695 | | | 5.1842 |
| S11 | aspheric | 4.9347 | 0.3491 | 1.55 | 56.1 | −27.7655 |
| S12 | aspheric | 19.7139 | 0.1840 | | | −76.4682 |
| S13 | aspheric | 5.5254 | 0.3763 | 1.65 | 23.5 | −62.8617 |
| S14 | aspheric | 3.6349 | 0.0936 | | | −91.1022 |
| S15 | aspheric | 1.2671 | 0.5012 | 1.55 | 56.1 | −8.0512 |
| S16 | aspheric | 1.0529 | 0.2660 | | | −4.5834 |
| S17 | spherical | infinite | 0.2100 | 1.52 | 64.2 | |
| S18 | spherical | infinite | 0.6416 | | | |
| S19 | spherical | infinite | | | | |

TABLE 17

| surface number | A4 | A6 | A8 | A10 | A12 |
|---|---|---|---|---|---|
| S1 | −1.4315E−05 | 4.3414E−05 | 8.8702E−06 | 7.3556E−05 | −5.2208E−05 |
| S2 | −8.3651E−05 | −4.6587E−05 | 4.5647E−05 | −1.3876E−04 | 1.9039E−04 |
| S3 | 2.3351E−01 | −4.4367E−01 | 6.4491E−01 | −7.4023E−01 | 5.4436E−01 |
| S4 | 1.0760E−01 | −4.7144E−01 | 6.9649E−01 | −8.2470E−01 | 7.6223E−01 |
| S5 | 4.9437E−02 | −1.8191E−01 | 2.4211E−02 | 7.5848E−02 | 1.6479E−01 |
| S6 | −4.8348E−02 | 6.0300E−02 | −3.7793E−01 | 7.9430E−01 | −8.3196E−01 |
| S7 | −7.2673E−02 | 3.3108E−01 | −1.2231E+00 | 2.3396E+00 | −2.6285E+00 |
| S8 | 7.4585E−02 | −1.0074E−01 | 5.7027E−01 | −1.9219E+00 | 3.4017E+00 |
| S9 | −8.0998E−02 | 1.3904E−01 | −3.4997E−01 | 6.8943E−01 | −8.3819E−01 |
| S10 | −1.2764E−01 | 1.0513E−01 | −3.0212E−01 | 5.4144E−01 | −5.5551E−01 |
| S11 | 1.6904E−02 | 1.6715E−01 | −5.7016E−01 | 8.1311E−01 | −7.3014E−01 |
| S12 | 7.0872E−02 | −9.9267E−02 | 9.2306E−02 | −1.0060E−01 | 6.3445E−02 |
| S13 | 2.3838E−01 | −5.1715E−01 | 5.1432E−01 | −3.5456E−01 | 1.5879E−01 |
| S14 | 1.5805E−01 | −2.6180E−01 | 1.7629E−01 | −7.6645E−02 | 2.2396E−02 |

TABLE 17-continued

| | | | | |
|---|---|---|---|---|
| S15 | −2.4498E−01 | 1.2960E−01 | −4.8551E−02 | 1.4960E−02 | −3.3754E−03 |
| S16 | −1.6426E−01 | 9.4435E−02 | −3.7604E−02 | 1.0043E−02 | −1.7708E−03 |

| surface number | A14 | A16 | A18 | A20 |
|---|---|---|---|---|
| S1 | 3.6653E−05 | −1.3273E−05 | 3.0258E−06 | −1.8212E−07 |
| S2 | −1.4564E−04 | 7.4008E−05 | −1.5966E−05 | 1.9826E−06 |
| S3 | −2.4299E−01 | 6.4044E−02 | −9.1931E−03 | 5.5528E−04 |
| S4 | −4.4899E−01 | 1.5347E−01 | −2.7779E−02 | 2.0615E−03 |
| S5 | −2.8622E−01 | 1.5647E−01 | −3.6462E−02 | 3.0331E−03 |
| S6 | 4.8548E−01 | −1.5991E−01 | 2.7811E−02 | −1.9876E−03 |
| S7 | 1.7291E+00 | −6.1343E−01 | 9.4570E−02 | −2.1634E−03 |
| S8 | −3.4681E+00 | 2.0519E+00 | −6.4860E−01 | 8.4285E−02 |
| S9 | 6.0703E−01 | −2.5539E−01 | 5.7495E−02 | −5.3488E−03 |
| S10 | 3.4223E−01 | −1.2335E−01 | 2.3925E−02 | −1.9318E−03 |
| S11 | 4.1825E−01 | −1.4717E−01 | 2.8897E−02 | −2.4131E−03 |
| S12 | −2.1691E−02 | 4.0899E−03 | −4.0229E−04 | 1.6167E−05 |
| S13 | −4.3783E−02 | 7.1777E−03 | −6.4872E−04 | 2.5431E−05 |
| S14 | −4.2112E−03 | 4.7976E−04 | −2.9853E−05 | 7.7317E−07 |
| S15 | 5.0338E−04 | −4.6250E−05 | 2.3602E−06 | −5.1039E−08 |
| S16 | 2.0060E−04 | −1.3958E−05 | 5.4045E−07 | −8.8752E−09 |

TABLE 18

| f1 (mm) | 14632.00 | f7 (mm) | −17.87 |
|---|---|---|---|
| f2 (mm) | 27.13 | f8 (mm) | −65.83 |
| f3 (mm) | 3.39 | f (mm) | 3.74 |
| f4 (mm) | −6.10 | TTL (mm) | 5.22 |
| f5 (mm) | 69.46 | HFOV (°) | 41.3 |
| f6 (mm) | 11.94 | | |

Figure 12A:
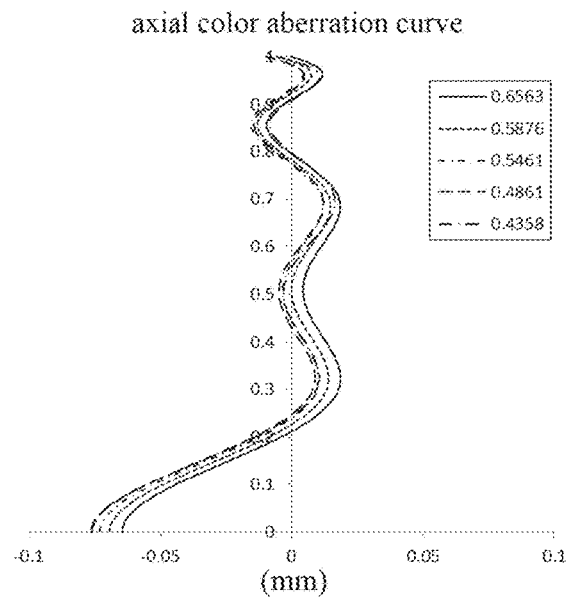
FIGS. 12A-12D respectively illustrate an axial color aberration curve, an astigmatic curve, a distortion curve, and a lateral color aberration curve of the optical imaging lens assembly according to the sixth embodiment.
Figure 12B:
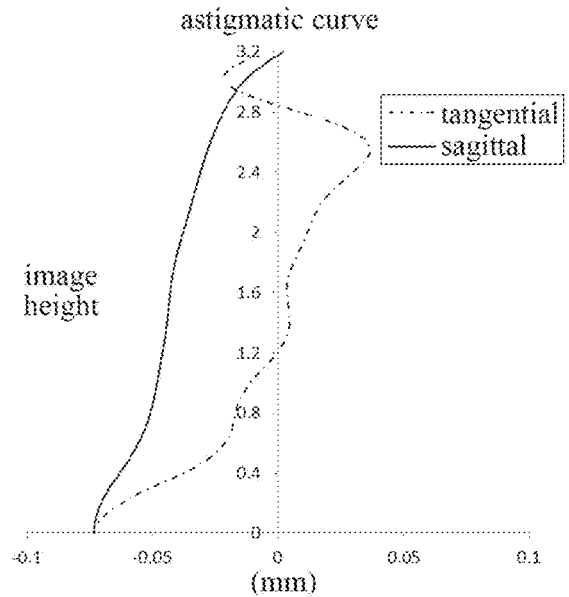
Figure 12C:
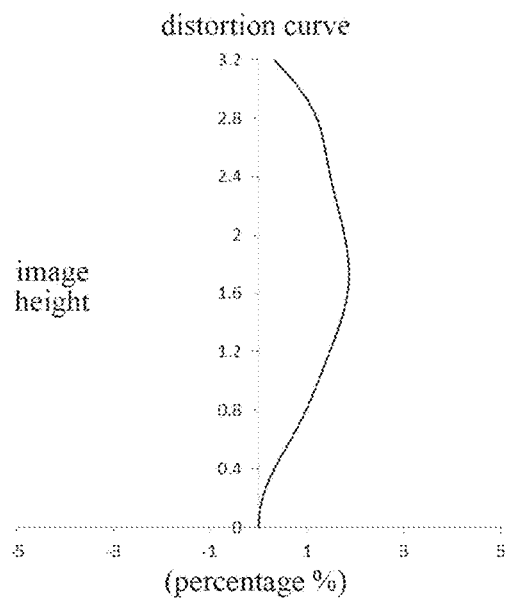
Figure 12D:
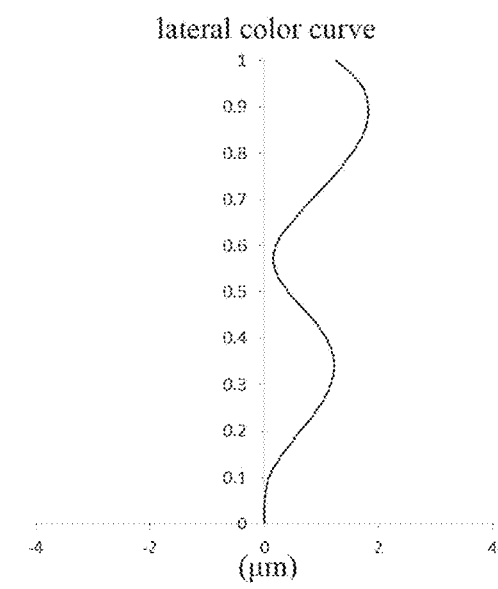

FIG. 12A illustrates an axial color aberration curve of the optical imaging lens assembly according to the sixth embodiment, representing deviations of focal points where lights of different wavelengths converge after passing through the optical imaging lens assembly. FIG. 12B illustrates an astigmatic curve of the optical imaging lens assembly according to the sixth embodiment, representing a curvature of a tangential image plane and a curvature of a sagittal image plane. FIG. 12C illustrates a distortion curve of the optical imaging lens assembly according to the sixth embodiment, representing degrees of distortion at different viewing angles. FIG. 12D illustrates a lateral color curve of the optical imaging lens assembly according to the sixth embodiment, representing deviations of different image heights on an image plane after lights pass through the optical imaging lens assembly. It can be seen from FIGS. 12A-12D that the optical imaging lens assembly according to the sixth embodiment can achieve a good image quality.

Seventh Embodiment

An optical imaging lens assembly according to the seventh embodiment of the present disclosure is described below with reference to FIGS. 13-14D.

Figure 13:
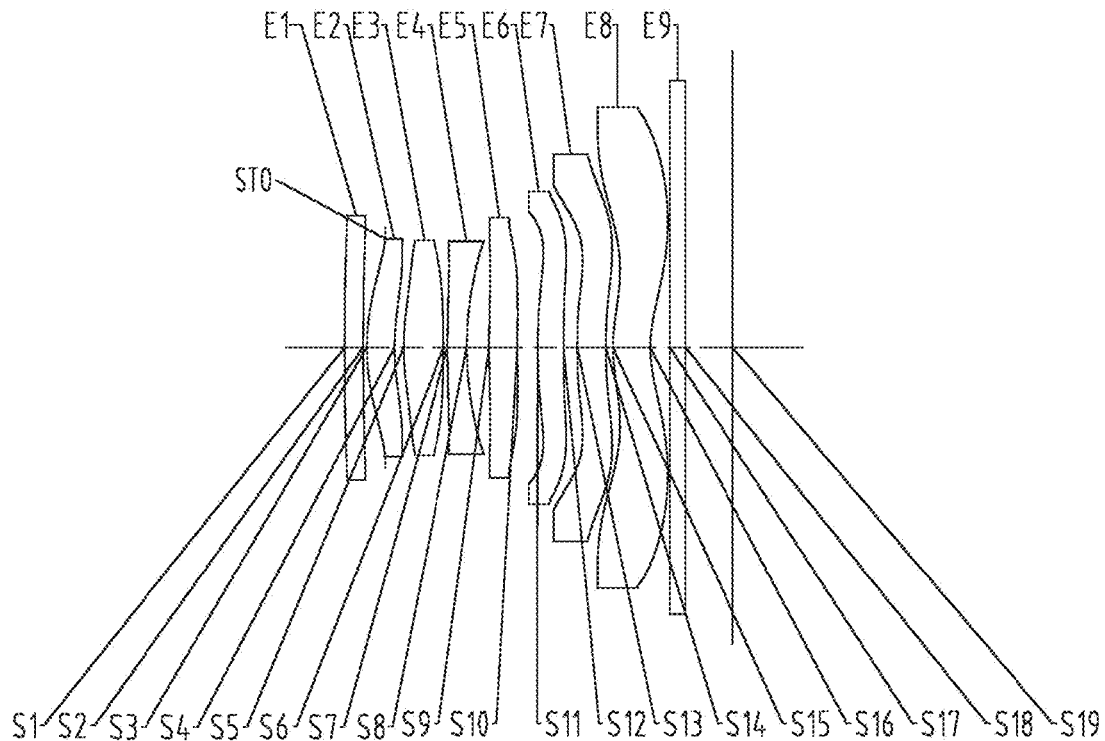
FIG. 13 is a schematic structural diagram of an optical imaging lens assembly according to a seventh embodiment of the present disclosure.

FIG. 13 is a schematic structural diagram of the optical imaging lens assembly according to the seventh embodiment of the present disclosure. As shown in FIG. 13, the optical imaging lens assembly according to the seventh embodiment includes first to eighth lenses E1-E8 having respective object-side surfaces and respective image-side surfaces.

In this embodiment, each of the second lens, the third lens, the fifth lens, and the sixth lens has a positive focal power. Each of the first lens, the fourth lens, the seventh lens, and the eighth lens has a negative focal power.

Table 19 below shows the surface type, the radius of curvature, the thickness, the material and the conic coefficient of each lens of the optical imaging lens assembly in the seventh embodiment. Table 20 shows the high-order coefficients of the aspheric mirror surfaces in the seventh embodiment. Table 21 shows the effective focal lengths f1-f8 of the lenses in the seventh embodiment, the effective focal length f of the optical imaging lens assembly, the half of the maximal field-of-view HFOV of the optical imaging lens assembly, and the optical-axis distance TTL from the object-side surface S1 of the first lens E1 to the image plane S19 of the optical imaging lens assembly. The surface type of each aspheric surface may be defined by the formula (1) given in the first embodiment.

TABLE 19

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 30.0000 | 0.2500 | 1.64 | 23.8 | −15.2240 |
| S2 | aspheric | 28.8912 | 0.3000 | | | −10.7150 |
| STO | spherical | infinite | −0.2497 | | | |
| S3 | aspheric | 1.8311 | 0.3712 | 1.55 | 56.1 | −15.4163 |
| S4 | aspheric | 1.9418 | 0.1238 | | | −17.7056 |
| S5 | aspheric | 2.1140 | 0.5415 | 1.55 | 56.1 | −15.7159 |
| S6 | aspheric | −13.9074 | 0.0535 | | | 89.5788 |
| S7 | aspheric | 9.1435 | 0.2600 | 1.67 | 20.4 | 44.0360 |
| S8 | aspheric | 2.7570 | 0.3001 | | | −15.5014 |
| S9 | aspheric | 7.1646 | 0.3799 | 1.65 | 23.5 | −93.8170 |
| S10 | aspheric | 8.5418 | 0.2750 | | | 4.6262 |
| S11 | aspheric | 5.0105 | 0.3489 | 1.55 | 56.1 | −27.7813 |
| S12 | aspheric | 20.0259 | 0.1840 | | | −80.2619 |
| S13 | aspheric | 5.4981 | 0.3818 | 1.65 | 23.5 | −62.9529 |
| S14 | aspheric | 3.7037 | 0.0967 | | | −85.9382 |
| S15 | aspheric | 1.2793 | 0.5012 | 1.55 | 56.1 | −7.9349 |
| S1 | aspheric | 1.0480 | 0.2662 | | | −4.5816 |
| S17 | spherical | infinite | 0.2100 | 1.52 | 64.2 | |
| S18 | spherical | infinite | 0.6417 | | | |
| S19 | spherical | infinite | | | | |

TABLE 20

| surface number | A4 | A6 | A8 | A10 | A12 |
|---|---|---|---|---|---|
| S1 | 1.8679E−03 | −2.7328E−03 | 7.3471E−03 | −2.5475E−02 | 3.7929E−02 |
| S2 | 9.2908E−03 | −7.9700E−02 | 3.1895E−01 | −7.1719E−01 | 9.5674E−01 |
| S3 | 2.3500E−01 | −4.6649E−01 | 7.1655E−01 | −8.3982E−01 | 6.2008E−01 |
| S4 | 1.0964E−01 | −4.9746E−01 | 7.8106E−01 | −9.4730E−01 | 8.5788E−01 |
| S5 | 5.7574E−02 | −2.4028E−01 | 2.0219E−01 | −2.2672E−01 | 4.7538E−01 |
| S6 | −4.2826E−02 | 3.4033E−02 | −3.3277E−01 | 7.5525E−01 | −8.1264E−01 |
| S7 | −6.6061E−02 | 2.8224E−01 | −1.0576E+00 | 2.0063E+00 | −2.2026E+00 |
| S8 | 7.1167E−02 | −8.2417E−02 | 5.1164E−01 | −1.7987E+00 | 3.2405E+00 |
| S9 | −8.1739E−02 | 1.3562E−01 | −3.3073E−01 | 6.4942E−01 | −7.9406E−01 |
| S10 | −1.2678E−01 | 9.7383E−02 | −2.7256E−01 | 4.8491E−01 | −4.9417E−01 |
| S11 | 1.5810E−02 | 1.7913E−01 | −6.0971E−01 | 8.7888E−01 | −7.9236E−01 |
| S12 | 7.7993E−02 | −1.1463E−01 | 1.0827E−01 | −1.1064E−01 | 6.7440E−02 |
| S13 | 2.4546E−01 | −5.4265E−01 | 5.6100E−01 | −4.0484E−01 | 1.9104E−01 |
| S14 | 1.5630E−01 | −2.5781E−01 | 1.7334E−01 | −7.5674E−02 | 2.2257E−02 |
| S15 | −2.4625E−01 | 1.3189E−01 | −5.0898E−02 | 1.6168E−02 | −3.7202E−03 |
| S16 | −1.6300E−01 | 9.2717E−02 | −3.6850E−02 | 9.8549E−03 | −1.7366E−03 |

| surface number | A14 | A16 | A18 | A20 |
|---|---|---|---|---|
| S1 | −2.7071E−02 | 9.7317E−03 | −1.6082E−03 | 8.2029E−05 |
| S2 | −7.7349E−01 | 3.7268E−01 | −9.8619E−02 | 1.1052E−02 |
| S3 | −2.7685E−01 | 7.2950E−02 | −1.0470E−02 | 6.3243E−04 |
| S4 | −4.9199E−01 | 1.6460E−01 | −2.9314E−02 | 2.1484E−03 |
| S5 | −4.8194E−01 | 2.3025E−01 | −5.1694E−02 | 4.3551E−03 |
| S6 | 4.7972E−01 | −1.5885E−01 | 2.7697E−02 | −1.9816E−03 |
| S7 | 1.3841E+00 | −4.4338E−01 | 4.8315E−02 | 3.1408E−03 |
| S8 | −3.3399E+00 | 1.9916E+00 | −6.3314E−01 | 8.2616E−02 |
| S9 | 5.7937E−01 | −2.4556E−01 | 5.5655E−02 | −5.2089E−03 |
| S10 | 3.0244E−01 | −1.0807E−01 | 2.0727E−02 | −1.6509E−03 |
| S11 | 4.5304E−01 | −1.5856E−01 | 3.0919E−02 | −2.5639E−03 |
| S12 | −2.2701E−02 | 4.2467E−03 | −4.1589E−04 | 1.6671E−05 |
| S13 | −5.6199E−02 | 9.9906E−03 | −9.9430E−04 | 4.3188E−05 |
| S14 | −4.2094E−03 | 4.8160E−04 | −3.0051E−05 | 7.7968E−07 |
| S15 | 5.6126E−04 | −5.1966E−05 | 2.6676E−06 | −5.7985E−08 |
| S16 | 1.9617E−04 | −1.3592E−05 | 5.2374E−07 | −8.5593E−09 |

TABLE 21

| f1 (mm) | −1338.65 | f7 (mm) | −19.20 |
|---|---|---|---|
| f2 (mm) | 26.90 | f8 (mm) | −45.33 |
| f3 (mm) | 3.40 | f (mm) | 3.80 |
| f4 (mm) | −6.01 | TTL (mm) | 5.24 |
| f5 (mm) | 62.17 | HFOV (°) | 38.2 |
| f6 (mm) | 12.13 | | |

Figures 14A, 14B:
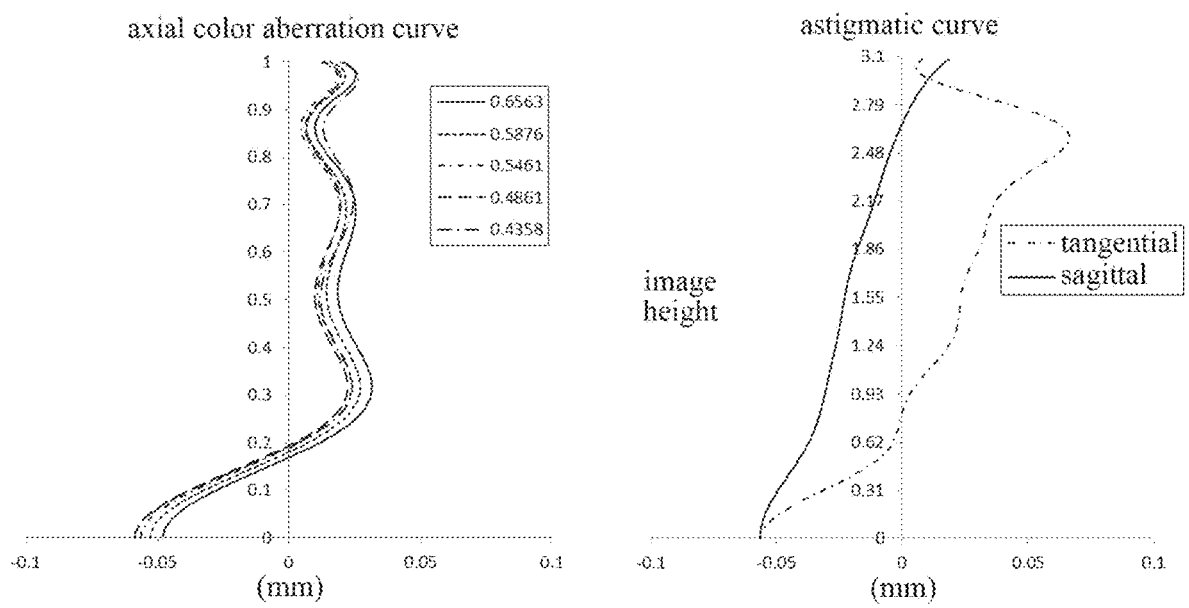
FIGS. 14A-14D respectively illustrate an axial color aberration curve, an astigmatic curve, a distortion curve, and a lateral color aberration curve of the optical imaging lens assembly according to the seventh embodiment.
Figure 14C:
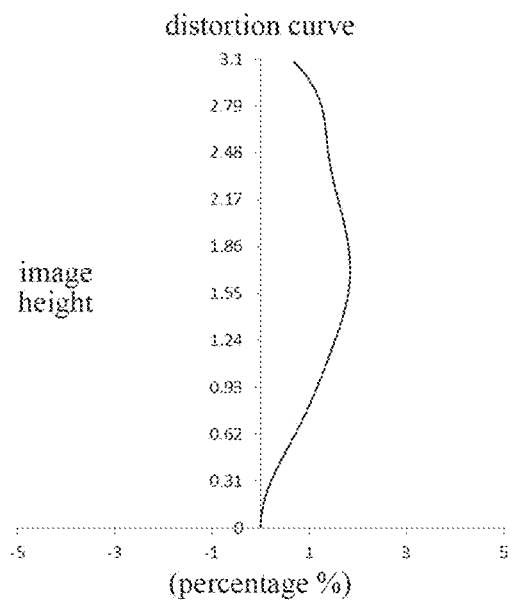
Figure 14D:
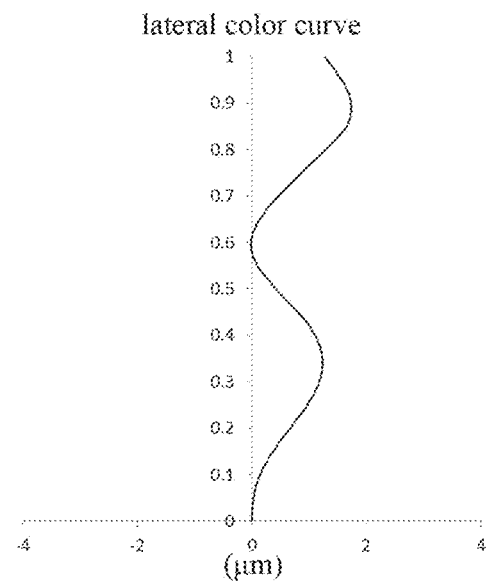

FIG. 14A illustrates an axial color aberration curve of the optical imaging lens assembly according to the seventh embodiment, representing deviations of focal points where lights of different wavelengths converge after passing through the optical imaging lens assembly. FIG. 14B illustrates an astigmatic curve of the optical imaging lens assembly according to the seventh embodiment, representing a curvature of a tangential image plane and a curvature of a sagittal image plane. FIG. 14C illustrates a distortion curve of the optical imaging lens assembly according to the seventh embodiment, representing degrees of distortion at different viewing angles. FIG. 14D illustrates a lateral color curve of the optical imaging lens assembly according to the seventh embodiment, representing deviations of different image heights on an image plane after lights pass through the optical imaging lens assembly. It can be seen from FIGS. 14A-14D that the optical imaging lens assembly according to the seventh embodiment can achieve a good image quality.

Eighth Embodiment

An optical imaging lens assembly according to an eighth embodiment of the present disclosure is described below with reference to FIGS. 15-16D.

Figure 15:
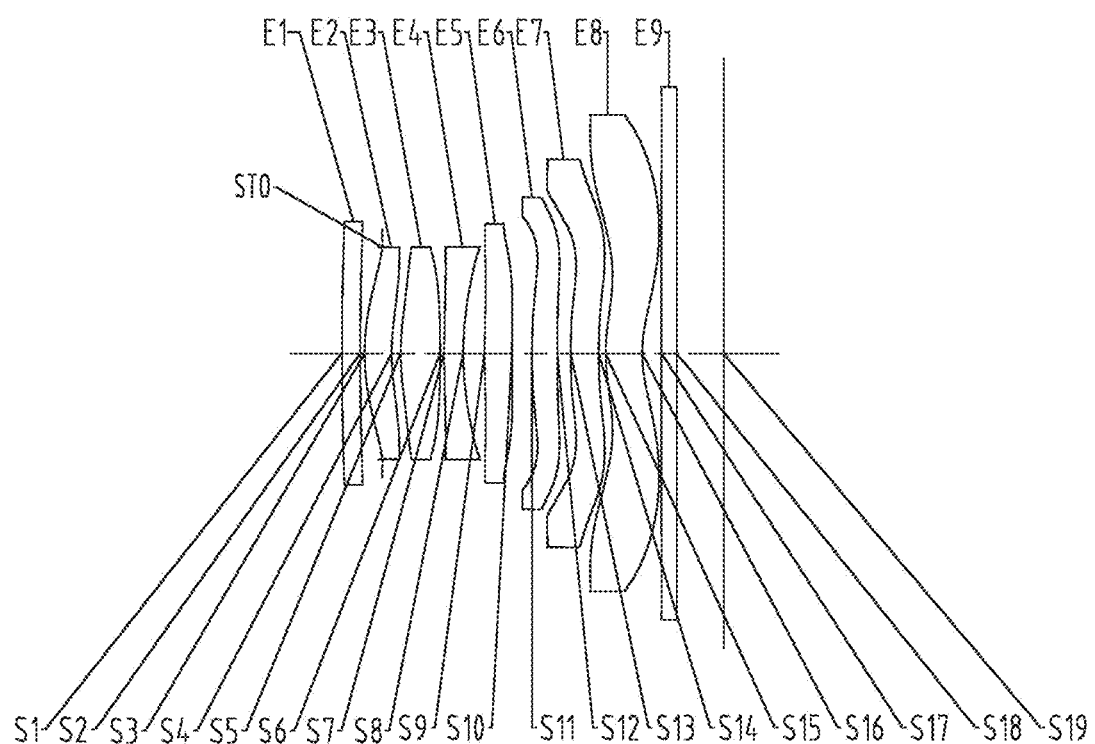
FIG. 15 is a schematic structural diagram of an optical imaging lens assembly according to an eighth embodiment of the present disclosure.

FIG. 15 is a schematic structural diagram of the optical imaging lens assembly according to the eighth embodiment of the present disclosure. As shown in FIG. 15, the optical imaging lens assembly according to the eighth embodiment includes first to eighth lenses E1-E8 having respective object-side surfaces and respective image-side surfaces.

In this embodiment, each of the second lens, the third lens, the fifth lens, and the sixth lens has a positive focal power. Each of the first lens, the fourth lens, the seventh lens, and the eighth lens has a negative focal power.

Table 22 below shows the surface type, the radius of curvature, the thickness, the material and the conic coefficient of each lens of the optical imaging lens assembly in the eighth embodiment. Table 23 shows the high-order coefficients of the aspheric mirror surfaces is the eighth. embodiment. Table 24 shows the effective focal lengths f1-f8 of the lenses in the eighth embodiment, the effective focal length f of the optical imaging lens assembly, the half of the maximal field-of-view HFOV of the optical imaging lens assembly, and the optical-axis distance TTL from the object-side surface S1 of the first lens E1 to the image plane S19 of the optical imaging lens assembly. The surface type of each aspheric surface may be defined by the formula (1) given in the first embodiment.

TABLE 22

| surface number | surface type | radius of curvature | thick-ness | refrac-tive index | abbe num-ber | conic coef-ficient |
|---|---|---|---|---|---|---|
| OBJ | spherical | infinite | infinite | | | |
| S1 | aspheric | 30.0000 | 0.2500 | 1.64 | 23.8 | −13.9860 |
| S2 | aspheric | 28.9129 | 0.3000 | | | −11.5086 |
| STO | spherical | infinite | −0.2405 | | | 0.0000 |
| S3 | aspheric | 1.8308 | 0.3701 | 1.55 | 56.1 | −15.4137 |
| S4 | aspheric | 1.9394 | 0.1234 | | | −17.7099 |
| S5 | aspheric | 2.1104 | 0.5392 | 1.55 | 56.1 | −15.7115 |
| S6 | aspheric | −14.0081 | 0.0530 | | | 89.5064 |
| S7 | aspheric | 9.1002 | 0.2600 | 1.67 | 20.4 | 44.0386 |
| S8 | aspheric | 2.7601 | 0.2924 | | | −15.5136 |
| S9 | aspheric | 7.2071 | 0.3737 | 1.65 | 23.5 | −93.6597 |
| S10 | aspheric | 8.5658 | 0.2731 | | | 4.4169 |
| S11 | aspheric | 5.0952 | 0.3475 | 1.55 | 56.1 | −27.4459 |
| S12 | aspheric | 21.6325 | 0.1832 | | | −94.4619 |
| S13 | aspheric | 5.4604 | 0.3808 | 1.65 | 23.5 | −60.6875 |
| S14 | aspheric | 4.0411 | 0.0949 | | | −86.4479 |
| S15 | aspheric | 1.2900 | 0.5001 | 1.55 | 56.1 | −7.9297 |
| S16 | aspheric | 1.0520 | 0.2638 | | | −4.5825 |
| S17 | spherical | infinite | 0.2100 | 1.52 | 64.2 | |
| S18 | spherical | infinite | 0.6393 | | | |
| S19 | spherical | infinite | | | | |

TABLE 23

| surface number | A4 | A6 | A8 | A10 | A12 |
|---|---|---|---|---|---|
| S1 | −1.5540E−03 | 2.1830E−02 | −6.7818E−02 | 1.0021E−01 | −8.7804E−02 |
| S2 | 6.4635E−03 | −5.4902E−02 | 2.2879E−01 | −5.3931E−01 | 7.4802E−01 |
| S3 | 2.3665E−01 | −4.7494E−01 | 7.3577E−01 | −8.6357E−01 | 6.3732E−01 |
| S4 | 1.0818E−01 | −4.9029E−01 | 7.6414E−01 | −9.2541E−01 | 8.4140E−01 |
| S5 | 6.0289E−02 | −2.5774E−01 | 2.5335E−01 | −3.0848E−01 | 5.5217E−01 |
| S6 | −4.2433E−02 | 2.7444E−02 | −3.1158E−01 | 7.2476E−01 | −7.8849E−01 |
| S7 | −6.4213E−02 | 2.6477E−01 | −9.8113E−01 | 1.8228E+00 | −1.9466E+00 |
| S8 | 6.8864E−02 | −6.8762E−02 | 4.8256E−01 | −1.7711E+00 | 3.2301E+00 |
| S9 | −8.0341E−02 | 1.2533E−01 | −3.0127E−01 | 6.0571E−01 | −7.5613E−01 |
| S10 | −1.2823E−01 | 1.1023E−01 | −3.1241E−01 | 5.4365E−01 | −5.4197E−01 |
| S11 | 1.3186E−02 | 1.9522E−01 | −6.4617E−01 | 9.2488E−01 | −8.2796E−01 |
| S12 | 7.7832E−02 | −1.1835E−01 | 1.1423E−01 | −1.1519E−01 | 6.9470E−02 |
| S13 | 2.4636E−01 | −5.3889E−01 | 5.5160E−01 | −3.9486E−01 | 1.8512E−01 |
| S14 | 1.5464E−01 | −2.5524E−01 | 1.7135E−01 | −7.4787E−02 | 2.2012E−02 |
| S15 | −2.4310E−01 | 1.2670E−01 | −4.7140E−02 | 1.4682E−02 | −3.3739E−03 |
| S16 | −1.6356E−01 | 9.2091E−02 | −3.6730E−02 | 9.8358E−03 | −1.7331E−03 |

| surface number | A14 | A16 | A18 | A20 |
|---|---|---|---|---|
| S1 | 5.0448E−02 | −1.9215E−02 | 4.4113E−03 | −4.5409E−04 |
| S2 | −6.2398E−01 | 3.0864E−01 | −8.3575E−02 | 9.5623E−03 |
| S3 | −2.8440E−01 | 7.4919E−02 | −1.0752E−02 | 6.4941E−04 |
| S4 | −4.8456E−01 | 1.6263E−01 | −2.9031E−02 | 2.1314E−03 |
| S5 | −5.2565E−01 | 2.4514E−01 | −5.4498E−02 | 4.5808E−03 |
| S6 | 4.6844E−01 | −1.5575E−01 | 2.7230E−02 | −1.9520E−03 |
| S7 | 1.1713E+00 | −3.3963E−01 | 2.0923E−02 | 6.1627E−03 |
| S8 | −3.3403E+00 | 1.9924E+00 | −6.3295E−01 | 8.2511E−02 |
| S9 | 5.5926E−01 | −2.3911E−01 | 5.4504E−02 | −5.1206E−03 |
| S10 | 3.2510E−01 | −1.1426E−01 | 2.1617E−02 | −1.7018E−03 |
| S11 | 4.7025E−01 | −1.6361E−01 | 3.1741E−02 | −2.6207E−03 |
| S12 | −2.3253E−02 | 4.3371E−03 | −4.2407E−04 | 1.6985E−05 |
| S13 | −5.4100E−02 | 9.5485E−03 | −9.4321E−04 | 4.0691E−05 |
| S14 | −4.1663E−03 | 4.7692E−04 | −2.9765E−05 | 7.7216E−07 |
| S15 | 5.1223E−04 | −4.7806E−05 | 2.4728E−06 | −5.4109E−08 |
| S16 | 1.9575E−04 | −1.3566E−05 | 5.2307E−07 | −8.5562E−09 |

TABLE 24

| | | | |
|---|---|---|---|
| f1 (mm) | −1369.05 | f7 (mm) | −26.94 |
| f2 (mm) | 27.14 | f8 (mm) | −40.52 |
| f3 (mm) | 3.40 | f (mm) | 3.71 |
| f4 (mm) | −6.03 | TTL (mm) | 5.21 |
| f5 (mm) | 63.59 | HFOV (°) | 38.8 |
| f6 (mm) | 12.11 | | |

Figure 16A:
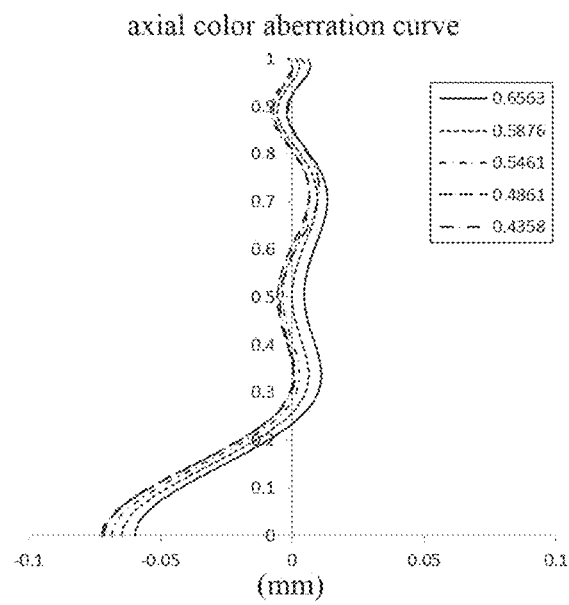
FIGS. 16A-16D respectively illustrate an axial color aberration curve, an astigmatic curve, a distortion curve, and a lateral color aberration curve of the optical imaging lens assembly according to the eighth embodiment.
Figure 16B:
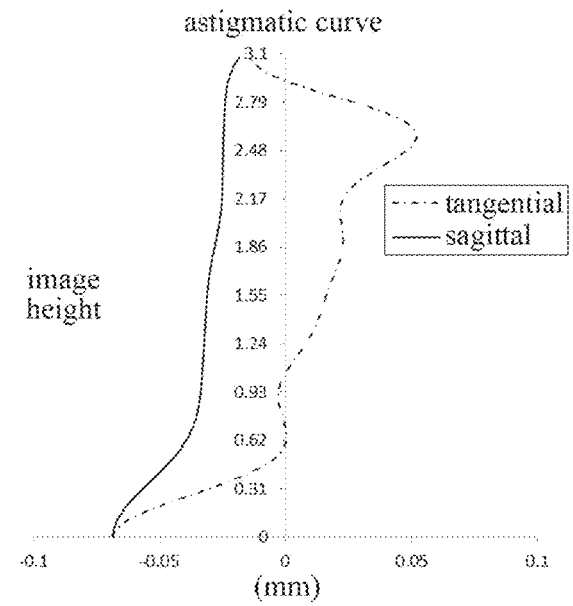
Figure 16C:
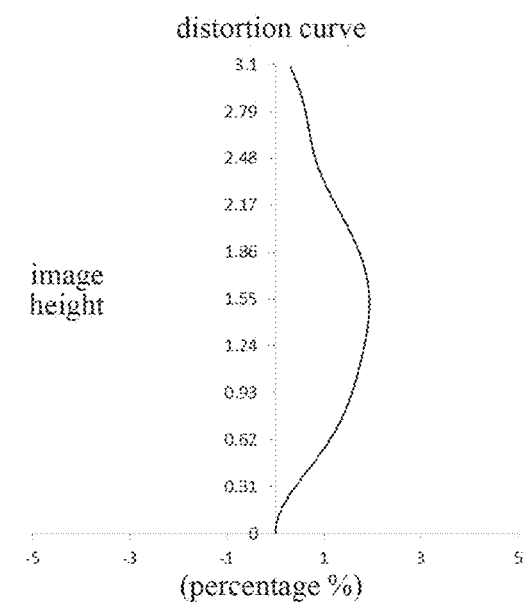
Figure 16D:
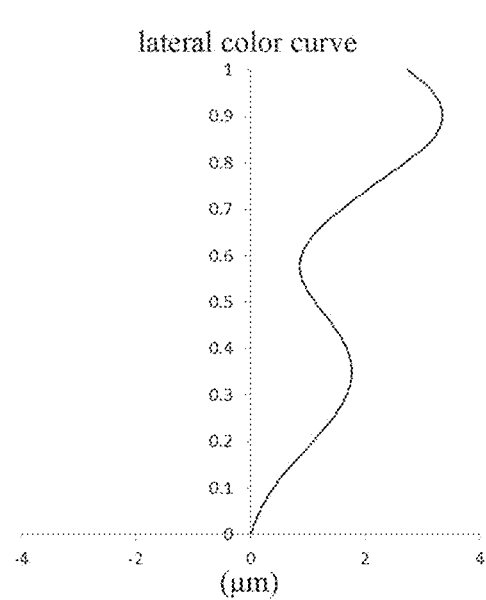

FIG. 16A illustrates an axial color aberration curve of the optical imaging lens assembly according to the eighth embodiment, representing deviations of focal points where lights of different wavelengths converge after passing through the optical imaging lens assembly. FIG. 16B illustrates an astigmatic curve of the optical imaging lens assembly according to the eighth embodiment, representing a curvature of a tangential image plane and a curvature of a sagittal image plane. FIG. 16C illustrates a distortion curve of the optical imaging lens assembly according to the eighth embodiment, representing degrees of distortion at different viewing angles. FIG. 16D illustrates a lateral color curve of the optical imaging lens assembly according to the eighth embodiment, representing deviations of different image heights on an image plane after lights pass through the optical imaging lens assembly. It can be seen from FIGS. 16A-16D that the optical imaging lens assembly according to the eighth embodiment can achieve a good image quality.

Ninth Embodiment

An optical imaging lens assembly according to a ninth embodiment of the present disclosure is described below with reference to FIGS. 17-18D.

FIG. 17 is a schematic structural diagram of the optical imaging lens assembly according to the ninth embodiment of the present disclosure. As shown in FIG. 17, the optical imaging lens assembly according to the ninth embodiment includes first to eighth lenses E1-E8 having respective object-side surfaces and respective image-side surfaces.

In this embodiment, each of the first lens, the second lens, the third lens, and the sixth lens has a positive focal power. Each of the fourth lens, the fifth lens, the seventh lens, and the eighth lens has a negative focal power.

Table 25 below shows the surface type, the radius of curvature, the thickness, the material and the conic coefficient of each lens of the optical imaging lens assembly in the ninth embodiment. Table 26 shows the high-order coefficients of the aspheric mirror surfaces in the ninth embodiment. Table 27 shows the effective focal lengths f1-f8 of the lenses in the ninth embodiment, the effective focal length f of the optical imaging lens assembly, the half of the maximal field-of-view HFOV of the optical imaging lens assembly, and the optical-axis distance TTL from the object-side surface S1 of the first lens E1 to the image plane S19 of the optical imaging lens assembly. The surface type of each aspheric surface may be defined by the formula (1) given in the first embodiment.

TABLE 25

| surface number | surface type | radius of curvature | thickness | material refractive index | abbe number | conic coefficient |
|---|---|---|---|---|---|---|
| OBJ | spherical | infinite | infinite | | | |
| S1 | aspheric | 26.8720 | 0.2500 | 1.64 | 23.8 | −80.4313 |
| S2 | aspheric | 53.8641 | 0.3000 | | | 99.0000 |
| STO | spherical | infinite | −0.2475 | | | |
| S3 | aspheric | 1.9669 | 0.3639 | 1.55 | 56.1 | −15.5167 |
| S4 | aspheric | 1.8800 | 0.0910 | | | −16.8985 |
| S5 | aspheric | 2.1883 | 0.5268 | 1.55 | 56.1 | −16.6838 |
| S6 | aspheric | −14.0465 | 0.0425 | | | 85.6876 |
| S7 | aspheric | 9.0988 | 0.3028 | 1.67 | 20.4 | 41.5711 |
| S8 | aspheric | 3.1188 | 0.4389 | | | −17.0040 |
| S9 | aspheric | 10.9609 | 0.3684 | 1.65 | 23.5 | −99.0000 |
| S10 | aspheric | 9.5468 | 0.2819 | | | −2.1170 |
| S11 | aspheric | 5.3049 | 0.4054 | 1.55 | 56.1 | −36.0219 |
| S12 | aspheric | 300.0000 | 0.1950 | | | 99.0000 |
| S13 | aspheric | 7.8136 | 0.4005 | 1.65 | 23.5 | −26.4376 |
| S14 | aspheric | 5.0826 | 0.1000 | | | −80.3828 |
| S15 | aspheric | 1.3794 | 0.5196 | 1.55 | 56.1 | −6.3497 |
| S16 | aspheric | 1.0805 | 0.2778 | | | −3.5946 |
| S17 | spherical | infinite | 0.2100 | 1.52 | 64.2 | |
| S18 | spherical | infinite | 0.6725 | | | |
| S19 | spherical | infinite | | | | |

TABLE 26

| surface number | A4 | A6 | A8 | A10 | A12 |
|---|---|---|---|---|---|
| S1 | 1.7563E−02 | −4.1324E−02 | −1.9520E−02 | 1.6542E−01 | −2.5608E−01 |
| S2 | 6.4070E−02 | −2.5446E−01 | 4.1175E−01 | −2.8507E−01 | −5.1954E−02 |
| S3 | 2.4539E−01 | −5.9378E−01 | 9.8806E−01 | −1.1066E+00 | 7.7081E−01 |
| S4 | 8.6771E−02 | −3.9914E−01 | 5.3065E−01 | −5.2486E−01 | 4.3320E−01 |
| S5 | 2.7897E−02 | −1.9911E−01 | 2.0658E−01 | −2.1720E−01 | 3.5813E−01 |
| S6 | −9.3678E−02 | 1.1945E−01 | −2.4259E−01 | 3.8621E−01 | −3.7270E−01 |
| S7 | −7.7141E−02 | 1.0345E−01 | −2.0200E−01 | 2.4934E−01 | −1.4063E−01 |
| S8 | 6.0144E−02 | −2.6193E−02 | −3.6120E−02 | 1.1705E−01 | −1.9787E−01 |
| S9 | −5.8787E−02 | 8.1722E−02 | −1.9929E−01 | 3.6252E−01 | −4.2091E−01 |
| S10 | −9.8595E−02 | 7.0185E−02 | −1.3628E−01 | 1.6146E−01 | −9.9811E−02 |
| S11 | 7.2842E−04 | 7.4297E−02 | −2.1416E−01 | 2.4729E−01 | −1.9477E−01 |
| S12 | 2.0322E−02 | −7.7719E−03 | −3.7627E−02 | 2.1908E−02 | −4.3083E−03 |
| S13 | 1.6427E−01 | −3.1141E−01 | 3.0194E−01 | −2.4080E−01 | 1.3079E−01 |
| S14 | 9.3328E−02 | −1.0844E−01 | 3.0891E−02 | 1.0110E−03 | −2.8962E−03 |

TABLE 26-continued

| | | | | |
|---|---|---|---|---|
| S15 | −2.0529E−01 | 6.0889E−02 | −3.9120E−03 | −6.7825E−04 | −8.8509E−05 |
| S16 | −1.5343E−01 | 7.6234E−02 | −2.6840E−02 | 6.9138E−03 | −1.2654E−03 |

| surface number | A14 | A16 | A18 | A20 |
|---|---|---|---|---|
| S1 | 2.0598E−01 | −9.4476E−02 | 2.3380E−02 | −2.4240E−03 |
| S2 | 2.5070E−01 | −1.9187E−01 | 6.5962E−02 | −8.8907E−03 |
| S3 | −3.2883E−01 | 8.3689E−02 | −1.1675E−02 | 6.8759E−04 |
| S4 | −2.4432E−01 | 8.2229E−02 | −1.4794E−02 | 1.0947E−03 |
| S5 | −3.3432E−01 | 1.5355E−01 | −3.3558E−02 | 2.7666E−03 |
| S6 | 2.0845E−01 | −6.6160E−02 | 1.1076E−02 | −7.6106E−04 |
| S7 | −3.8830E−02 | 1.0605E−01 | −5.5470E−02 | 9.6295E−03 |
| S8 | 2.3364E−01 | −1.6637E−01 | 6.3737E−02 | −9.9263E−03 |
| S9 | 2.9709E−01 | −1.2147E−01 | 2.6278E−02 | −2.3223E−03 |
| S10 | 2.2202E−02 | 7.2487E−03 | −4.5608E−03 | 6.2953E−04 |
| S11 | 1.0587E−01 | −3.7917E−02 | 7.9247E−03 | −7.1399E−04 |
| S12 | 1.1834E−04 | 6.1111E−05 | −6.1696E−06 | 9.6751E−08 |
| S13 | −4.4335E−02 | 9.0703E−03 | −1.0324E−03 | 5.0421E−05 |
| S14 | 8.6383E−04 | −1.2891E−04 | 9.9902E−06 | −3.1795E−07 |
| S15 | 7.8776E−05 | −1.3477E−05 | 9.8671E−07 | −2.7306E−08 |
| S16 | 1.5603E−04 | −1.2080E−05 | 5.2242E−07 | −9.5248E−09 |

TABLE 27

| | | | |
|---|---|---|---|
| f1 (mm) | 83.45 | f7 (mm) | −23.92 |
| f2 (mm) | 162.03 | f8 (mm) | −23.65 |
| f3 (mm) | 3.50 | f (mm) | 4.07 |
| f4 (mm) | −7.26 | TTL (mm) | 5.50 |
| f5 (mm) | −127.78 | HFOV (°) | 39.2 |
| f6 (mm) | 9.88 | | |

Figures 18C, 18D:
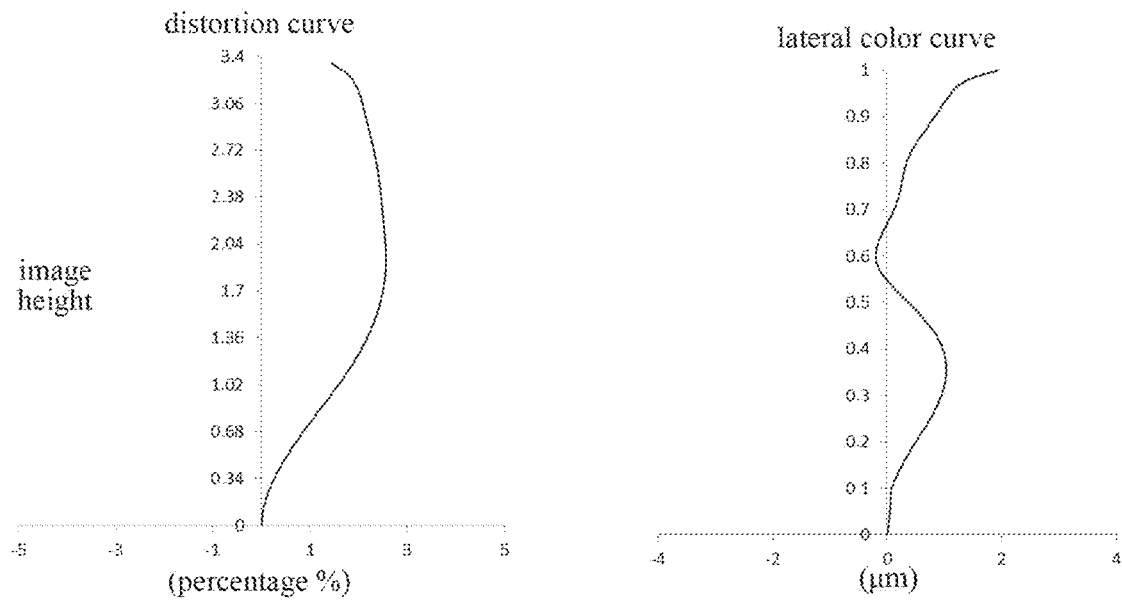

FIG. 18A illustrates an axial color aberration curve of the optical imaging lens assembly according to the ninth embodiment, representing deviations of focal points where lights of different wavelengths converge after passing through the optical imaging lens assembly. FIG. 18B illustrates an astigmatic curve of the optical imaging lens assembly according to the ninth embodiment, representing a curvature of a tangential image plane and a curvature of a sagittal image plane. FIG. 18C illustrates a distortion curve of the optical imaging lens assembly according to the ninth embodiment, representing degrees of distortion at different viewing angles. FIG. 18D illustrates a lateral color curve of the optical imaging lens assembly according to the ninth embodiment, representing deviations of different image heights on an image plane after lights pass through the optical imaging lens assembly. It can be seen from FIGS. 18A-18D that the optical imaging lens assembly according to the ninth embodiment can achieve a good image quality.

Tenth Embodiment

An optical imaging lens assembly according to a tenth embodiment of the present disclosure is described below with reference to FIGS. 19-20D.

Figure 19:
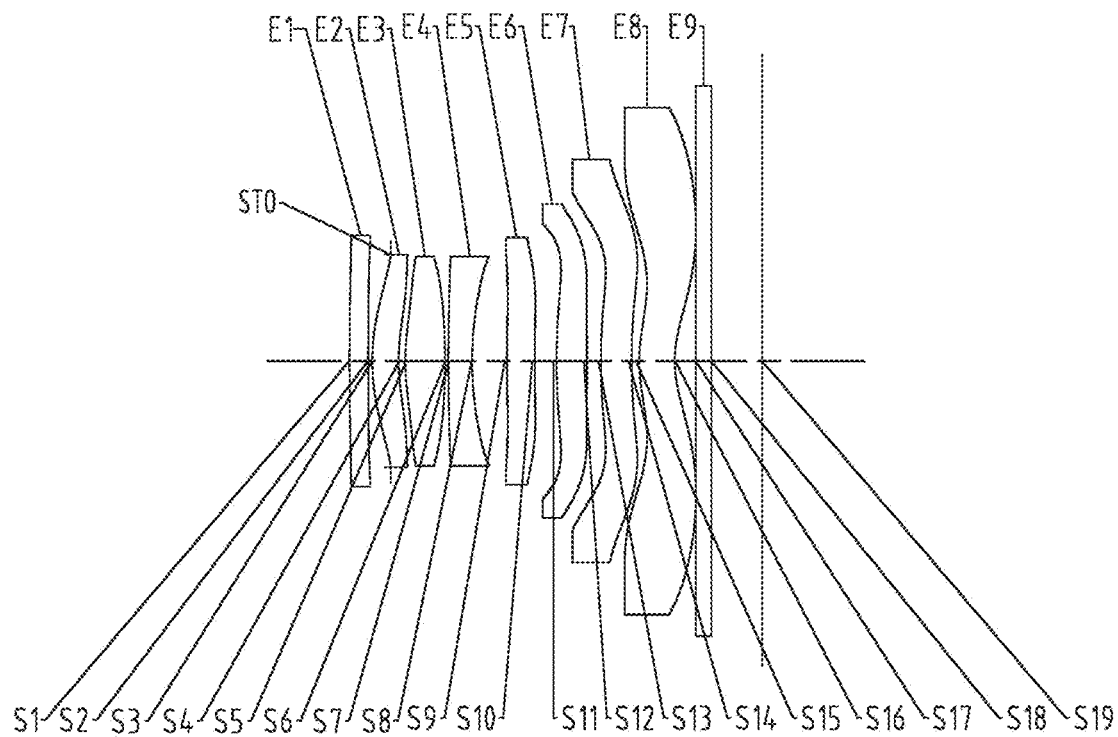
FIG. 19 is a schematic structural diagram of an optical imaging lens assembly according to a tenth embodiment of the present disclosure.

FIG. 19 is a schematic structural diagram of the optical imaging lens assembly according to the tenth embodiment of the present disclosure. As shown in FIG. 19, the optical imaging lens assembly according to the tenth embodiment includes first to eighth lenses E1-E8 having respective object-side surfaces and respective image-side surfaces.

In this embodiment, each of the first lens, the second lens, the third lens, and the sixth lens has a positive focal power. Each of the fourth lens, the fifth lens, the seventh lens, and the eighth lens has a negative focal power.

Table 28 below shows the surface type, the radius of curvature, the thickness, the material and the conic coefficient of each lens of the optical imaging lens assembly in the tenth embodiment. Table 29 shows the high-order coefficients of the aspheric mirror surfaces in the tenth embodiment. Table 30 shows the effective focal lengths f1-f8 of the lenses in the tenth embodiment, the effective focal length f of the optical imaging lens assembly, the half of the maximal field-of-view HFOV of the optical imaging lens assembly, and the optical-axis distance TTL from the object-side surface S1 of the first lens E1 to the image plane S19 of the optical imaging lens assembly. The surface type of each aspheric surface may be defined by the formula (1) given in the first embodiment.

TABLE 28

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 30.4755 | 0.2500 | 1.64 | 23.8 | −178.5029 |
| S2 | aspheric | 67.2497 | 0.3000 | | | 93.9283 |
| STO | spherical | infinite | −0.2456 | | | |
| S3 | aspheric | 1.9983 | 0.3513 | 1.55 | 56.1 | −15.4408 |
| S4 | aspheric | 1.9509 | 0.0897 | | | −16.3113 |
| S5 | aspheric | 2.2976 | 0.5268 | 1.55 | 56.1 | −16.9256 |
| S6 | aspheric | −12.8346 | 0.0435 | | | 78.0213 |
| S7 | aspheric | 8.5724 | 0.3168 | 1.67 | 20.4 | 40.8274 |
| S8 | aspheric | 3.1851 | 0.4636 | | | −17.4010 |
| S9 | aspheric | 9.6917 | 0.3725 | 1.65 | 23.5 | −94.4315 |
| S10 | aspheric | 8.4127 | 0.2894 | | | −0.7097 |
| S11 | aspheric | 5.5156 | 0.4080 | 1.55 | 56.1 | −37.3823 |
| S12 | aspheric | 799.6898 | 0.1862 | | | 99.0000 |
| S13 | aspheric | 9.2690 | 0.4080 | 1.65 | 23.5 | −28.1256 |
| S14 | aspheric | 8.3201 | 0.1000 | | | −49.0033 |
| S15 | aspheric | 1.4129 | 0.4717 | 1.55 | 56.1 | −6.5271 |
| S16 | aspheric | 1.0158 | 0.2809 | | | −3.8796 |
| S17 | spherical | infinite | 0.2100 | 1.52 | 64.2 | |
| S18 | spherical | infinite | 0.6756 | | | |
| S19 | spherical | infinite | | | | |

TABLE 29

| surface number | A4 | A6 | A8 | A10 | A12 |
|---|---|---|---|---|---|
| S1 | 1.2972E-02 | -2.6497E-02 | -6.0451E-02 | 2.3476E-01 | -3.2664E-01 |
| S2 | 7.3501E-02 | -2.9354E-01 | 5.1065E-01 | -4.6812E-01 | 1.9704E-01 |
| S3 | 2.5372E-01 | -6.1523E-01 | 1.0006E+00 | -1.0871E+00 | 7.3711E-01 |
| S4 | 7.9193E-02 | -3.4104E-01 | 3.6969E-01 | -2.9686E-01 | 2.4928E-01 |
| S5 | 2.5356E-02 | -1.7132E-01 | 1.4746E-01 | -1.8032E-01 | 3.7209E-01 |
| S6 | -1.1565E-01 | 2.0086E-01 | -3.7970E-01 | 5.0151E-01 | -4.1305E-01 |
| S7 | -1.0359E-01 | 1.7685E-01 | -2.7961E-01 | 2.3013E-01 | 2.9488E-04 |
| S8 | 4.9278E-02 | -1.4961E-02 | -1.2326E-02 | 3.9778E-02 | -9.6895E-02 |
| S9 | -6.0144E-02 | 9.0133E-02 | -2.2371E-01 | 3.9423E-01 | -4.3935E-01 |
| S10 | -1.0172E-01 | 8.5335E-02 | -1.5800E-01 | 1.7715E-01 | -1.0482E-01 |
| S11 | -1.7438E-02 | 1.1562E-01 | -2.5074E-01 | 2.5363E-01 | -1.7508E-01 |
| S12 | -8.9633E-03 | 6.7182E-02 | -1.2894E-01 | 8.9728E-02 | -3.5408E-02 |
| S13 | 1.6616E-01 | -2.9294E-01 | 2.6772E-01 | -2.1156E-01 | 1.1662E-01 |
| S14 | 1.1786E-01 | -1.4144E-01 | 5.4122E-02 | -9.3723E-03 | 1.9110E-04 |
| S15 | -1.8740E-01 | 4.2442E-02 | 4.5537E-03 | -2.9083E-03 | 2.7272E-04 |
| S16 | -1.4171E-01 | 6.4567E-02 | -2.0532E-02 | 4.8460E-03 | -8.3611E-04 |

| surface number | A14 | A16 | A18 | A20 |
|---|---|---|---|---|
| S1 | 2.5032E-01 | -1.1151E-01 | 2.7085E-02 | -2.7763E-03 |
| S2 | 2.5036E-02 | -6.6396E-02 | 2.7520E-02 | -3.9291E-03 |
| S3 | -3.0728E-01 | 7.6628E-02 | -1.0495E-02 | 6.0773E-04 |
| S4 | -1.5639E-01 | 5.7562E-02 | -1.1041E-02 | 8.5561E-04 |
| S5 | -3.6509E-01 | 1.7063E-01 | -3.7903E-02 | 3.2041E-03 |
| S6 | 2.0530E-01 | -5.9591E-02 | 9.2918E-03 | -6.0176E-04 |
| S7 | -1.8871E-01 | 1.7745E-01 | -7.0671E-02 | 1.0647E-02 |
| S8 | 1.6010E-01 | -1.3570E-01 | 5.6930E-02 | -9.3069E-03 |
| S9 | 2.9848E-01 | -1.1802E-01 | 2.4790E-02 | -2.1335E-03 |
| S10 | 2.2535E-02 | 7.1167E-03 | -4.3970E-03 | 5.9749E-04 |
| S11 | 8.5041E-02 | -2.8236E-02 | 5.6763E-03 | -5.0337E-04 |
| S12 | 8.8093E-03 | -1.3722E-03 | 1.2171E-04 | -4.6565E-06 |
| S13 | -4.0166E-02 | 8.2981E-03 | -9.4561E-04 | 4.5820E-05 |
| S14 | 2.5544E-04 | -5.3462E-05 | 4.7219E-06 | -1.6119E-07 |
| S15 | 4.2136E-05 | -1.1167E-05 | 9.0020E-07 | -2.5741E-08 |
| S16 | 9.9359E-05 | -7.5022E-06 | 3.1775E-07 | -5.6740E-09 |

TABLE 30

| | | | |
|---|---|---|---|
| f1 (mm) | 86.81 | f7 (mm) | -151.56 |
| f2 (mm) | 92.89 | f8 (mm) | -11.40 |
| f3 (mm) | 3.61 | f (mm) | 4.07 |
| f4 (mm) | -7.78 | TTL (mm) | 5.50 |
| f5 (mm) | -111.57 | HFOV (°) | 39.1 |
| f6 (mm) | 10.16 | | |

Figure 20A:
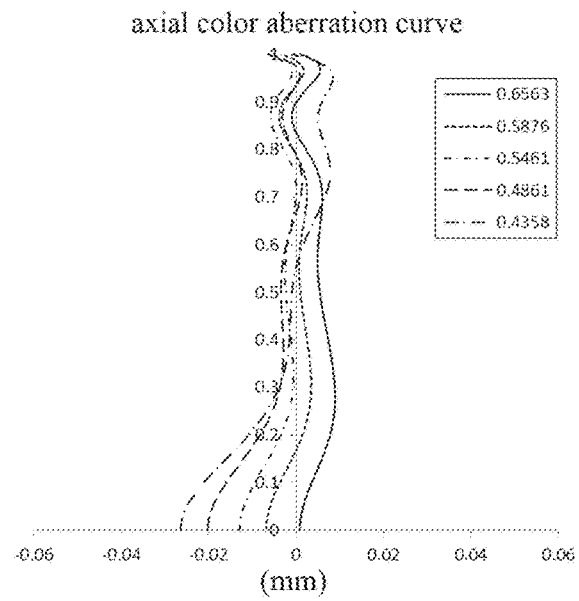
FIGS. 20A-20D respectively illustrate an axial color aberration curve, an astigmatic curve, a distortion curve, and a lateral color aberration curve of the optical imaging lens assembly according to the tenth embodiment.
Figure 20B:
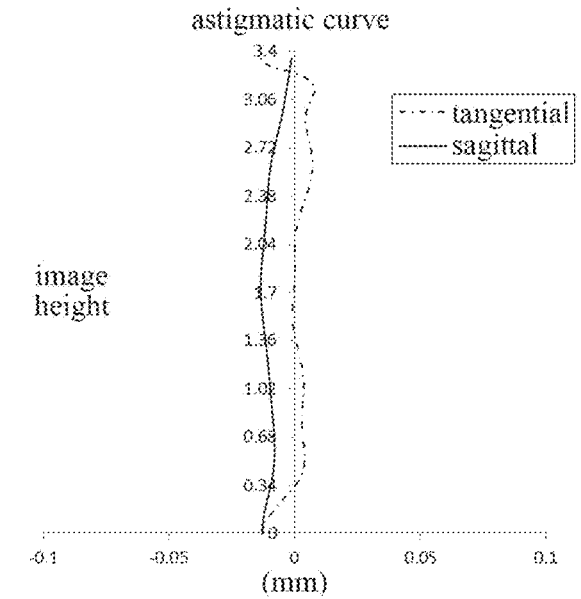
Figure 20C:
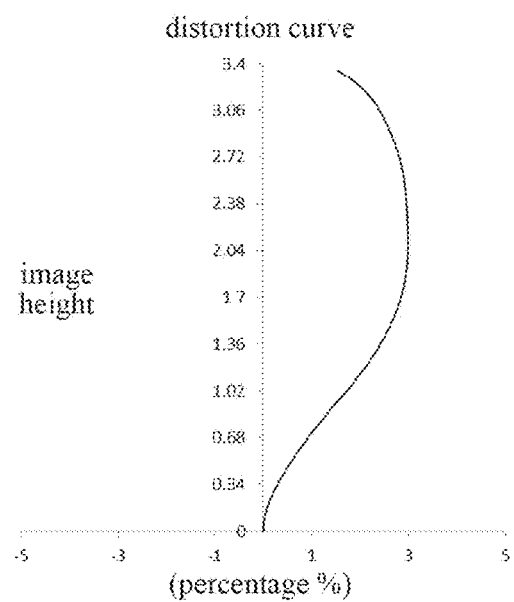
Figure 20D:
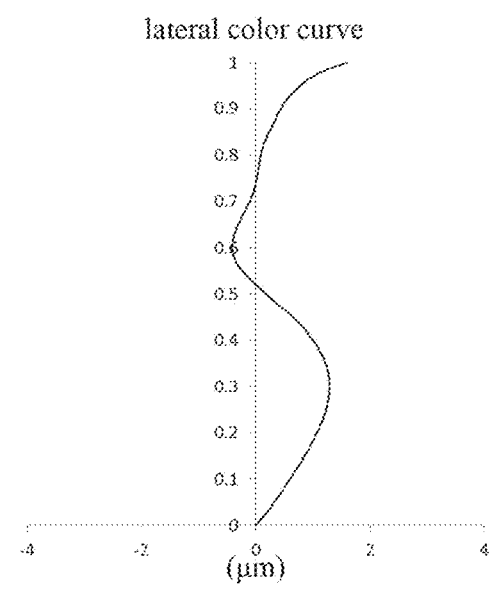

FIG. 20A illustrates an axial color aberration curve of the optical imaging lens assembly according to the tenth embodiment, representing deviations of focal points where lights of different wavelengths converge after passing through the optical imaging lens assembly. FIG. 20B illustrates an astigmatic curve of the optical imaging lens assembly according to the tenth embodiment, representing a curvature of a tangential image plane and a curvature of a sagittal image plane. FIG. 20C illustrates a distortion curve of the optical imaging lens assembly according to the tenth embodiment, representing degrees of distortion at different viewing angles. FIG. 20D illustrates a lateral color curve of the optical imaging lens assembly according to the tenth embodiment, representing deviations of different image heights on an image plane after lights pass through the optical imaging lens assembly. It can be seen from FIGS. 20A-20D that the optical imaging lens assembly according to the tenth embodiment can achieve a good image quality.

Eleventh Embodiment

An optical imaging lens assembly according to an eleventh embodiment of the present disclosure is described below with reference to FIGS. 21-22D.

Figure 21:
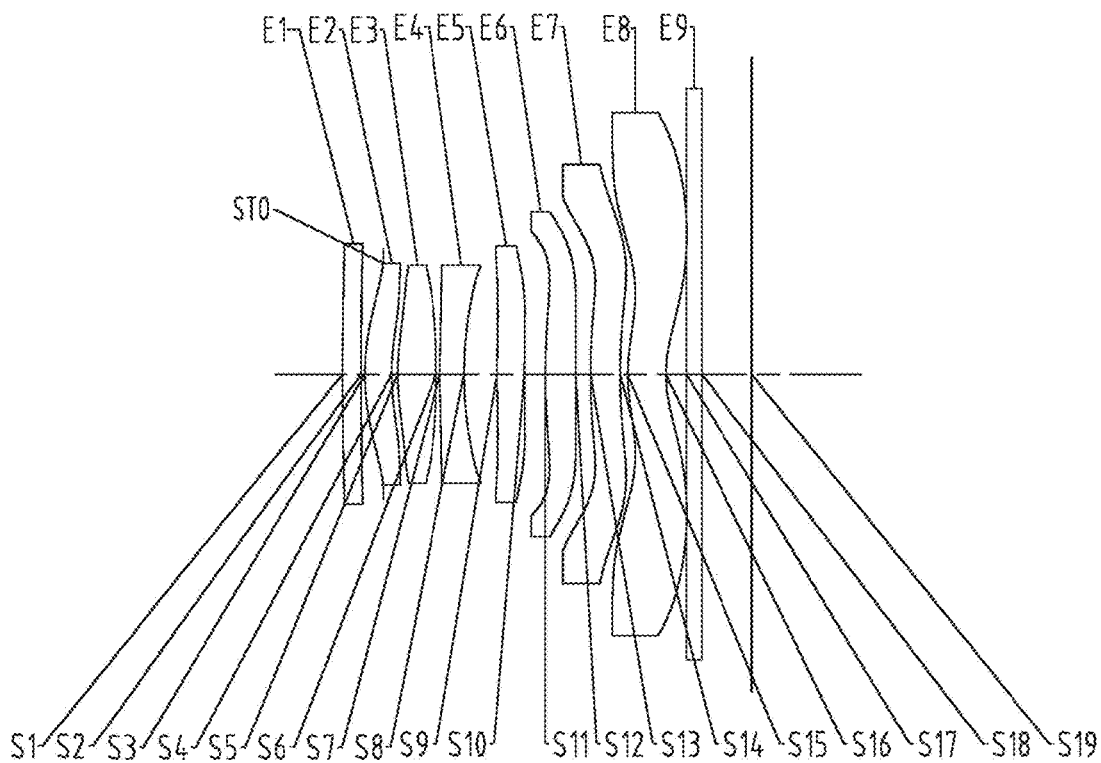
FIG. 21 is a schematic structural diagram of an optical imaging lens assembly according to an eleventh embodiment of the present disclosure.

FIG. 21 is a schematic structural diagram of the optical imaging lens assembly according to the eleventh embodiment of the present disclosure. As shown in FIG. 21, the optical imaging lens assembly according to the eleventh embodiment includes first to eighth lenses E1-E8 having respective object-side surfaces and respective image-side surfaces.

In this embodiment, each of the first lens, the third lens, and the sixth lens has a positive focal power. Each of the second lens, the fourth lens, the fifth lens, the seventh lens, and the eighth lens has a negative focal power.

Table 31 below shows the surface type, the radius of curvature, the thickness, the material and the conic coefficient of each lens of the optical imaging lens assembly in the eleventh embodiment. Table 32 shows the high-order coefficients of the aspheric mirror surfaces in the eleventh embodiment. Table 33 shows the effective focal lengths f1-f8 of the lenses in the eleventh embodiment, the effective focal length f of the optical imaging lens assembly, the half of the maximal field-of-view HFOV of the optical imaging lens assembly, and the optical-axis distance TTL from the object-side surface S1 of the first lens E1 to the image plane S19 of the optical imaging lens assembly. The surface type of each aspheric surface may be defined by the formula (1) given in the first embodiment.

TABLE 31

| surface number | surface type | radius of curvature | thickness | material refractive index | abbe number | conic coefficient |
|---|---|---|---|---|---|---|
| OBJ | spherical | infinite | infinite | | | |
| S1 | aspheric | 31.6958 | 0.2500 | 1.64 | 23.8 | −139.7326 |
| S2 | aspheric | 81.2098 | 0.3000 | | | 99.0000 |
| STO | spherical | infinite | −0.2487 | | | |
| S3 | aspheric | 1.9969 | 0.3582 | 1.55 | 56.1 | −15.5892 |
| S4 | aspheric | 1.8600 | 0.0840 | | | −16.5591 |
| S5 | aspheric | 2.1670 | 0.5222 | 1.55 | 56.1 | −16.7145 |
| S6 | aspheric | −14.2191 | 0.0516 | | | 85.5477 |
| S7 | aspheric | 8.9884 | 0.3260 | 1.67 | 20.4 | 41.8909 |
| S8 | aspheric | 3.1918 | 0.4455 | | | −17.3934 |
| S9 | aspheric | 10.3055 | 0.3688 | 1.65 | 23.5 | −99.0000 |
| S10 | aspheric | 9.0685 | 0.2801 | | | −0.4367 |
| S11 | aspheric | 5.3816 | 0.4116 | 1.55 | 56.1 | −40.3426 |
| S12 | aspheric | 300.0000 | 0.2000 | | | 99.0000 |
| S13 | aspheric | 9.0768 | 0.3990 | 1.65 | 23.5 | −23.5476 |
| S14 | aspheric | 6.3277 | 0.1000 | | | −56.2394 |
| S15 | aspheric | 1.4244 | 0.5133 | 1.55 | 56.1 | −6.2572 |
| S16 | aspheric | 1.0754 | 0.2794 | | | −3.7147 |
| S17 | spherical | infinite | 0.2100 | 1.52 | 64.2 | |
| S18 | spherical | infinite | 0.6741 | | | |
| S19 | spherical | infinite | | | | |

TABLE 32

| surface number | A4 | A6 | A8 | A10 | A12 |
|---|---|---|---|---|---|
| S1 | 1.5660E−02 | −3.6702E−02 | −3.8571E−02 | 2.1345E−01 | −3.2392E−01 |
| S2 | 7.0396E−02 | −2.8436E−01 | 4.9470E−01 | −4.3186E−01 | 1.2795E−01 |
| S3 | 2.4312E−01 | −5.9282E−01 | 9.8224E−01 | −1.0859E+00 | 7.4551E−01 |
| S4 | 8.6926E−02 | −3.8350E−01 | 4.5240E−01 | −3.8161E−01 | 3.0122E−01 |
| S5 | 3.0272E−02 | −1.7981E−01 | 1.1630E−01 | −5.6663E−02 | 1.9814E−01 |
| S6 | −1.1111E−01 | 1.8721E−01 | −3.7027E−01 | 5.1764E−01 | −4.5112E−01 |
| S7 | −1.0251E−01 | 1.9490E−01 | −3.9944E−01 | 5.6242E−01 | −5.0459E−01 |
| S8 | 4.4956E−02 | 1.6072E−02 | −1.2292E−01 | 2.7568E−01 | −4.0994E−01 |
| S9 | −6.1389E−02 | 9.5492E−02 | −2.2769E−01 | 3.9449E−01 | −4.4044E−01 |
| S10 | −1.0607E−01 | 1.0349E−01 | −2.0175E−03 | 2.4589E−01 | −1.7386E−01 |
| S11 | −1.4512E−02 | 1.0552E−01 | −2.4050E−01 | 2.4649E−01 | −1.7047E−01 |
| S12 | −2.4107E−03 | 4.3092E−02 | −9.9079E−02 | 6.8377E−02 | −2.6074E−02 |
| S13 | 1.6185E−01 | −2.9198E−01 | 2.7043E−01 | −2.1172E−01 | 1.1418E−01 |
| S14 | 9.2977E−02 | −1.0846E−01 | 3.0730E−02 | 1.4338E−03 | −3.1085E−03 |
| S15 | −1.9305E−01 | 4.8614E−02 | 2.0910E−03 | −2.5266E−03 | 2.6756E−04 |
| S16 | −1.4238E−01 | 6.5559E−02 | −2.0921E−02 | 4.8076E−03 | −7.8694E−04 |

| surface number | A14 | A16 | A18 | A20 |
|---|---|---|---|---|
| S1 | 2.6283E−01 | −1.2278E−01 | 3.1132E−02 | −3.3235E−03 |
| S2 | 1.0121E−01 | −1.1297E−01 | 4.2377E−02 | −5.8670E−03 |
| S3 | −3.1349E−01 | 7.8661E−02 | −1.0822E−02 | 6.2859E−04 |
| S4 | −1.7635E−01 | 6.2333E−02 | −1.1695E−02 | 8.9516E−04 |
| S5 | −2.3699E−01 | 1.1775E−01 | −2.6277E−02 | 2.1404E−03 |
| S6 | 2.3616E−01 | −7.1824E−02 | 1.1683E−02 | −7.8661E−04 |
| S7 | 2.5700E−01 | −4.8304E−02 | −1.0204E−02 | 4.0405E−03 |
| S8 | 4.1751E−01 | −2.6248E−01 | 9.0970E−02 | −1.3117E−02 |
| S9 | 3.0184E−01 | −1.2058E−01 | 2.5591E−02 | −2.2241E−03 |
| S10 | 6.5443E−02 | −8.7200E−03 | −1.2242E−03 | 3.3199E−04 |
| S11 | 8.2268E−02 | −2.7086E−02 | 5.4198E−03 | −4.8063E−04 |
| S12 | 6.3205E−03 | −9.7991E−04 | 8.8253E−05 | −3.4694E−06 |
| S13 | −3.8306E−02 | 7.7026E−03 | −8.5567E−04 | 4.0560E−05 |
| S14 | 9.0670E−04 | −1.3265E−04 | 1.0085E−05 | −3.1543E−07 |
| S15 | 3.7356E−05 | −1.0741E−05 | 8.9701E−07 | −2.6301E−08 |
| S16 | 8.7685E−05 | −6.2092E−06 | 2.4813E−07 | −4.2104E−09 |

TABLE 33

| | | | |
|---|---|---|---|
| f1 (mm) | 81.03 | f7 (mm) | −34.35 |
| f2 (mm) | −662.87 | f8 (mm) | −16.73 |
| f3 (mm) | 3.48 | f (mm) | 4.10 |
| f4 (mm) | −7.59 | TTL (mm) | 5.53 |
| f5 (mm) | −132.63 | HFOV (°) | 39.0 |
| f6 (mm) | 10.02 | | |

Figures 22A, 22B:
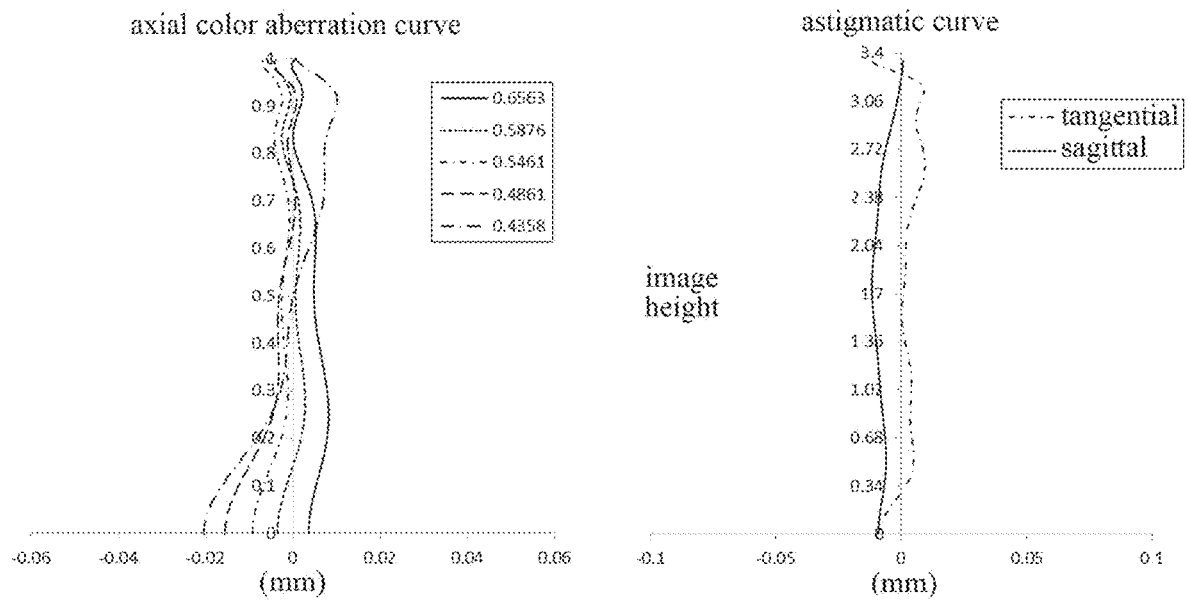
FIGS. 22A-22D respectively illustrate an axial color aberration curve, an astigmatic curve, a distortion curve, and a lateral color aberration curve of the optical imaging lens assembly according to the eleventh embodiment.
Figures 22C, 22D:
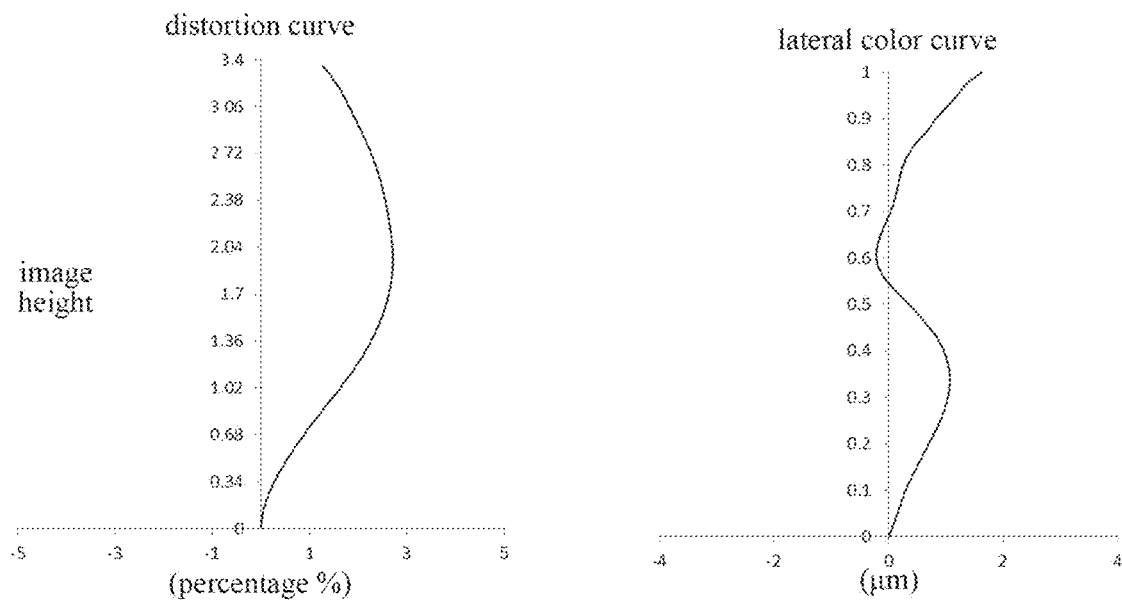

FIG. 22A illustrates an axial color aberration curve of the optical imaging lens assembly according to the eleventh embodiment, representing deviations of focal points where lights of different wavelengths converge after passing through the optical imaging lens assembly. FIG. 22B illustrates an astigmatic curve of the optical imaging lens assembly according to the eleventh embodiment, representing a curvature of a tangential image plane and a curvature of a sagittal image plane. FIG. 22C illustrates a distortion curve of the optical imaging lens assembly according to the eleventh embodiment, representing degrees of distortion at different viewing angles. FIG. 22D illustrates a lateral color curve of the optical imaging lens assembly according to the eleventh embodiment, representing deviations of different image heights on an image plane after lights pass through the optical imaging lens assembly. It can be seen from FIGS. 22A-22D that the optical imaging lens assembly according to the eleventh embodiment can achieve a good image quality.

Twelfth Embodiment

An optical imaging lens assembly according to a twelfth embodiment of the present disclosure is described below with reference to FIGS. 23-24D.

Figure 23:
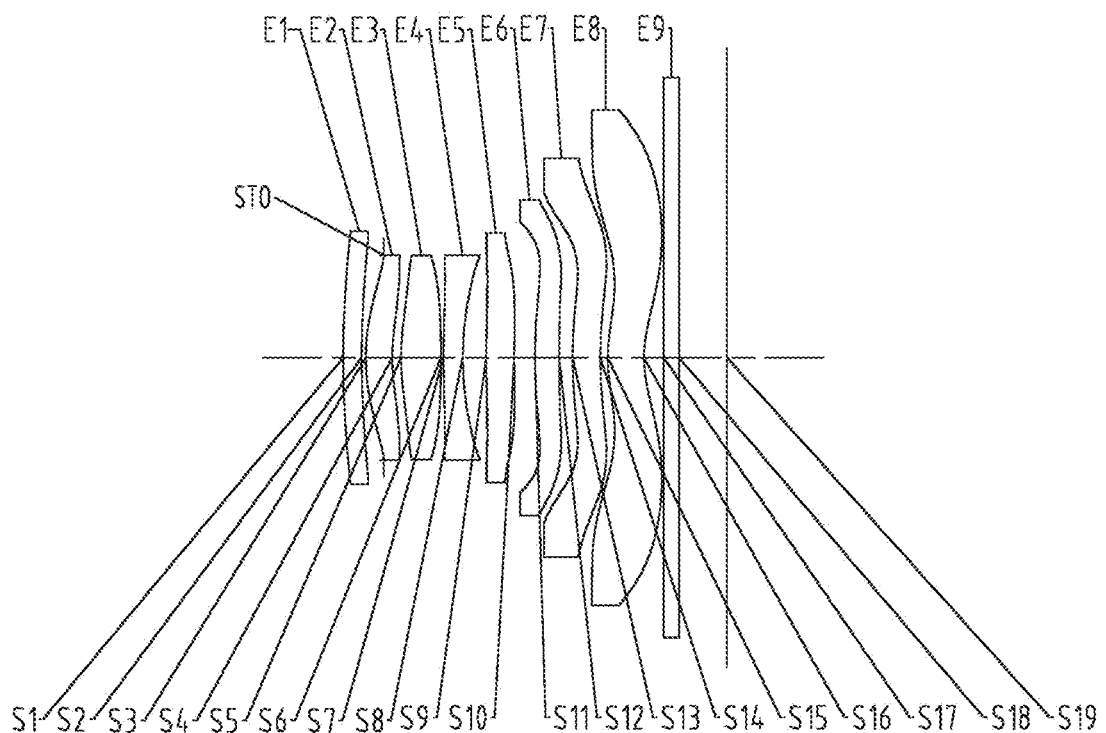
FIG. 23 is a schematic structural diagram of an optical imagine lens assembly according to a twelfth embodiment of the present disclosure.

FIG. 23 is a schematic structural diagram of the optical imaging lens assembly according to the twelfth embodiment of the present disclosure. As shown in FIG. 23, the optical imaging lens assembly according to the twelfth embodiment includes first to eighth lenses E1-E8 having respective object-side surfaces and respective image-side surfaces.

In this embodiment, each of the first lens, the second lens, the third lens, the fifth lens, and the sixth lens has a positive focal power. Each of the fourth lens, the seventh lens, and the eighth lens has a negative focal power.

Table 34 below shows the surface type, the radius of curvature, the thickness, the material and the conic coefficient of each lens of the optical imaging lens assembly in the twelfth embodiment. Table 35 shows the high-order coefficients of the aspheric mirror surfaces in the twelfth embodiment. Table 36 shows the effective focal lengths f1-f8 of the lenses in the twelfth embodiment, the effective focal length f of the optical imaging lens assembly, the half of the maximal field-of-view HFOV of the optical imaging lens assembly, and the optical-axis distance TTL from the object-side surface S1 of the first lens E1 to the image plane S19 of the optical imaging lens assembly. The surface type of each aspheric surface may be defined by the formula (1) given in the first embodiment.

TABLE 34

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 8.7121 | 0.2500 | 1.64 | 23.8 | −22.0984 |
| S2 | aspheric | 8.6838 | 0.3000 | | | −24.8790 |
| STO | spherical | infinite | −0.2440 | | | 0.0000 |
| S3 | aspheric | 1.8329 | 0.3580 | 1.55 | 56.1 | −15.1904 |
| S4 | aspheric | 2.0229 | 0.1179 | | | −17.9006 |
| S5 | aspheric | 2.2127 | 0.5402 | 1.55 | 56.1 | −15.8923 |
| S6 | aspheric | −13.7783 | 0.0333 | | | 86.9955 |
| S7 | aspheric | 9.2176 | 0.2600 | 1.67 | 20.4 | 43.7827 |
| S8 | aspheric | 2.8169 | 0.3174 | | | −14.7507 |
| S9 | aspheric | 8.1645 | 0.3787 | 1.65 | 23.5 | −90.5642 |
| S10 | aspheric | 9.4730 | 0.2789 | | | 2.6480 |
| S11 | aspheric | 5.2276 | 0.3299 | 1.55 | 56.1 | −30.3341 |
| S12 | aspheric | 30.0000 | 0.1807 | | | 33.8767 |
| S13 | aspheric | 5.9039 | 0.3734 | 1.65 | 23.5 | −61.9630 |
| S14 | aspheric | 4.4249 | 0.1000 | | | −87.1682 |
| S15 | aspheric | 1.3344 | 0.4883 | 1.55 | 56.1 | −7.8785 |
| S16 | aspheric | 1.0529 | 0.2690 | | | −4.4213 |
| S17 | spherical | infinite | 0.2100 | 1.52 | 64.2 | |
| S18 | spherical | infinite | 0.6446 | | | |
| S19 | spherical | infinite | | | | |

TABLE 35

| surface number | A4 | A6 | A8 | A10 | A12 |
|---|---|---|---|---|---|
| S1 | 9.6173E−03 | −1.2341E−02 | −4.2005E−02 | 1.4639E−01 | −2.1037E−01 |
| S2 | 2.5280E−02 | −1.1330E−01 | 2.3148E−01 | −2.7087E−01 | 1.8363E−01 |
| S3 | 2.5128E−01 | −5.5100E−01 | 9.1058E−01 | −1.0730E+00 | 7.8328E−01 |
| S4 | 8.1715E−02 | −4.3102E−01 | 7.4698E−01 | −9.9291E−01 | 9.2853E−01 |
| S5 | 4.4977E−02 | −2.6938E−01 | 4.4957E−01 | −7.3056E−01 | 9.8246E−01 |
| S6 | −4.2475E−02 | 2.4577E−02 | −2.8406E−01 | 6.6206E−01 | −7.2189E−01 |
| S7 | −4.7652E−02 | 1.2301E−01 | −4.5845E−01 | 6.6313E−01 | −3.3003E−01 |
| S8 | 7.5556E−02 | −1.3351E−01 | 6.5809E−01 | −2.0012E+00 | 3.3563E+00 |
| S9 | −8.0236E−02 | 1.0891E−01 | −1.9873E−01 | 3.4228E−01 | −3.9964E−01 |
| S10 | −1.2662E−01 | 9.0640E−02 | −2.0689E−01 | 3.1876E−01 | −2.8241E−01 |
| S11 | 2.0994E−02 | 1.0337E−01 | −3.6713E−01 | 4.8651E−01 | −4.1840E−01 |
| S12 | 5.6591E−02 | −5.8177E−02 | 3.0218E−02 | −4.9463E−02 | 3.9259E−02 |
| S13 | 2.1561E−01 | −4.5414E−01 | 4.7082E−01 | −3.7664E−01 | 2.0498E−01 |
| S14 | 1.3052E−01 | −1.7802E−01 | 8.0673E−02 | −1.9010E−02 | 1.9391E−03 |

TABLE 35-continued

| | | | | |
|---|---|---|---|---|
| S15 | −2.2970E−01 | 9.7637E−02 | −2.3515E−02 | 4.6698E−03 | −8.9438E−04 |
| S16 | −1.5188E−01 | 7.5246E−02 | −2.6052E−02 | 6.4012E−03 | −1.1046E−03 |

| surface number | A14 | A16 | A18 | A20 |
|---|---|---|---|---|
| S1 | 1.7172E−01 | −8.1696E−02 | 2.0986E−02 | −2.2438E−03 |
| S2 | −5.5768E−02 | −6.4195E−03 | 8.7647E−03 | −1.6330E−03 |
| S3 | −3.4599E−01 | 9.0453E−02 | −1.2908E−02 | 7.7610E−04 |
| S4 | −5.3239E−01 | 1.7641E−01 | −3.1064E−02 | 2.2522E−03 |
| S3 | −7.6929E−01 | 3.2315E−01 | −6.7587E−02 | 5.4595E−03 |
| S6 | 4.2996E−01 | −1.4328E−01 | 2.5096E−02 | −1.8017E−03 |
| S7 | −2.2789E−01 | 3.8537E−01 | −1.8448E−01 | 3.0599E−02 |
| S8 | −3.2832E+00 | 1.8721E+00 | −5.7217E−01 | 7.2110E−02 |
| S9 | 2.8831E−01 | −1.2252E−01 | 2.7934E−02 | −2.6264E−03 |
| S10 | 1.4724E−01 | −4.2346E−02 | 5.8503E−03 | −2.6090E−04 |
| S11 | 2.3542E−01 | −8.3063E−02 | 1.6643E−02 | −1.4344E−03 |
| S12 | −1.4889E−02 | 2.9630E−03 | −3.0060E−04 | 1.2309E−05 |
| S13 | −7.0610E−02 | 1.4851E−02 | −1.7524E−03 | 8.9204E−05 |
| S14 | 2.0227E−04 | −8.8230E−05 | 1.0184E−05 | −4.1489E−07 |
| S15 | 1.4024E−04 | −1.4518E−05 | 8.3810E−07 | −2.0209E−08 |
| S16 | 1.2761E−04 | −9.2305E−06 | 3.7327E−07 | −6.3835E−09 |

TABLE 36

| | | | |
|---|---|---|---|
| f1 (mm) | 1705.58 | f7 (mm) | −30.39 |
| f2 (mm) | 21.44 | f8 (mm) | −23.61 |
| f3 (mm) | 3.53 | f (m) | 3.80 |
| f4 (mm) | −6.18 | TTL (mm) | 5.19 |
| f5 (mm) | 82.30 | HFOV (°) | 40.8 |
| f6 (mm) | 11.53 | | |

Figure 24A:
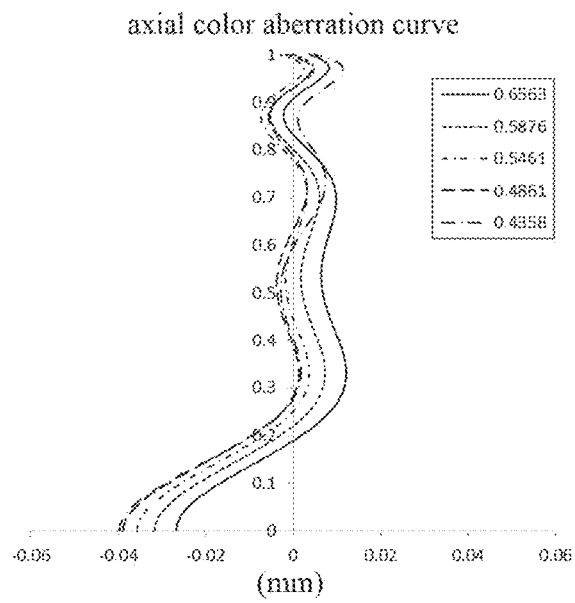
FIGS. 24A-24D respectively illustrate an axial color aberration curve, an astigmatic curve, a distortion curve, and a lateral color aberration curve of the optical imaging lens assembly according to the twelfth embodiment.
Figure 24B:
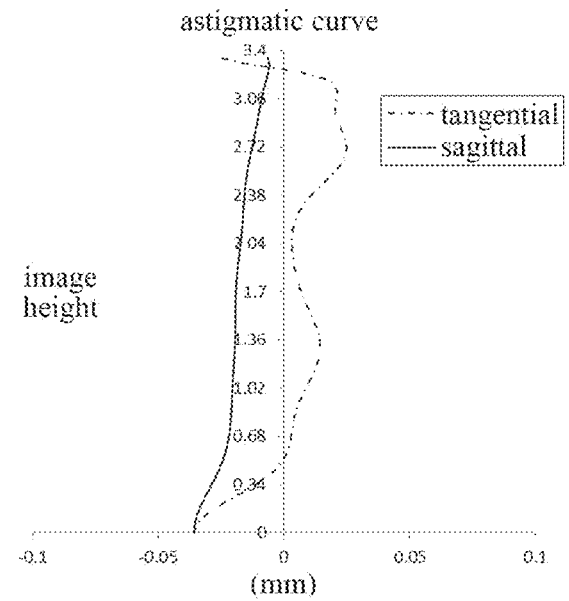
Figure 24C:
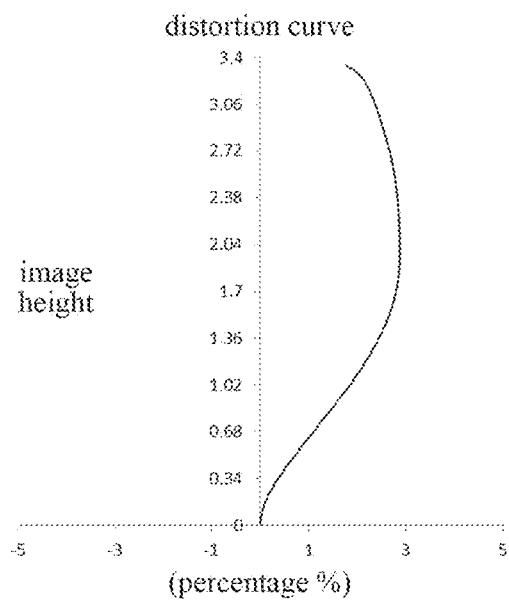
Figure 24D:
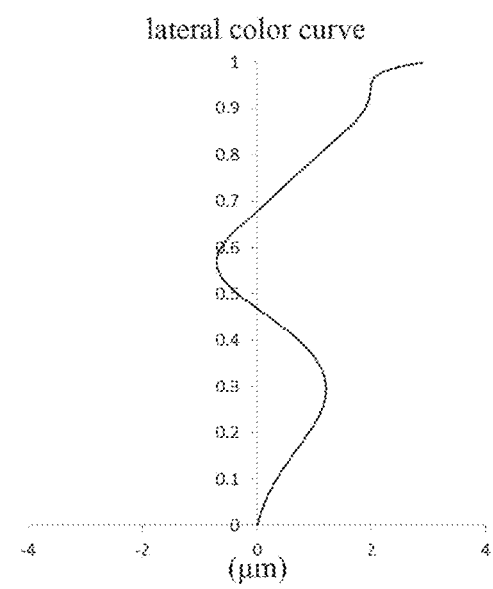

FIG. 24A illustrates an axial color aberration curve of the optical imaging lens assembly according to the twelfth embodiment, representing deviations of focal points where lights of different wavelengths converge after passing through the optical imaging lens assembly. FIG. 24B illustrates an astigmatic curve of the optical imaging lens assembly according to the twelfth embodiment, representing a curvature of a tangential image plane and a curvature of a sagittal image plane. FIG. 24C illustrates a distortion curve of the optical imaging lens assembly according to the twelfth embodiment, representing degrees of distortion at different viewing angles. FIG. 24D illustrates a lateral color curve of the optical imaging lens assembly according to the twelfth embodiment, representing deviations of different image heights on an image plane after lights pass through the optical imaging lens assembly. It can be seen from FIGS. 24A-24D that the optical imaging lens assembly according to the twelfth embodiment can achieve a good image quality.

Thirteenth Embodiment

An optical imaging lens assembly according to a thirteenth embodiment of the present disclosure is described below with reference to FIGS. 25-26D.

FIG. 25 is a schematic structural diagram of the optical imaging lens assembly according to the thirteenth embodiment of the present disclosure. As shown in FIG. 25, the optical imaging lens assembly according to the thirteenth embodiment includes first to eighth lenses E1-E8 having respective object-side surfaces and respective image-side surfaces.

In this embodiment, each of the first lens, the second lens, the third lens, the fifth lens, and the sixth lens has a positive focal power. Each of the fourth lens, the seventh lens, and the eighth lens has a negative focal power.

Table 37 below shows the surface type, the radius of curvature, the thickness, the material and the conic coefficient of each lens of the optical imaging lens assembly in the thirteenth embodiment. Table 38 shows the high-order coefficients of the aspheric mirror surfaces in the thirteenth embodiment. Table 39 shows the effective focal lengths f1-f8 of the lenses in the thirteenth embodiment, the effective focal length f of the optical imaging lens assembly, the half of the maximal field-of-view HFOV of the optical imaging lens assembly, and the optical-axis distance TTL from the object-side surface S1 of the first lens E1 to the image plane S19 of the optical imaging lens assembly. The surface type of each aspheric surface may be defined by the formula (1) given in the first embodiment.

TABLE 37

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 14.3756 | 0.2500 | 1.64 | 23.8 | −24.2325 |
| S2 | aspheric | 15.7635 | 0.3000 | | | −34.2339 |
| STO | spherical | infinite | −0.2599 | | | 0.0000 |
| S3 | aspheric | 1.8530 | 0.3655 | 1.55 | 56.1 | −14.7366 |
| S4 | aspheric | 2.0964 | 0.1260 | | | −18.0800 |
| S5 | aspheric | 2.3118 | 0.5424 | 1.55 | 56.1 | −16.5236 |
| S6 | aspheric | −13.8740 | 0.0250 | | | 81.7287 |
| S7 | aspheric | 9.2167 | 0.2600 | 1.67 | 20.4 | 41.9309 |
| S8 | aspheric | 2.8090 | 0.3744 | | | −14.9184 |
| S9 | aspheric | 11.0344 | 0.4384 | 1.65 | 23.5 | −95.9807 |
| S10 | aspheric | 12.4916 | 0.2839 | | | 1.9642 |
| S11 | aspheric | 5.6860 | 0.3460 | 1.55 | 56.1 | −27.3427 |
| S12 | aspheric | 156.2100 | 0.1302 | | | −99.0000 |
| S13 | aspheric | 8.1633 | 0.3723 | 1.65 | 23.5 | −30.6240 |
| S14 | aspheric | 4.4758 | 0.1000 | | | −72.1303 |
| S15 | aspheric | 1.3573 | 0.5407 | 1.55 | 56.1 | −6.8935 |
| S16 | aspheric | 1.1231 | 0.2750 | | | −3.4476 |
| S17 | spherical | infinite | 0.2100 | 1.52 | 64.2 | |
| S18 | spherical | infinite | 0.6506 | | | |
| S19 | spherical | infinite | | | | |

TABLE 38

| surface number | A4 | A6 | A8 | A10 | A12 |
|---|---|---|---|---|---|
| S1 | 1.9155E−02 | −3.0281E−02 | −6.2878E−02 | 2.3954E−01 | −3.3188E−01 |
| S2 | 5.2242E−02 | −2.1047E−01 | 3.0123E−01 | −1.1372E−01 | −2.2163E−01 |
| S3 | 2.5856E−01 | −5.9925E−01 | 9.7569E−01 | −1.0807E+00 | 7.4872E−01 |
| S4 | 4.7956E−02 | −2.8853E−01 | 4.1652E−01 | −4.8263E−01 | 4.3311E−01 |
| S5 | 1.3837E−01 | −1.6720E−01 | 2.2831E−01 | −3.1904E−01 | 4.3110E−01 |
| S6 | −1.0815E−01 | 3.1744E−01 | −8.6226E−01 | 1.3033E+00 | −1.1341E+00 |
| S7 | −8.7997E−02 | 2.5637E−01 | −5.1679E−01 | 2.5530E−01 | 5.8093E−01 |
| S8 | 6.3815E−02 | −2.1740E−02 | 6.4124E−02 | −3.2217E−01 | 5.7648E−01 |
| S9 | −6.5665E−02 | 7.7273E−02 | −1.6052E−01 | 3.0877E−01 | −3.9477E−01 |
| S10 | −8.7564E−02 | −1.2716E−02 | 6.5301E−02 | −1.3739E−01 | 1.8767E−01 |
| S11 | 1.7679E−02 | 5.2170E−02 | −2.0525E−01 | 2.6700E−01 | −2.3510E−01 |
| S12 | 6.5439E−02 | −7.2445E−02 | 3.2449E−02 | −3.3709E−02 | 2.3808E−02 |
| S13 | 1.9592E−01 | −4.0604E−01 | 4.2815E−01 | −3.5988E−01 | 2.0495E−01 |
| S14 | 8.6989E−02 | −1.1058E−01 | 2.8620E−02 | 6.3480E−03 | −5.9882E−03 |
| S15 | −2.0609E−01 | 4.7439E−02 | 1.1876E−02 | −8.1997E−03 | 1.8684E−03 |
| S16 | −1.6889E−01 | 8.2233E−02 | −3.3530E−02 | 9.2292E−03 | −1.7715E−03 |

| surface number | A14 | A16 | A18 | A20 |
|---|---|---|---|---|
| S1 | 2.5534E−01 | −1.1440E−01 | 2.7876E−02 | −2.8524E−03 |
| S2 | 3.5965E−01 | −2.3530E−01 | 7.5409E−02 | −9.6940E−03 |
| S3 | −3.1934E−01 | 8.1641E−02 | −1.1484E−02 | 6.8371E−04 |
| S4 | −2.4452E−01 | 7.9831E−02 | −1.3829E−02 | 9.8599E−04 |
| S5 | −3.2020E−01 | 1.1633E−01 | −1.8203E−02 | 7.1709E−04 |
| S6 | 5.8255E−01 | −1.7408E−01 | 2.7969E−02 | −1.8683E−03 |
| S7 | −1.0765E+00 | 7.7702E−01 | −2.6795E−01 | 3.6312E−02 |
| S8 | −4.9615E−01 | 2.1965E−01 | −4.3639E−02 | 2.2187E−03 |
| S9 | 3.0352E−01 | −1.3305E−01 | 3.0492E−02 | −2.8311E−03 |
| S10 | −1.5576E−01 | 7.5414E−02 | −1.9151E−02 | 1.9542E−03 |
| S11 | 1.3937E−01 | −5.2957E−02 | 1.1488E−02 | −1.0605E−03 |
| S12 | −8.4522E−03 | 1.5819E−03 | −1.5072E−04 | 5.7844E−06 |
| S13 | −7.3264E−02 | 1.5898E−02 | −1.9257E−03 | 1.0014E−04 |
| S14 | 1.7428E−03 | −2.6466E−04 | 2.0906E−05 | −6.7619E−07 |
| S15 | −2.2369E−04 | 1.4318E−05 | −4.1772E−07 | 2.7481E−09 |
| S16 | 2.2574E−04 | −1.7918E−05 | 7.9209E−07 | −1.4763E−08 |

TABLE 39

| f1 (mm) | 238.25 | f7 (mm) | −15.99 |
|---|---|---|---|
| f2 (mm) | 19.08 | f8 (mm) | −64.71 |
| f3 (mm) | 3.67 | f (mm) | 3.92 |
| f4 (mm) | −6.15 | TTL (mm) | 5.33 |
| f5 (mm) | 131.18 | HFOV (°) | 39.9 |
| f6 (mm) | 10.79 | | |

Figure 26C:
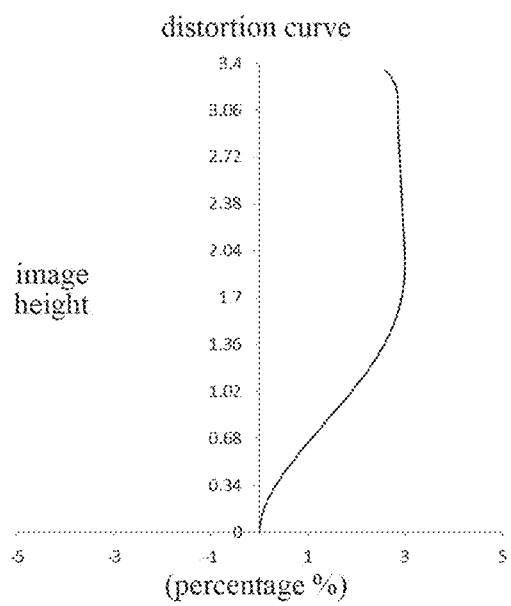
Figure 26D:
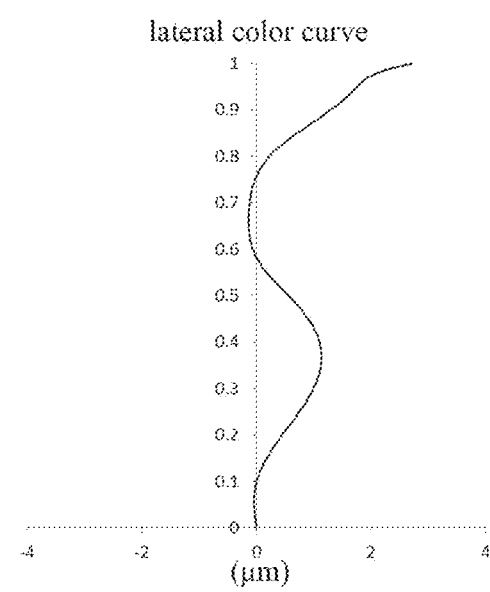

FIG. 26A illustrates an axial color aberration curve of the optical imaging lens assembly according to the thirteenth embodiment, representing deviations of focal points where lights of different wavelengths converge after passing through the optical imaging lens assembly. FIG. 26B illustrates an astigmatic curve of the optical imaging lens assembly according to the thirteenth embodiment, representing a curvature of a tangential image plane and a curvature of a sagittal image plane. FIG. 26C illustrates a distortion curve of the optical imaging lens assembly according to the thirteenth embodiment, representing degrees of distortion at different viewing angles. FIG. 26D illustrates a lateral color curve of the optical imaging lens assembly according to the thirteenth embodiment, representing deviations of different image heights on an image plane after lights pass through the optical imaging lens assembly. It can be seen from FIGS. 26A-26D that the optical imaging lens assembly according to the thirteenth embodiment can achieve a good image quality.

To sum up, the first to the thirteenth embodiments respectively satisfy the relationships shown in Table 40 below.

TABLE 40

| conditional expression | embodiment | | | | | | |
|---|---|---|---|---|---|---|---|
| | 1 | 2 | 3 | 4 | 5 | 6 | 7 |
| f/f34 | 0.54 | 0.54 | 0.53 | 0.63 | 0.71 | 0.60 | 0.59 |
| f/f6 | 0.36 | 0.37 | 0.36 | 0.35 | 0.39 | 0.31 | 0.31 |
| f/f12 | 0.20 | 0.21 | 0.23 | 0.15 | 0.08 | 0.14 | 0.14 |
| f/f78 | −0.34 | −0.36 | −0.34 | −0.34 | −0.33 | −0.30 | −0.31 |
| f/f1 | 0.01 | 0.01 | 0.02 | 0.04 | 0.05 | 0.00 | 0.00 |
| f/f5 | 0.03 | 0.03 | 0.03 | −0.01 | −0.04 | 0.05 | 0.06 |
| f/R11 | 0.65 | 0.65 | 0.71 | 0.85 | 0.72 | 0.76 | 0.76 |
| CT6/CT7 | 0.94 | 0.94 | 0.92 | 0.82 | 1.03 | 0.93 | 0.91 |
| CT2/CT3 | 0.66 | 0.67 | 0.68 | 0.66 | 0.68 | 0.69 | 0.69 |
| R3/R4 | 0.89 | 0.89 | 0.88 | 0.97 | 1.05 | 0.94 | 0.94 |
| R15/R16 | 1.26 | 1.26 | 1.16 | 1.08 | 1.40 | 1.20 | 1.22 |
| (R7 − R8)/(R7 + R8) | 0.53 | 0.53 | 0.53 | 0.47 | 0.47 | 0.53 | 0.54 |
| \|(R13 − R14)/(R13 + R14)\| | 0.22 | 0.2.4 | 0.34 | 0.43 | 0.02 | 0.21 | 0.19 |
| f/EPD | 1.67 | 1.67 | 1.67 | 1.73 | 1.73 | 1.59 | 1.65 |
| TTL/ImgH | 1.59 | 1.58 | 1.60 | 1.65 | 1.65 | 1.63 | 1.70 |

| conditional expression | embodiment | | | | | |
|---|---|---|---|---|---|---|
| | 8 | 9 | 10 | 11 | 12 | 13 |
| f/f34 | 0.58 | 0.70 | 0.70 | 0.74 | 0.56 | 0.53 |
| f/f6 | 0.31 | 0.41 | 0.40 | 0.41 | 0.33 | 0.36 |
| f/f12 | 0.13 | 0.08 | 0.09 | 0.05 | 0.18 | 0.22 |
| f/f78 | −0.25 | −0.37 | −0.38 | −0.38 | −0.30 | −0.35 |
| f/f1 | 0.00 | 0.05 | 0.05 | 0.05 | 0.00 | 0.02 |
| f/f5 | 0.06 | −0.03 | −0.04 | −0.03 | 0.05 | 0.03 |
| f/R11 | 0.73 | 0.77 | 0.74 | 0.76 | 0.73 | 0.69 |
| CT6/CT7 | 0.91 | 1.01 | 1.00 | 1.03 | 0.88 | 0.93 |
| CT2/CT3 | 0.69 | 0.69 | 0.67 | 0.69 | 0.66 | 0.67 |

TABLE 40-continued

| R3/R4 | 0.94 | 1.05 | 1.02 | 1.07 | 0.91 | 0.88 |
|---|---|---|---|---|---|---|
| R15/R16 | 1.23 | 1.28 | 1.39 | 1.32 | 1.27 | 1.21 |
| (R7 − R8)/(R7 + R8) | 0.53 | 0.49 | 0.46 | 0.48 | 0.53 | 0.53 |
| |(R13 − R14)/(R13 + R14)| | 0.15 | 0.21 | 0.05 | 0.18 | 0.14 | 0.29 |
| f/EPD | 1.65 | 1.70 | 1.73 | 1.73 | 1.67 | 1.67 |
| TTL/ImgH | 1.69 | 1.64 | 1.64 | 1.63 | 1.53 | 1.57 |

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, such as technical solutions formed by replacing the features as disclosed in the present disclosure with (but not limited to) technical features with similar functions.

What is claimed is:

1. An optical imaging lens assembly, comprising a first lens, a second lens, a third lens, a fourth lens, a fifth lens, a sixth lens, a seventh lens, and an eighth lens, sequentially arranged from an object side to an image side along an optical axis,
wherein each of the first lens, the second lens, the fifth lens, the seventh lens, and the eighth lens has a positive focal power or a negative focal power;
a combined focal power of the third lens and the fourth lens is a positive focal power;
the sixth lens has a positive focal power; and
an effective focal length f of the optical imaging lens assembly and a combined focal length f34 of the third lens and the fourth lens satisfy: $0.5 \leq f/f34 < 1.0$.

2. The optical imaging lens assembly according to claim 1, wherein the third lens has a positive focal power and the fourth lens has a negative focal power.

3. The optical imaging lens assembly according to claim 2, wherein a radius R7 of curvature of an object-side surface of the fourth lens and a radius R8 of curvature of an image-side surface of the fourth lens satisfy: $0 < (R7-R8)/(R7+R8) < 1.0$.

4. The optical imaging lens assembly according to claim I, wherein an optical-axis distance TTL from an object-side surface of the first lens to an image plane of the optical imaging lens assembly and a half of a diagonal length ImgH of an effective pixel area on the image plane of the optical imaging lens assembly satisfy: $TTL/ImgH \leq 1.7$.

5. The optical imaging lens assembly according to claim 1, wherein the effective focal length f of the optical imaging lens assembly and a combined focal length f12 of the first lens and the second lens satisfy: $0 < f/f12 < 0.5$.

6. The optical imaging lens assembly according to claim 1, wherein the effective focal length f of the optical imaging lens assembly and an effective focal length f1 of the first lens satisfy: $|f/f1| \leq 0.1$.

7. The optical imaging lens assembly according to claim 1, wherein a radius R3 of curvature of an object-side surface of the second lens and a radius R4 of curvature of an image-side surface of the second lens satisfy: $0.6 < R3/R4 < 1.2$.

8. The optical imaging lens assembly according to claim 1, wherein a center thickness CT2 of the second lens on the optical axis and a center thickness CT3 of the third lens on the optical axis satisfy: $0.5 < CT2/CT3 < 0.8$.

9. The optical imaging lens assembly according to claim 1, wherein the effective focal length f of the optical imaging lens assembly and an effective focal length f5 of the fifth lens satisfy: $|f/f5| \leq 0.1$.

10. The optical imaging lens assembly according to claim I, wherein a center thickness CT6 of the sixth lens on the optical axis and a center thickness CT7 of the seventh lens on the optical axis satisfy: $0.7 < CT6/CT7 < 1.2$.

11. The optical imaging lens assembly according to claim 1, wherein the effective focal length f of the optical imaging lens assembly and a combined focal length f78 of the seventh lens and the eighth lens satisfy: $-0.5 < f/f78 < 0$.

12. The optical imaging lens assembly according to claim 1, wherein the effective focal length f of the optical imaging lens assembly and an entrance pupil diameter EPD of the optical imaging lens assembly satisfy: $f/EPD \leq 1.8$.

13. An optical imaging lens assembly, comprising a first lens, a second lens, a third lens, a fourth lens, a fifth lens, a sixth lens, a seventh lens, and an. eighth lens, sequentially arranged from an object side to an image side along an optical axis,
wherein each of the first lens, the second lens, and the fifth lens has a positive focal power or a negative focal power;
each of the third lens and the sixth lens has a positive focal power;
the fourth lens has a negative focal power;
a combined focal power of the seventh lens and the eighth lens is a negative focal power; and
an effective focal length f of the optical imaging lens assembly and a combined focal length f78 of the seventh lens and the eighth lens satisfy: $-0.5 < f/f78 < 0$.

14. The optical imaging lens assembly according to claim 13, wherein at least one of the seventh lens and the eighth lens has a negative focal power.

15. The optical imaging lens assembly according to claim 13, wherein a combined focal power of the third lens and the fourth. lens is a positive focal power.

16. The optical imaging lens assembly according to claim 13, wherein an optical-axis distance TTL from an object-side surface of the first lens to an image plane of the optical imaging lens assembly and a half of a diagonal length ImgH of an effective pixel area on the image plane of the optical imaging lens assembly satisfy: $TTL/ImgH \leq 1.7$.

17. The optical imaging lens assembly according to claim 16, wherein the effective focal length f of the optical imaging lens assembly and an entrance pupil diameter EPD of the optical imaging lens assembly satisfy: $f/EPD \leq 1.8$.

18. The optical imaging lens assembly according to claim 17, wherein the effective focal length f of the optical imaging lens assembly and an effective focal length f6 of the sixth lens satisfy: $0 < f/f6 < 0.5$.

19. The optical imaging lens assembly according to claim 17, wherein the effective focal length f of the optical imaging lens assembly and an effective focal length f5 of the fifth lens satisfy: $|f/f5| \leq 0.1$.

20. The optical imaging lens assembly according to claim 17, wherein the effective focal length f of the optical imaging lens assembly and a radius R11 of curvature of an object-side surface of the sixth lens satisfy: $0.5 < f/R11 < 1.0$.

21. The optical imaging lens assembly according to claim 17, wherein a center thickness CT6 of the sixth lens on the optical axis and a center thickness CT7 of the seventh lens on the optical axis satisfy: $0.7 < CT6/CT7 < 1.2$.

22. The optical imaging lens assembly according to claim 17, wherein a radius R13 of curvature of an object-side surface of the seventh lens and a radius R14 of curvature of an image-side surface of the seventh lens satisfy: |(R13−R14)/(R13+R14)|≤0.5.

23. The optical imaging lens assembly according to claim 17, wherein a radius R15 of curvature of an object-side surface of the eighth lens and a radius R16 of curvature of an image-side surface of the eighth lens satisfy: 1≤R15/R16<1.5.

* * * * *